US009372259B2

(12) United States Patent
Kishigami et al.

(10) Patent No.: US 9,372,259 B2
(45) Date of Patent: Jun. 21, 2016

(54) RADAR APPARATUS

(75) Inventors: Takaaki Kishigami, Tokyo (JP);
Hirohito Mukai, Tokyo (JP); Tadashi Morita, Kanagawa (JP)

(73) Assignee: Panasonic Corporation, Osaka (JP)

( * ) Notice: Subject to any disclaimer, the term of this patent is extended or adjusted under 35 U.S.C. 154(b) by 385 days.

(21) Appl. No.: 14/123,685

(22) PCT Filed: Aug. 9, 2012

(86) PCT No.: PCT/JP2012/005084
§ 371 (c)(1),
(2), (4) Date: Dec. 3, 2013

(87) PCT Pub. No.: WO2013/024583
PCT Pub. Date: Feb. 21, 2013

(65) Prior Publication Data
US 2014/0111367 A1      Apr. 24, 2014

(30) Foreign Application Priority Data

Aug. 12, 2011   (JP) .................................. 2011-176974

(51) Int. Cl.
*G01S 7/28*         (2006.01)
*G01S 13/26*        (2006.01)
(Continued)

(52) U.S. Cl.
CPC ............... *G01S 13/0209* (2013.01); *G01S 7/28* (2013.01); *G01S 7/282* (2013.01); *G01S 7/2813* (2013.01);
(Continued)

(58) Field of Classification Search
CPC ......... G01S 7/28; G01S 7/2813; G01S 7/282; G01S 7/292; G01S 7/34; G01S 13/28–13/288; G01S 13/325

USPC .............. 342/21, 70–72, 102, 107–109, 342/128–139, 189
See application file for complete search history.

(56) References Cited

U.S. PATENT DOCUMENTS 4,153,900 A * 5/1979 Novak .................. G01S 13/288
                                          342/132
4,156,876 A * 5/1979 Debuisser ............. G01S 13/288
                                          333/166
(Continued)

FOREIGN PATENT DOCUMENTS

CN          1152357 A       6/1997
CN          1673770 A       9/2005
(Continued)

OTHER PUBLICATIONS

International Search Report, mailed Nov. 13, 2012, for PCT/JP2012/005084, 4 pages.
(Continued)

*Primary Examiner* — Peter Bythrow
(74) *Attorney, Agent, or Firm* — Seed IP Law Group PLLC

(57) ABSTRACT

A pulse transmission controller generates transmission timing signals for a high-frequency radar transmission signal in every transmission cycle. A transmission phase shifter gives a transmission signal generated by a modulator phase shifts each corresponding to a transmission cycle on the basis of the transmission timing signals generated at intervals that are equal to the transmission cycle. A reception phase shifter gives a reception signal that is output from an A/D converter reception phase shifts that are opposite in direction to the respective transmission phase shifts given by the transmission phase shifter on the basis of the transmission timing signals generated at intervals that are equal to the transmission cycle.

14 Claims, 35 Drawing Sheets

(51) Int. Cl.
  *G01S 13/28* (2006.01)
  *G01S 13/02* (2006.01)
  *G01S 7/282* (2006.01)
  *G01S 7/292* (2006.01)

(52) U.S. Cl.
  CPC ............ *G01S 7/292* (2013.01); *G01S 13/26* (2013.01); *G01S 13/28* (2013.01); *G01S 13/284* (2013.01); *G01S 13/288* (2013.01)

(56) References Cited

U.S. PATENT DOCUMENTS

| | | | | |
|---|---|---|---|---|
| 4,983,979 A * | 1/1991 | McKenzie | G01S 13/30 | 342/131 |
| 5,075,863 A * | 12/1991 | Nagamune | B22D 2/003 | 342/130 |
| 5,151,702 A * | 9/1992 | Urkowitz | G01S 13/522 | 342/116 |
| 5,191,347 A * | 3/1993 | Ishikawa | G01S 13/582 | 342/108 |
| 5,289,188 A * | 2/1994 | Chudleigh, Jr. | G01S 13/288 | 342/132 |
| 5,376,939 A * | 12/1994 | Urkowitz | G01S 7/42 | 342/134 |
| 5,440,311 A * | 8/1995 | Gallagher | G01S 13/522 | 342/132 |
| 5,790,067 A * | 8/1998 | Van Ommeren | G01S 7/36 | 242/102 |
| 5,861,834 A * | 1/1999 | Sauer | G01S 13/222 | 342/13 |
| 5,986,602 A * | 11/1999 | Frink | G01S 7/2923 | 342/126 |
| 6,359,525 B1 * | 3/2002 | Mohan | H04L 5/02 | 329/312 |
| 6,657,704 B2 * | 12/2003 | Shirai | G01S 17/36 | 342/135 |
| 7,072,427 B2 * | 7/2006 | Rawlins | H03G 3/20 | 375/345 |
| 8,040,935 B2 * | 10/2011 | Song | H04B 1/707 | 375/146 |
| 8,811,467 B2 * | 8/2014 | Vierinen | G01S 13/288 | 341/178 |
| 9,128,182 B2 * | 9/2015 | Kishigami | G01S 7/288 | |
| 2002/0175850 A1 * | 11/2002 | Barnes | G01S 13/0209 | 342/22 |
| 2002/0186362 A1 * | 12/2002 | Shirai | G01S 17/36 | 356/5.05 |
| 2005/0206556 A1 * | 9/2005 | Isaji | G01S 7/354 | 342/149 |
| 2005/0275583 A1 * | 12/2005 | Mikami | G01S 7/285 | 342/109 |
| 2009/0015464 A1 * | 1/2009 | Fukuda | G01S 7/325 | 342/194 |
| 2009/0079617 A1 * | 3/2009 | Shirakawa | G01S 13/325 | 342/146 |
| 2010/0061427 A1 * | 3/2010 | Lopez-Risueno | G01C 21/206 | 375/150 |
| 2010/0195699 A1 * | 8/2010 | Liu | H04B 1/7176 | 375/130 |
| 2011/0317782 A1 * | 12/2011 | Vierinen | G01S 13/288 | 375/295 |
| 2012/0050103 A1 * | 3/2012 | Revol | G01S 19/21 | 342/357.68 |
| 2013/0147655 A1 * | 6/2013 | Kishigami | G01S 13/284 | 342/135 |
| 2013/0176166 A1 * | 7/2013 | Kishigami | G01S 7/023 | 342/202 |

FOREIGN PATENT DOCUMENTS

| | | |
|---|---|---|
| CN | 101059563 A | 10/2007 |
| EP | 1 865 337 A1 | 12/2007 |
| JP | 02-243022 A | 9/1990 |
| JP | 4-357485 A | 12/1992 |
| JP | 10-268040 A | 10/1998 |
| JP | 2000-338226 A | 12/2000 |
| JP | 2005-321359 A | 11/2005 |
| JP | 2005-351862 A | 12/2005 |
| JP | 2008-256568 A | 10/2008 |
| JP | 2010-230643 A | 10/2010 |
| JP | 2011-107165 A | 6/2011 |
| WO | 2009/092393 A1 | 7/2009 |

OTHER PUBLICATIONS

Choi et al., "RF impairment models for 60GHz-band SYS/PHY simulation," IEEE P802.15 Working Group for Wireless Personal Area Networks (WPANS), IEEE 802.15-06-0477-01-003c, Nov. 2006, 17 pages.

Egashira et al., "A Novel IQ Imbalance Compensation Method with Pilot-Signals for OFDM System," Institute of Electronics, Information and Communication Engineers B vol. J91-B, No. 5, pp. 558-565, 2008.

* cited by examiner (a)

(b)

(c)

RADAR APPARATUS

TECHNICAL FIELD

The present invention relates to a radar apparatus which detects a target by receiving, with an antenna, a pulse signal of reflection waves reflected by the target.

BACKGROUND ART

Radar apparatus measure at least one of a distance between a target and a measuring place and a direction of the target as viewed from the measuring place by radiating radio waves to the space from the measuring place on the basis of a pulse signal and receiving a pulse signal of reflection waves reflected by the target. In recent years, radar apparatus which can detect targets including automobiles and pedestrians by a high-resolution measurement using short-wavelength radio waves such as microwaves or millimeter waves have been being developed.

Radar apparatus receive a signal that is a mixture of reflection waves coming from a nearby target and reflection waves coming from a distant target. In particular, range sidelobes occur due to a signal of reflection waves coming from a nearby target. Where range sidelobes and a main lobe of a signal of reflection waves coming from a distant target exist in mixture, the accuracy of detection of the distant target by a radar apparatus may be lowered.

Therefore, radar apparatus which use a pulse signal and are required to perform high-resolution measurement on plural targets are required to transmit a pulse wave or a pulse-modulated wave having an autocorrelation characteristic with low range sidelobe levels (hereinafter referred to as low range sidelobe characteristic).

When an automobile and a pedestrian are located at the same distance from a measuring place, a radar apparatus receives a signal that is a mixture of signals of reflection waves coming from the automobile and the pedestrian which have different radar cross sections (RCSs). This is because in general the radar cross section of a pedestrian is smaller than that of an automobile.

Therefore, radar apparatus are required to properly receive reflection wave signals coming from an automobile and a pedestrian even if they are located at the same distance from a measuring place. Since the output level (reception level) of a reflection wave signal varies depending on the distance or type of a target, radar apparatus are required to have a reception dynamic range that enables reception of reflection wave signals of various reception levels.

Where a high-frequency signal such as a millimeter wave signal is used in conventional radar apparatus that exhibit a low range sidelobe characteristic, circuit errors (e.g., phase errors) are mixed into an RF (radio frequency) circuit and an analog baseband circuit that are provided in a radar transmitter and a radar receiver. As a result, such radar apparatus are lowered in target ranging performance than ones having an ideal characteristic that is free of circuit errors.

In connection with the above problem, Patent document 1, for example, discloses an A/D conversion circuit in which a highpass filter is disposed downstream of an AD converter and a DC offset is thereby eliminated. Furthermore, Patent document 2 discloses a radar apparatus in which a bandpass filter is provided in the input stage of an AD converter and a DC offset is thereby eliminated. Non-patent document 2 discloses a circuit configuration for correction of IQ imbalance circuit errors.

PRIOR ART DOCUMENTS

Patent Documents

Patent document 1: JP-A-2-243022
Patent document 2: JP-A-2000-338226

Non-Patent Documents

Non-patent document 1: Chang-Soon Choi et al., "RF Impairment models for 60 GHz-hand SYS/PHY simulation," IEEE 802.15-06-0477-01-003c, November, 2006.
Non-patent document 2: Yoshimasa Egashira et al., "IQ Imbalance Compensation Method Using a Pilot Signal in an OFDM System," The Transactions of the Institute of Electronics, Information and Communication Engineers B, Vol. J91-B, No. 5, pp. 558-565, 2008.

SUMMARY OF THE INVENTION

Problems to be Solved by the Invention

However, radar apparatus are made complex in circuit configuration if a highpass filter or a bandpass filter is provided to eliminate a DC offset as in Patent document 1 or 2 or an IQ imbalance correction circuit is provided to correct IQ imbalance as in Non-patent document 2.

This disclosure has been made in the above circumstances of the art, and an object of the present invention is to provide a radar apparatus which prevents increase of range sidelobes and suppresses degradation of target ranging performance effectively even in the case where circuit errors such as a DC offset or IQ imbalance occur.

Means for Solving the Problems

A radar apparatus of the above kind is disclosed which comprises a pulse transmission controller that generates transmission timing signals for a high-frequency radar transmission signal in every transmission cycle; at least one code generator that generates at least one code sequence having a prescribed code length; a modulator that generates a baseband transmission signal by modulating the at least one code sequence on the basis of the transmission timing signals; a transmission phase shifter that gives the baseband transmission signal phase shifts each corresponding to at least one transmission cycle on the basis of the transmission timing signals; and an RF transmitter that converts a phase-shift-added transmission signal into the high-frequency radar transmission signal and transmitting the latter from a transmission antenna.

Advantages of the Invention

This disclosure can prevent increase of range sidelobes and suppress degradation of the target ranging performance effectively without the need for employing a circuit error correction circuit even in the case where circuit errors such as a DC offset or IQ imbalance occur.

BRIEF DESCRIPTION OF THE DRAWINGS

FIG. 1(a) illustrates an autocorrelation calculation result of one of a pair of complementary code sequences. FIG. 1(b) illustrates an autocorrelation calculation result of the other of the pair of complementary code sequences, and FIG.

1(c) illustrates addition values of the autocorrelation calculation results of the pair of complementary code sequences.

Figure 2:
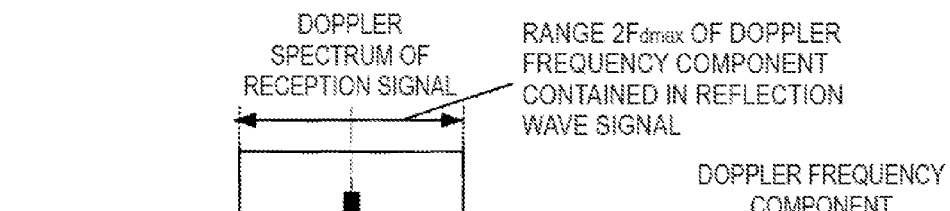
Figure 2:
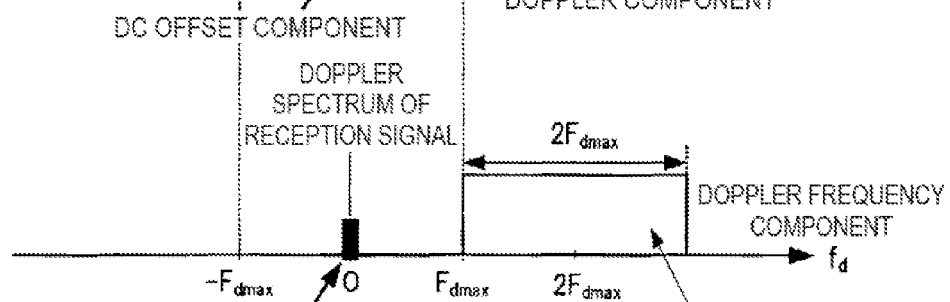
Figure 2:
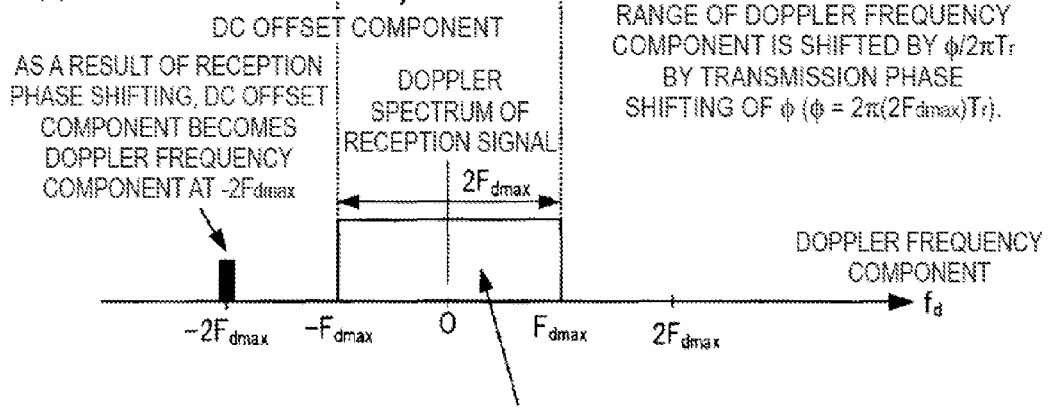

[FIG. 2] FIG. 2(a) illustrates a relationship between a DC offset component and a Doppler frequency component which are contained in a reception signal of a conventional radar apparatus, FIG. 2(b) illustrates a relationship between a DC offset component and a Doppler frequency component which are contained in a reception signal of a radar apparatus of this disclosure before reception phase shifting, and FIG. 2(c) illustrates a relationship between a DC offset component and a Doppler frequency component which are contained in a reception signal of the radar apparatus of this disclosure after the reception phase shifting.

Figure 3:
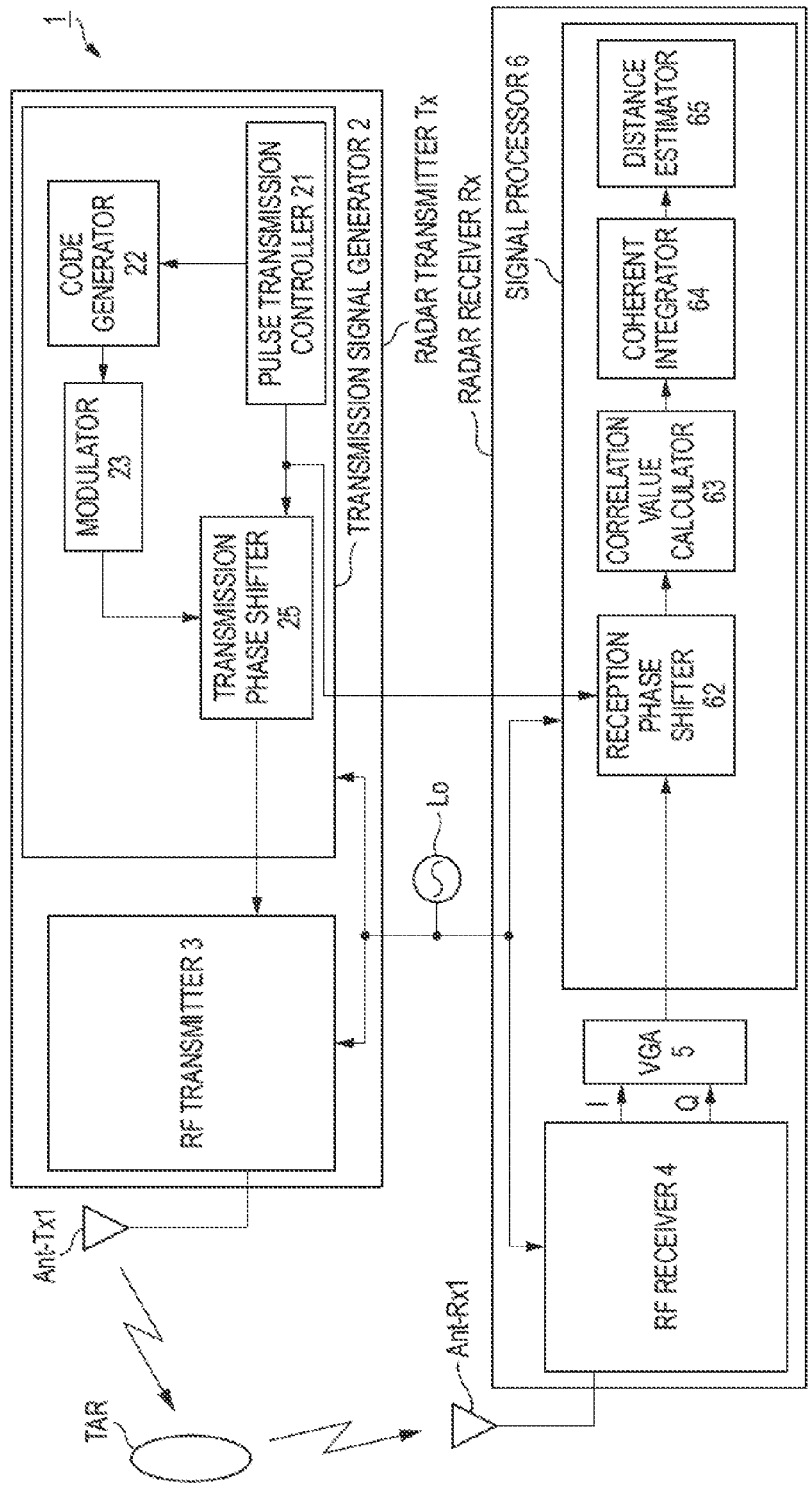

[FIG. 3] FIG. 3 is a block diagram showing, in a simplified manner, the internal configuration of a radar apparatus according to a first embodiment.

Figure 4:
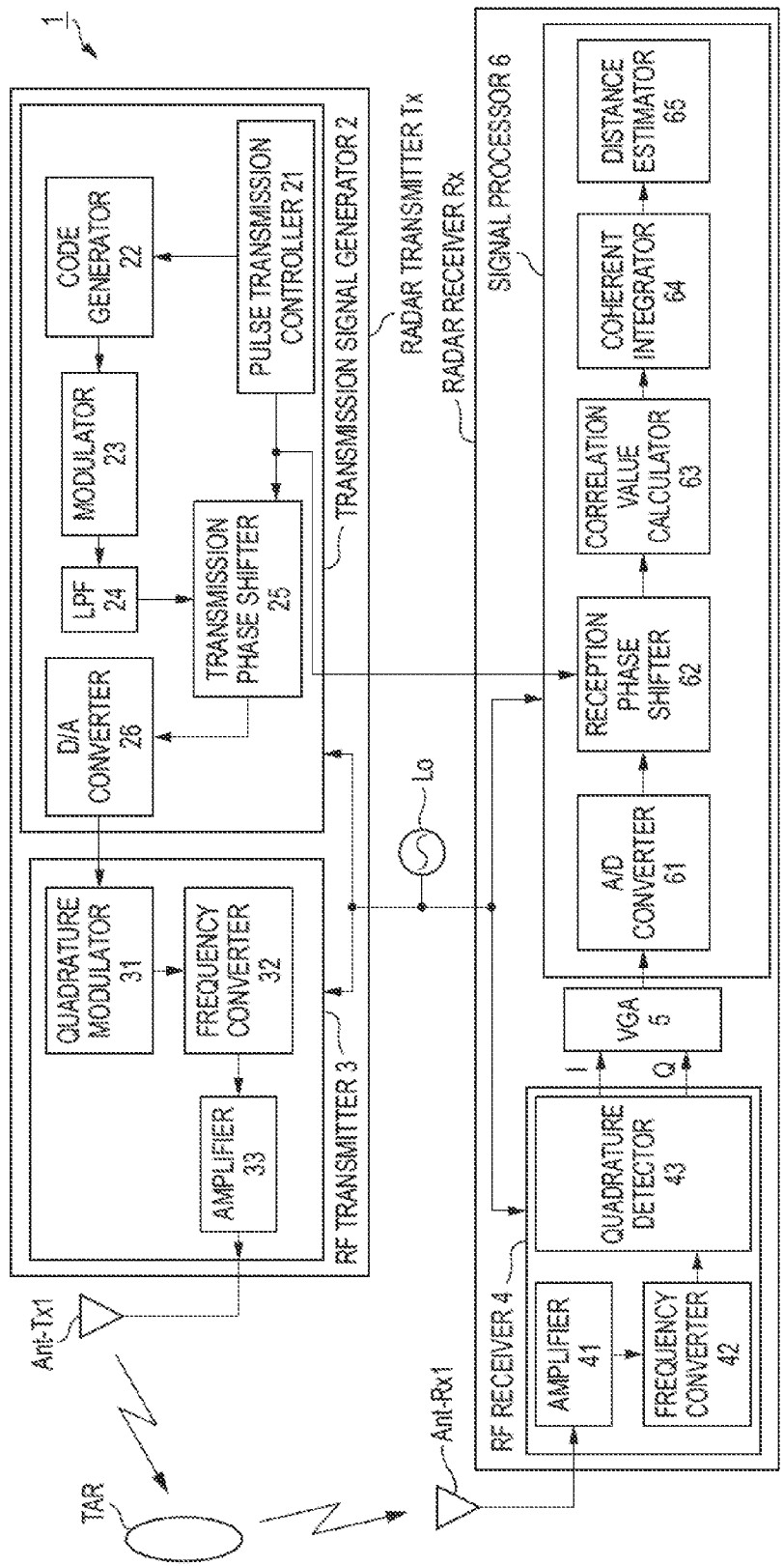

[FIG. 4] FIG. 4 a block diagram showing, in detail, the internal configuration of the radar apparatus according to the first embodiment.

Figure 5:
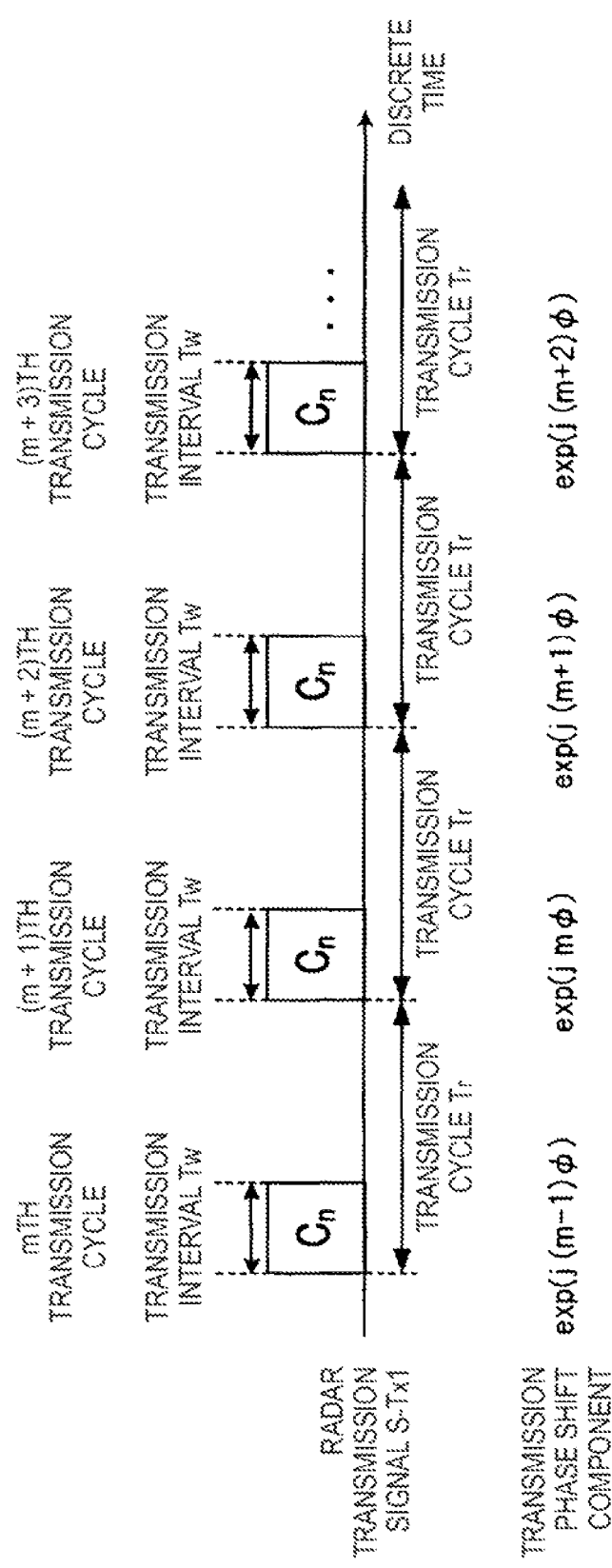

[FIG. 5] FIG. 5 illustrates relationships between transmission intervals, transmission cycles, and transmission phase shift components of a radar transmission signal.

Figure 6:
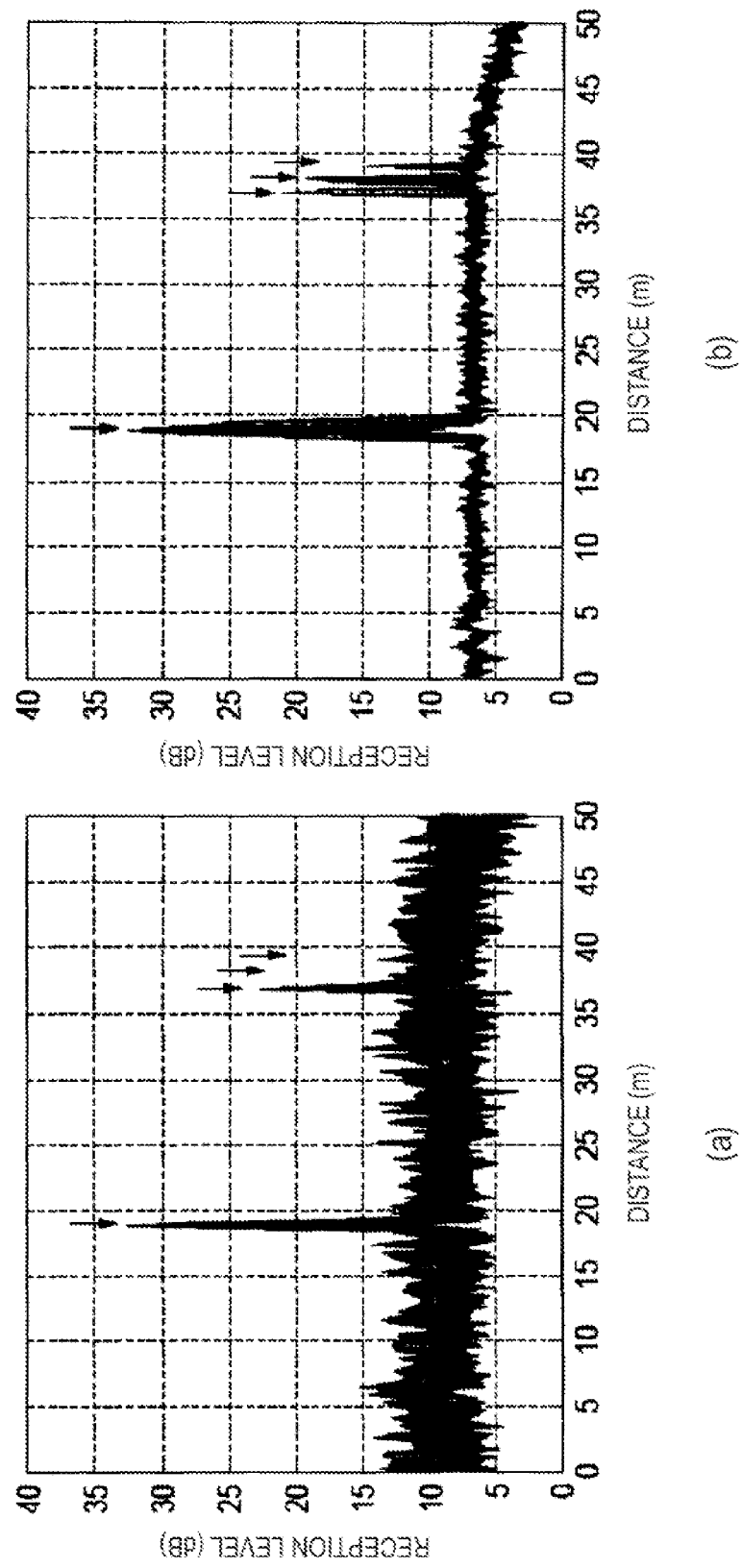

[FIG. 6] FIG. 6(a) is a graph showing a simulation result of a target ranging characteristic of a conventional radar apparatus, and FIG. 6(b) is a graph showing a simulation result of a target ranging characteristic of the radar apparatus according to the first embodiment in a case that a phase rotation amount 45° is given in each transmission cycle.

Figure 7:
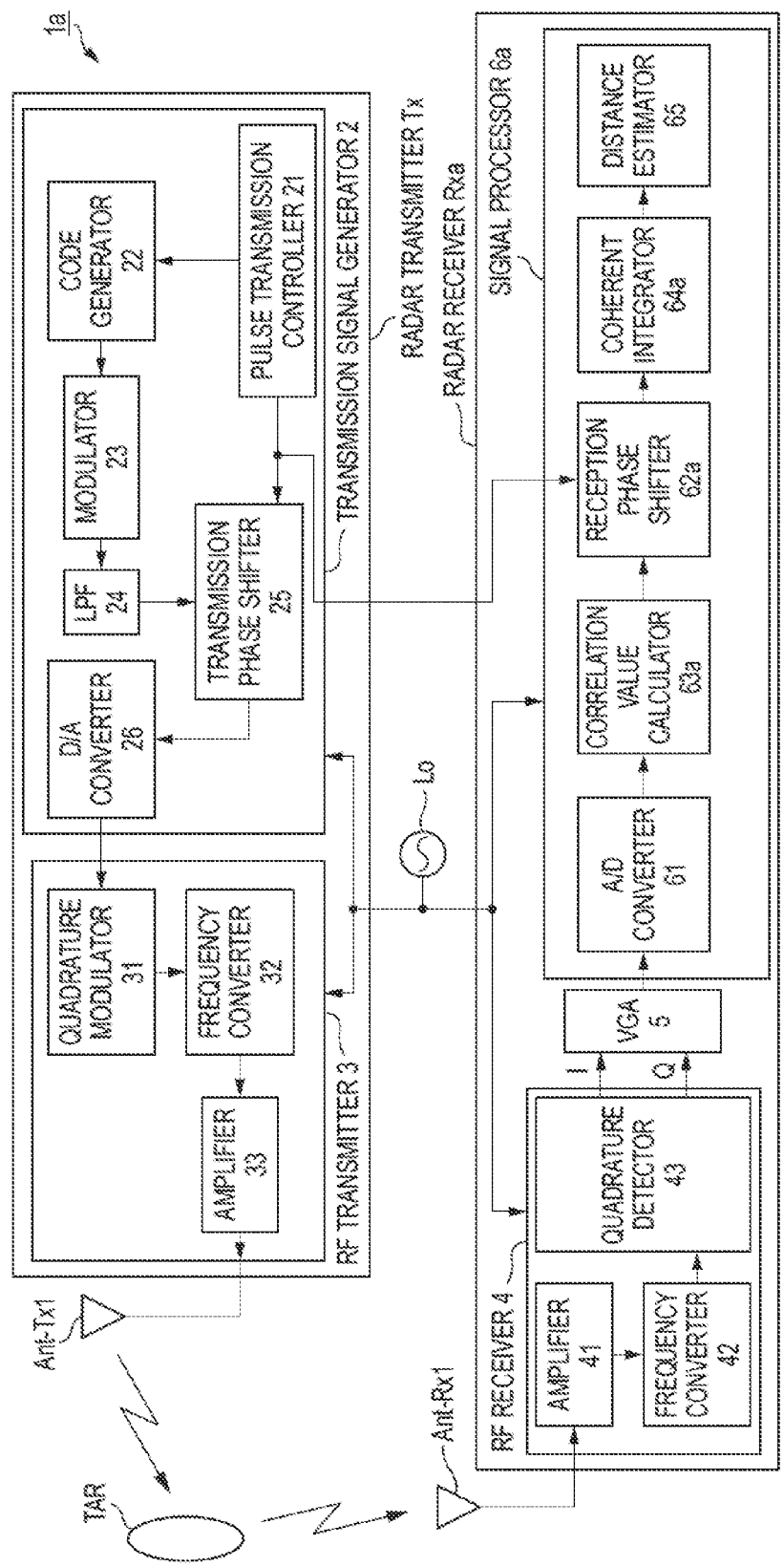

[FIG. 7] FIG. 7 is a block diagram showing, in detail, the internal configuration of a radar apparatus according to a first modification of the first embodiment.

Figure 8:
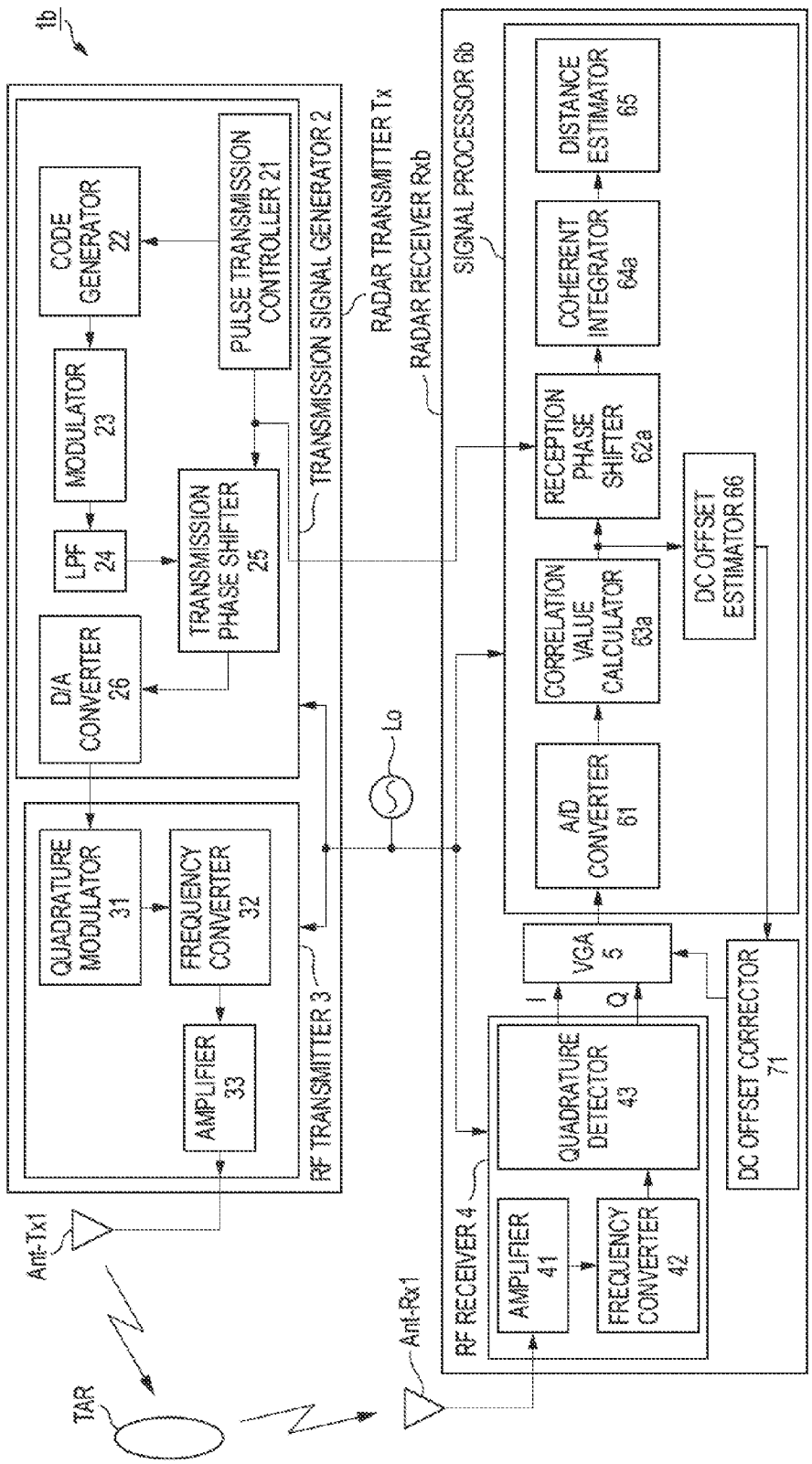

[FIG. 8] FIG. 8 is a block diagram showing, in detail, the internal configuration of a radar apparatus according to a second modification of the first embodiment.

Figure 9:
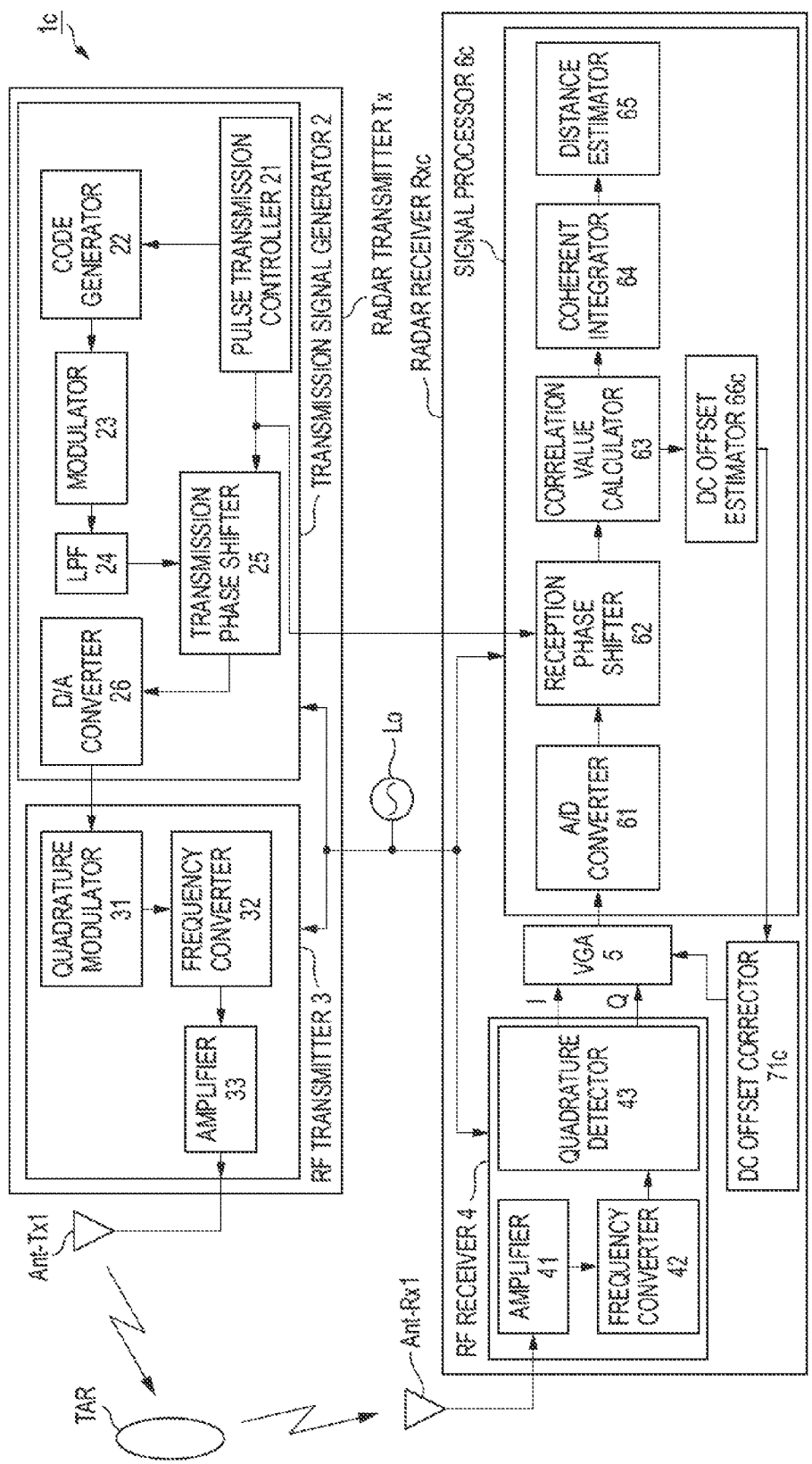

[FIG. 9] FIG. 9 is a block diagram showing, in detail, the internal configuration of a radar apparatus according to a third modification of the first embodiment.

Figure 10:
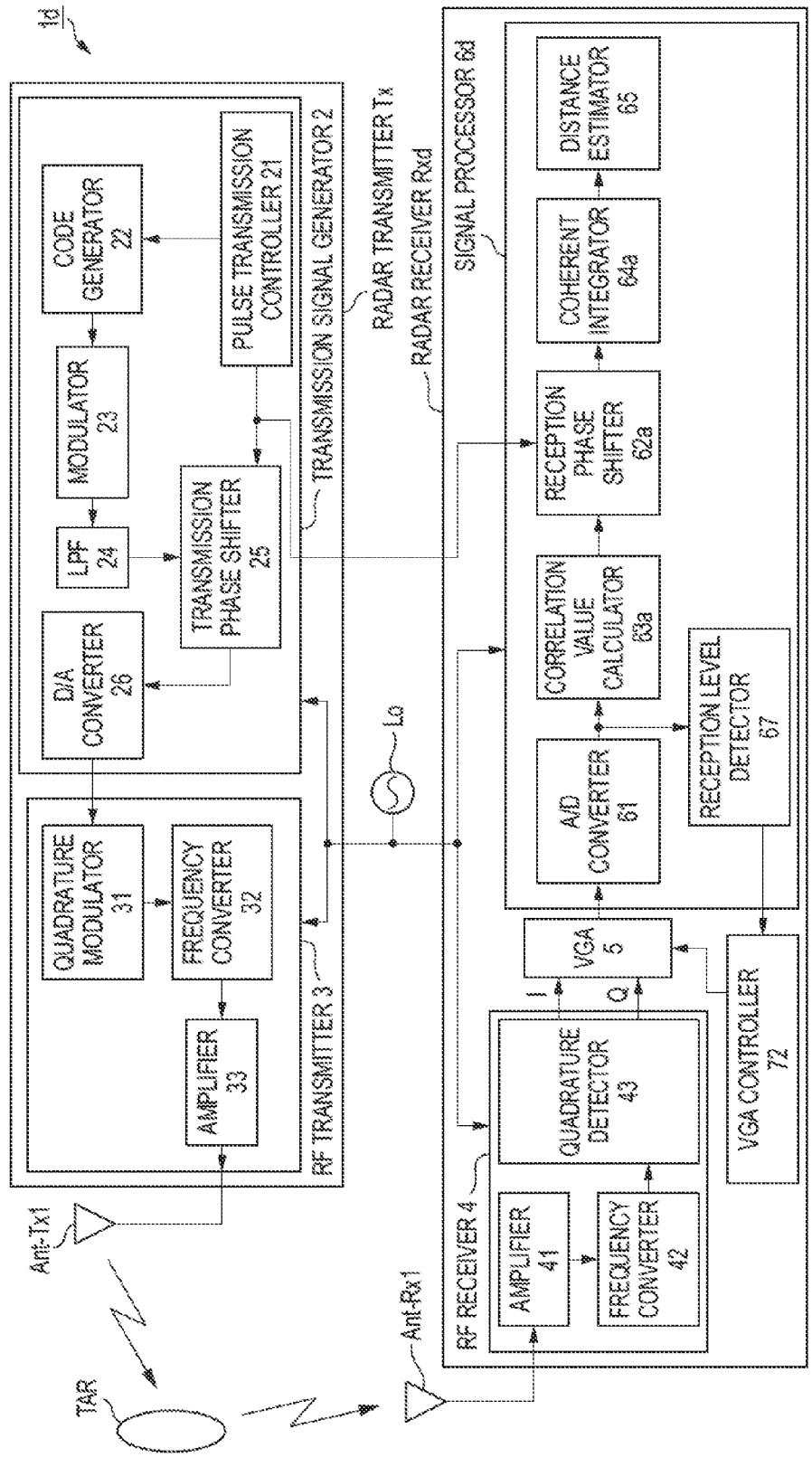

[FIG. 10] FIG. 10 is a block diagram showing, in detail, the internal configuration of a radar apparatus according to a fourth modification of the first embodiment.

Figure 11:
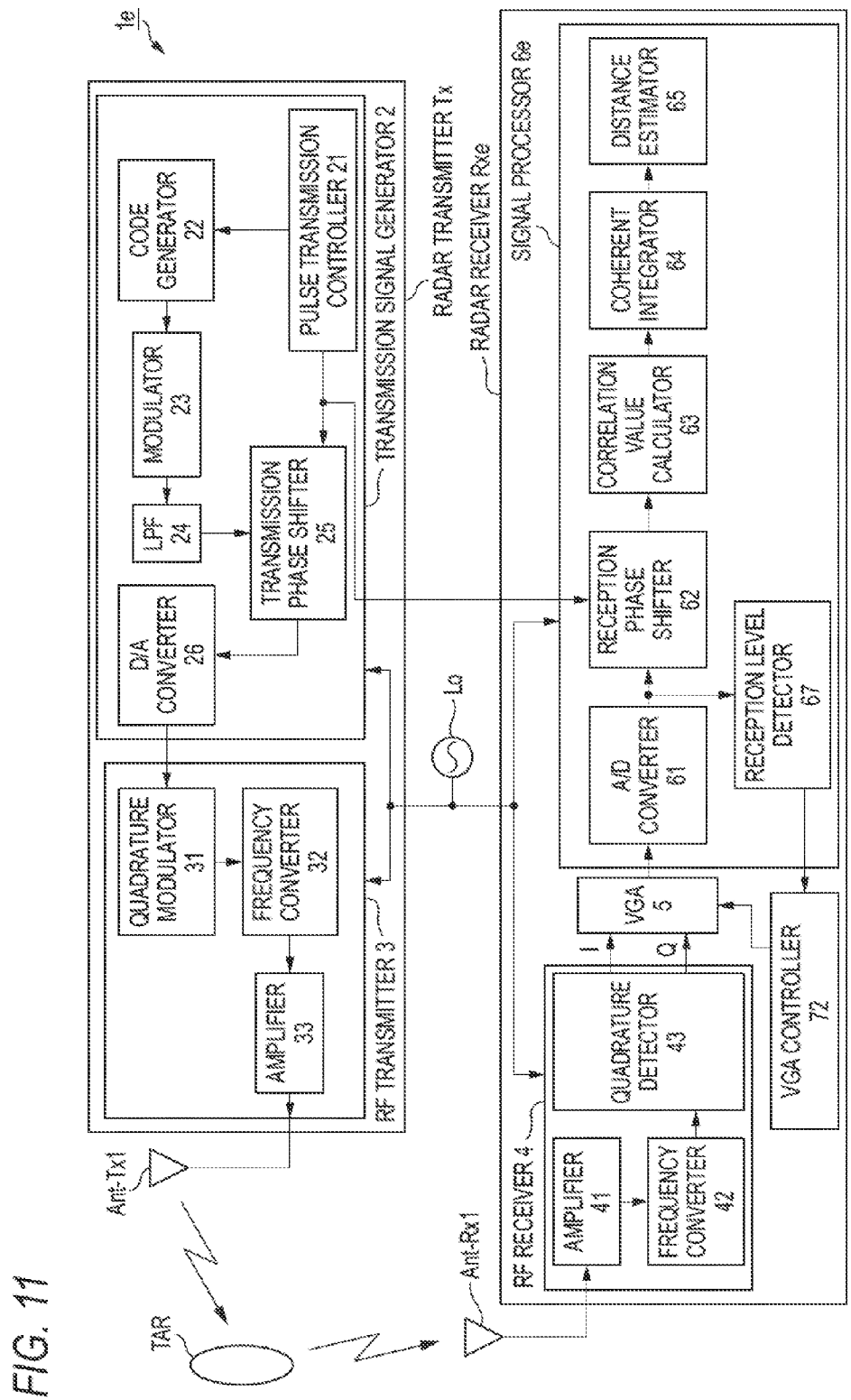

[FIG. 11] FIG. 11 is a block diagram showing, in detail, the internal configuration of a radar apparatus according to a fifth modification of the first embodiment.

Figure 12:
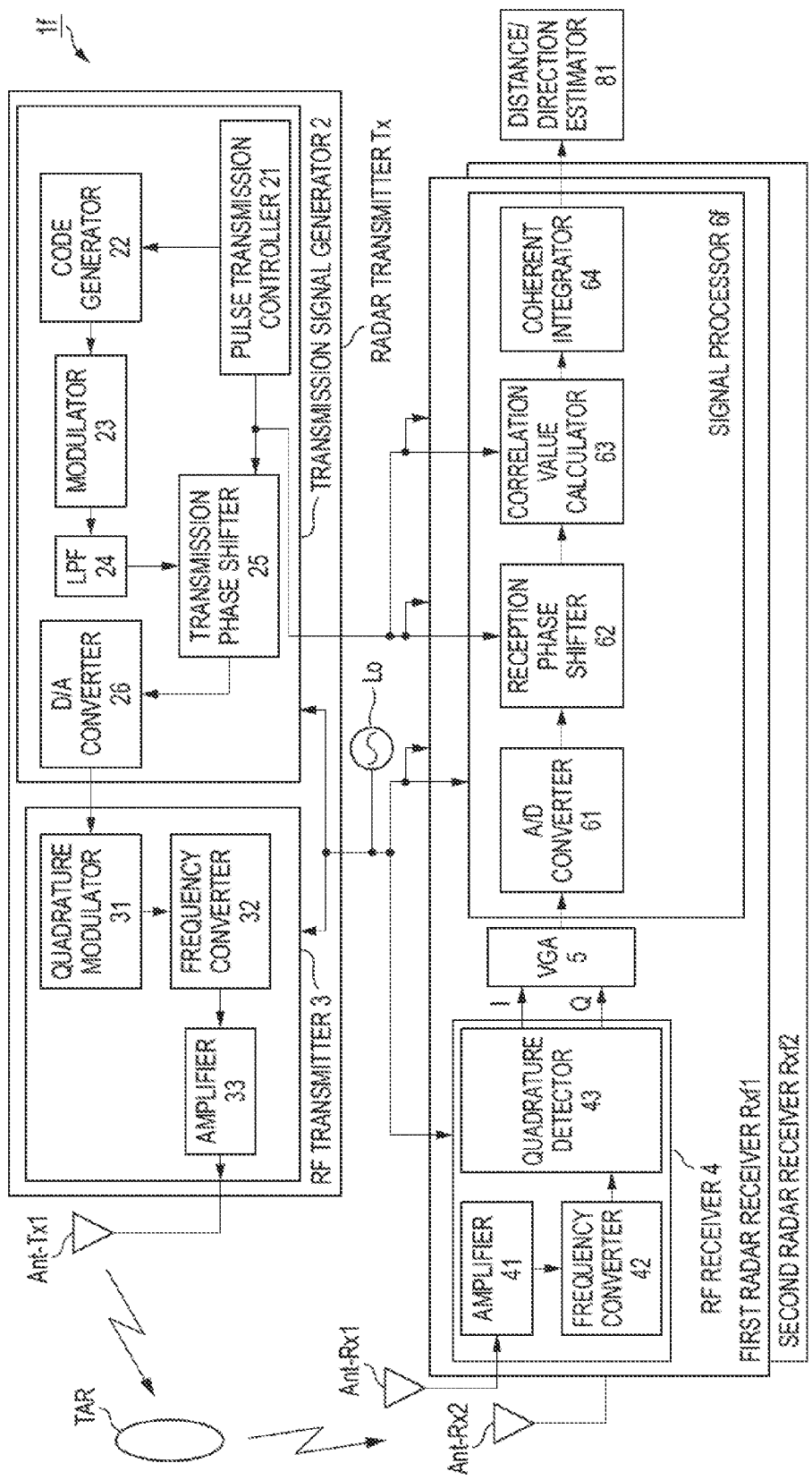

[FIG. 12] FIG. 12 is a block diagram showing, in detail, the internal configuration of a radar apparatus according to a sixth modification of the first embodiment.

Figure 13:
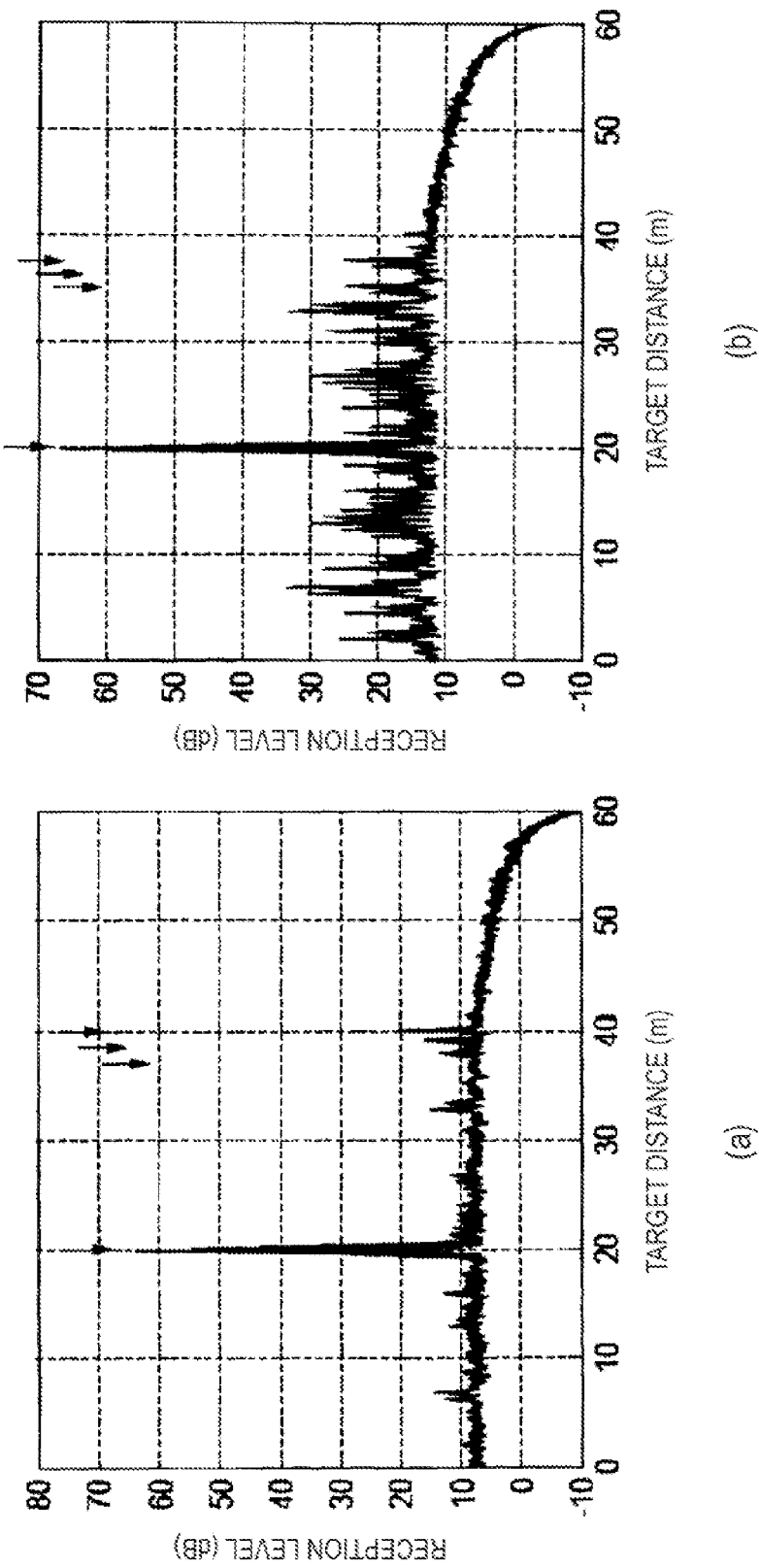

[FIG. 13] FIG. 13(a) is a graph showing a simulation result of a target ranging characteristic in a case that a complementary code is used as a transmission code and the phase rotation angle of transmission phase shifting is set at 45°, and FIG. 13(b) is a graph showing a simulation result of a target ranging characteristic in a case that a complementary code is used as a transmission code and the phase rotation angle of transmission phase shifting is set at 90°.

Figure 14:
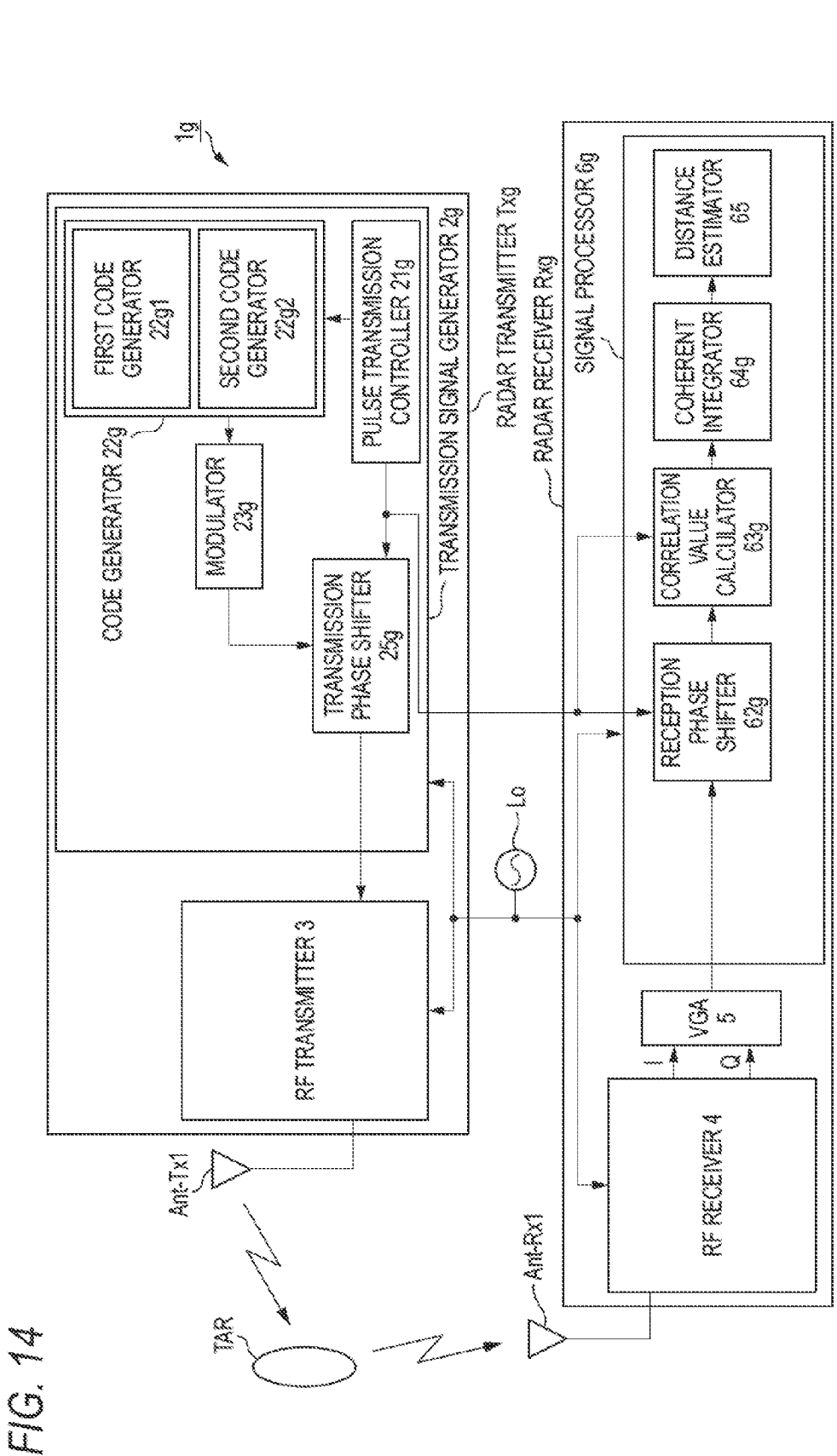

[FIG. 14] FIG. 14 is a block diagram showing, in a simplified manner, the internal configuration of a radar apparatus according to the second embodiment.

Figure 15:
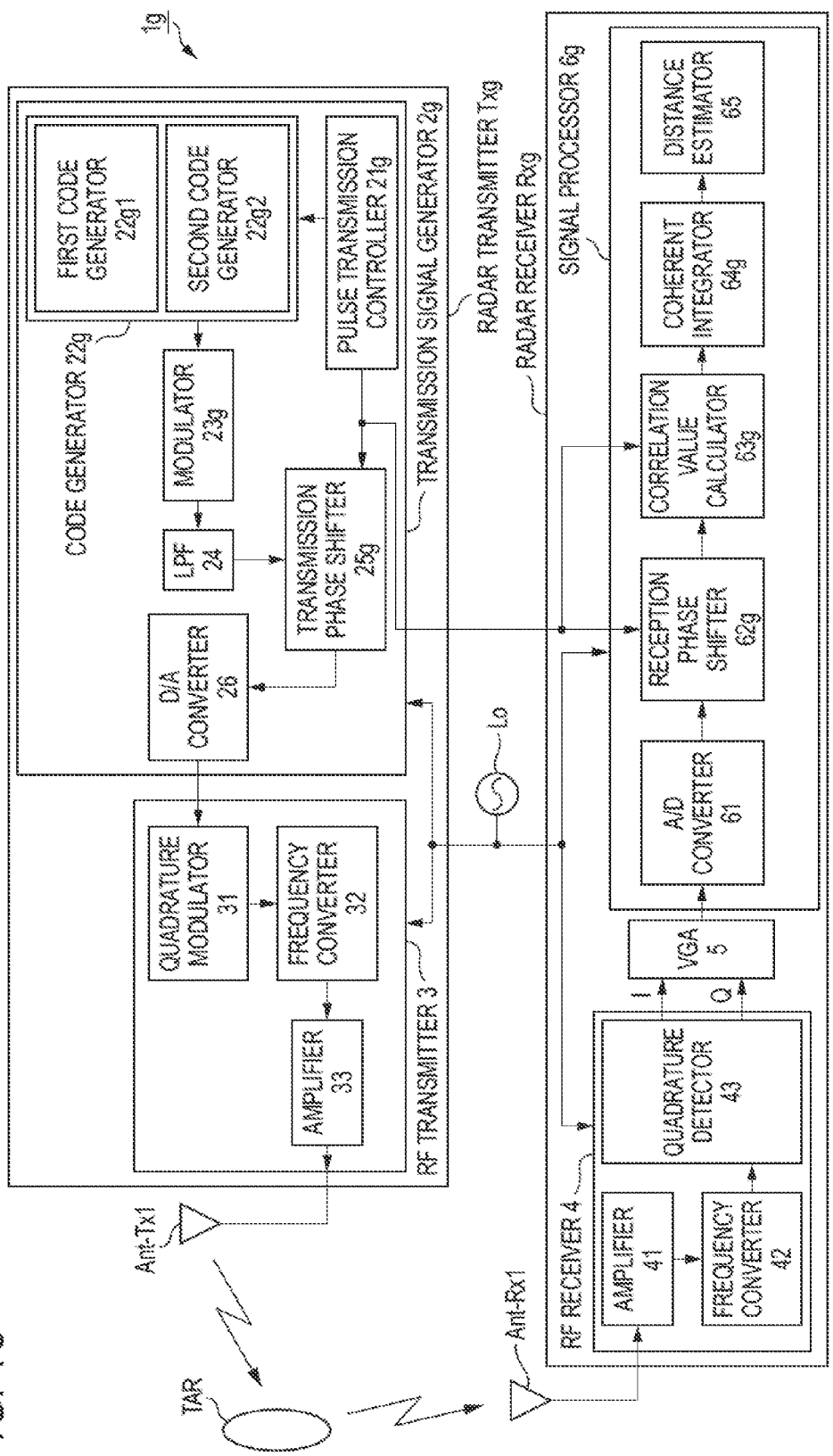

[FIG. 15] FIG. 15 is a block diagram showing, in detail, the internal configuration of the radar apparatus according to the second embodiment.

Figure 16:
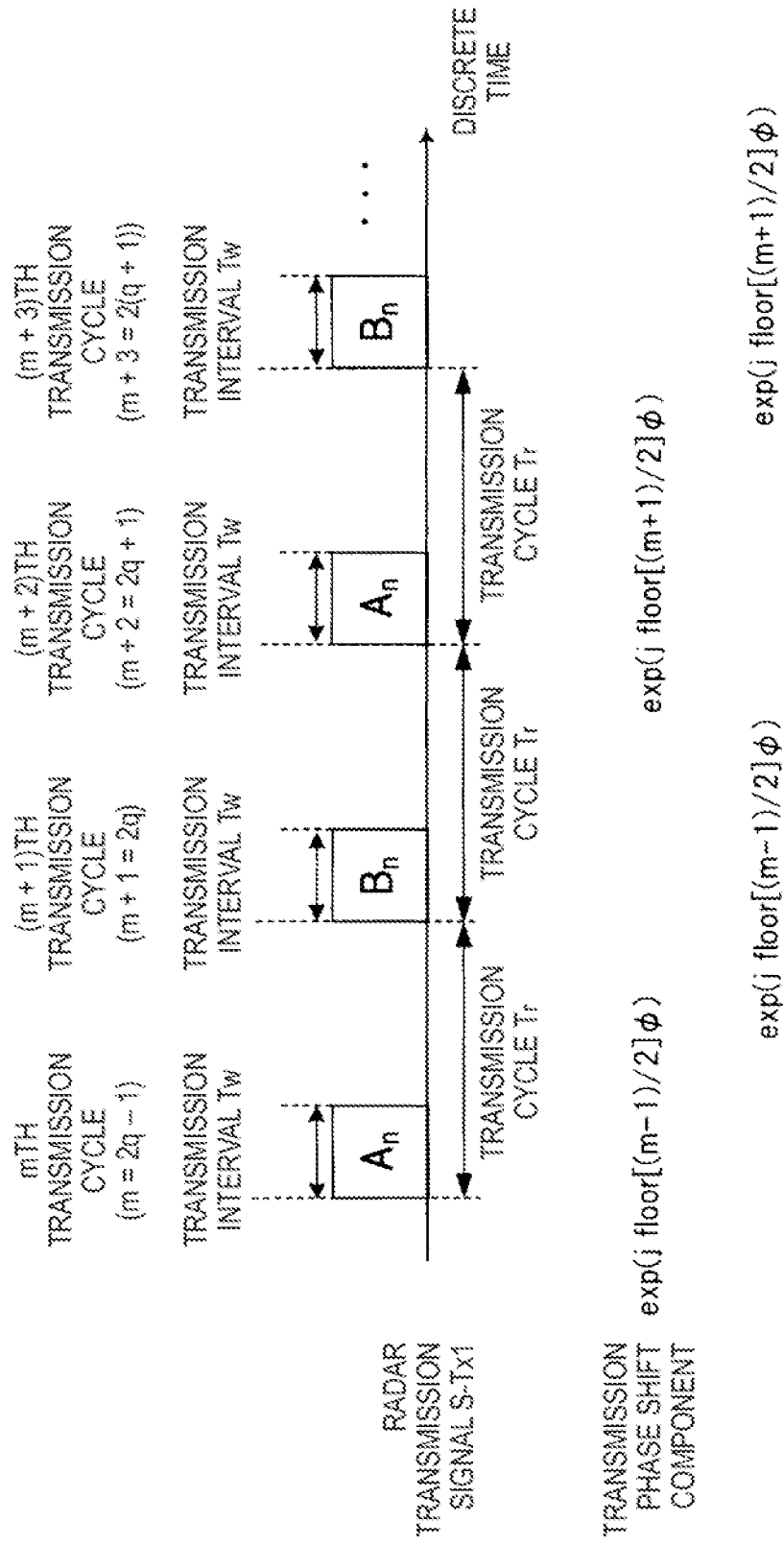

[FIG. 16] FIG. 16 illustrates relationships between transmission intervals, transmission cycles, and transmission phase shift components of a radar transmission signal in a case that time-division transmission is done at intervals of two transmission cycles using a complementary code as a transmission code.

Figure 17:
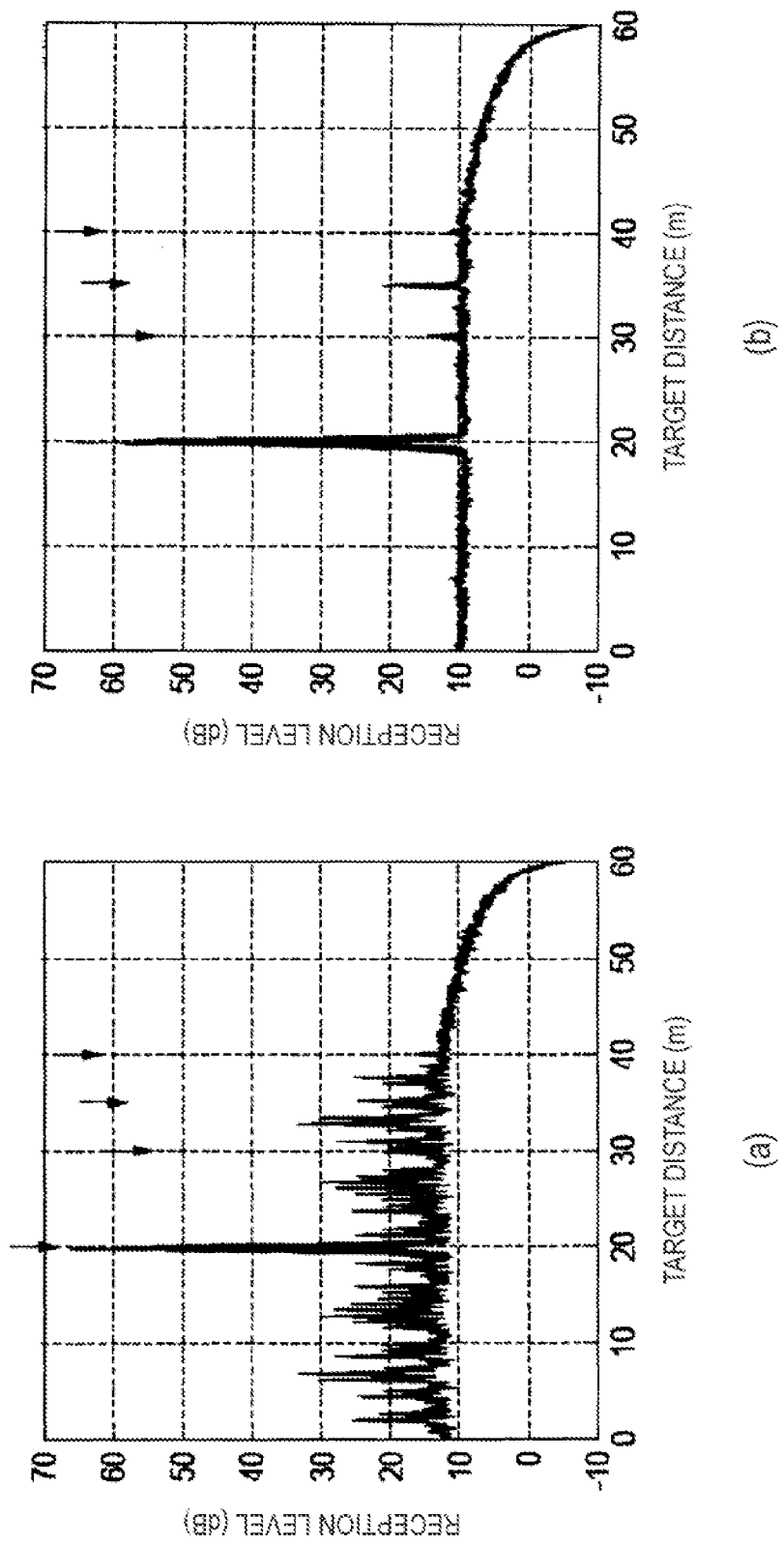

[FIG. 17] FIG. 17(a) is a graph showing a simulation result of a target ranging characteristic of a conventional radar apparatus, and FIG. 17(b) is a graph showing a simulation result of a target ranging characteristic of the radar apparatus according to the second embodiment in a case that a phase rotation amount 90° is given in each transmission cycle.

Figure 18:
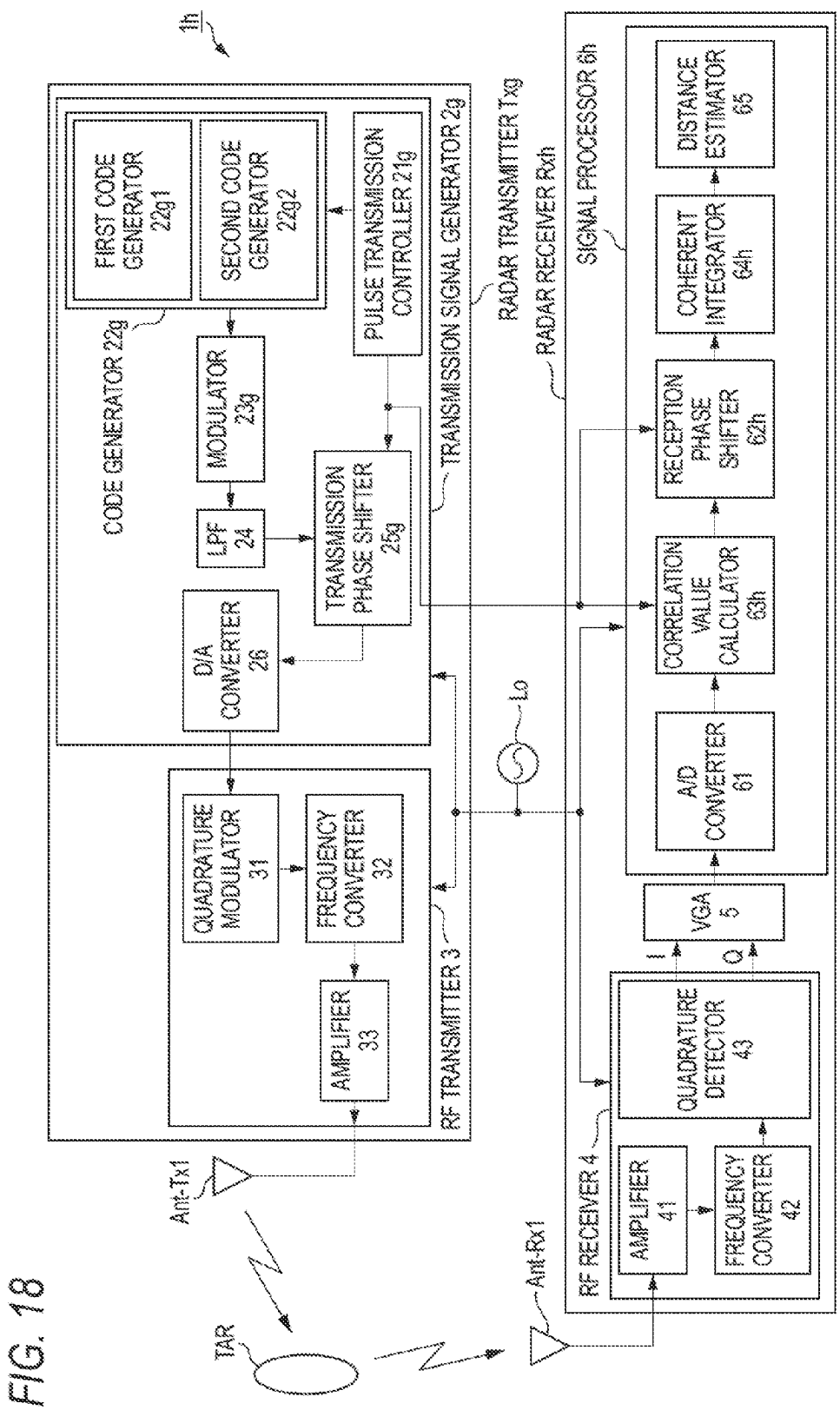

[FIG. 18] FIG. 18 is a block diagram showing, in detail, the internal configuration of a radar apparatus according to a first modification of the second embodiment.

Figure 19:
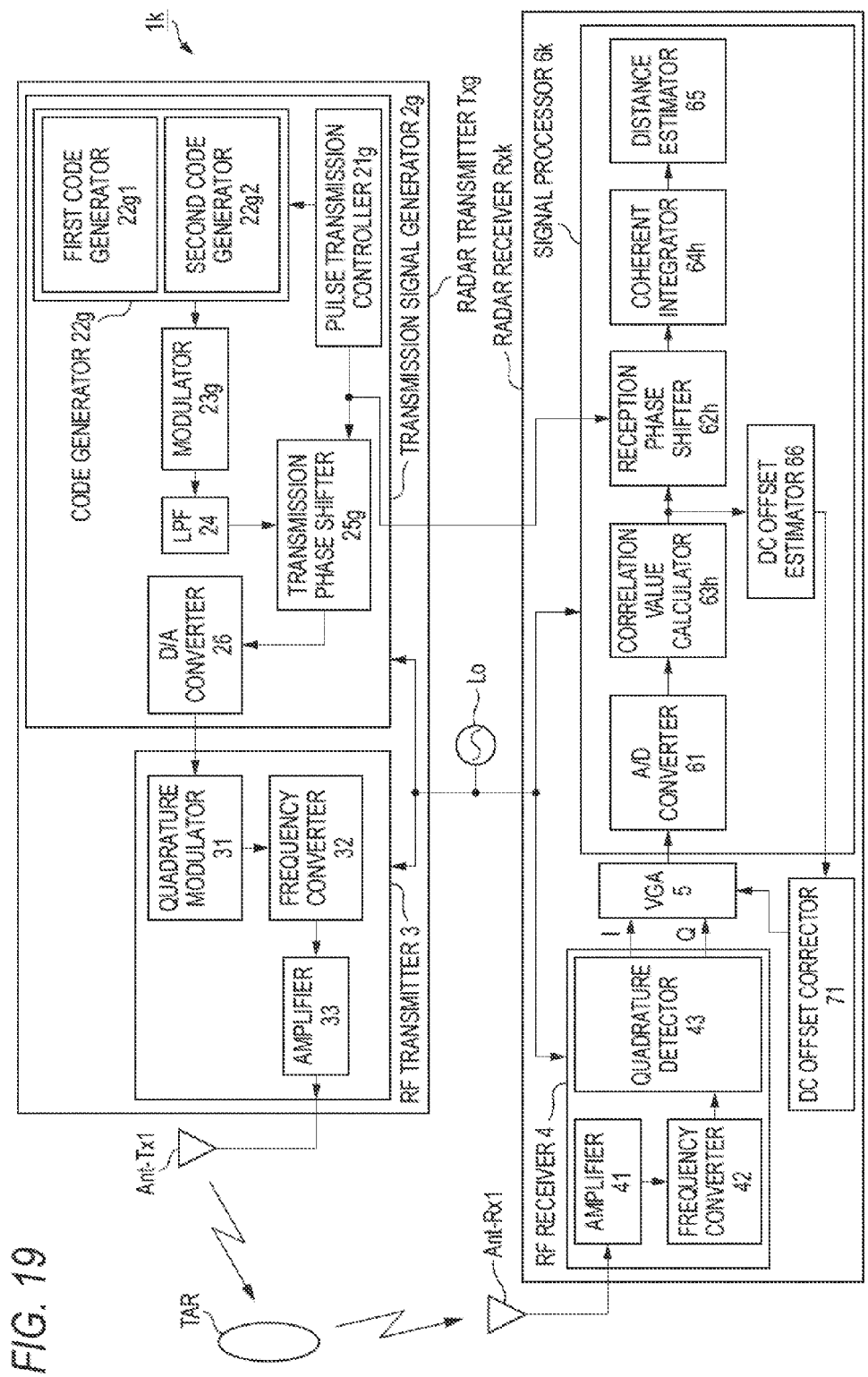

[FIG. 19] FIG. 19 is a block diagram showing, in detail, the internal configuration of a radar apparatus according to a second modification of the second embodiment.

Figure 20:
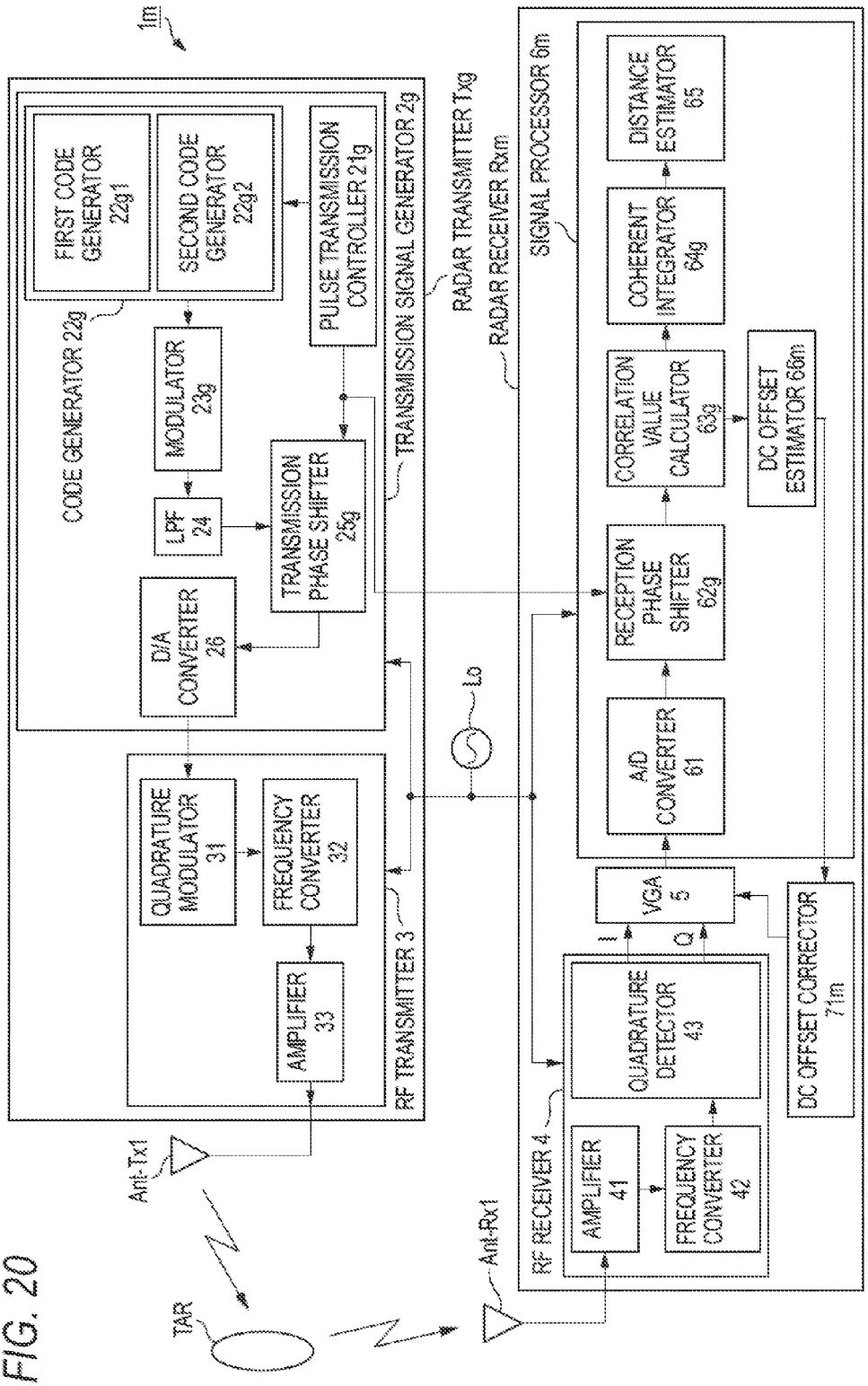

[FIG. 20] FIG. 20 is a block diagram showing, in detail, the internal configuration of a radar apparatus according to a third modification of the second embodiment.

Figure 21:
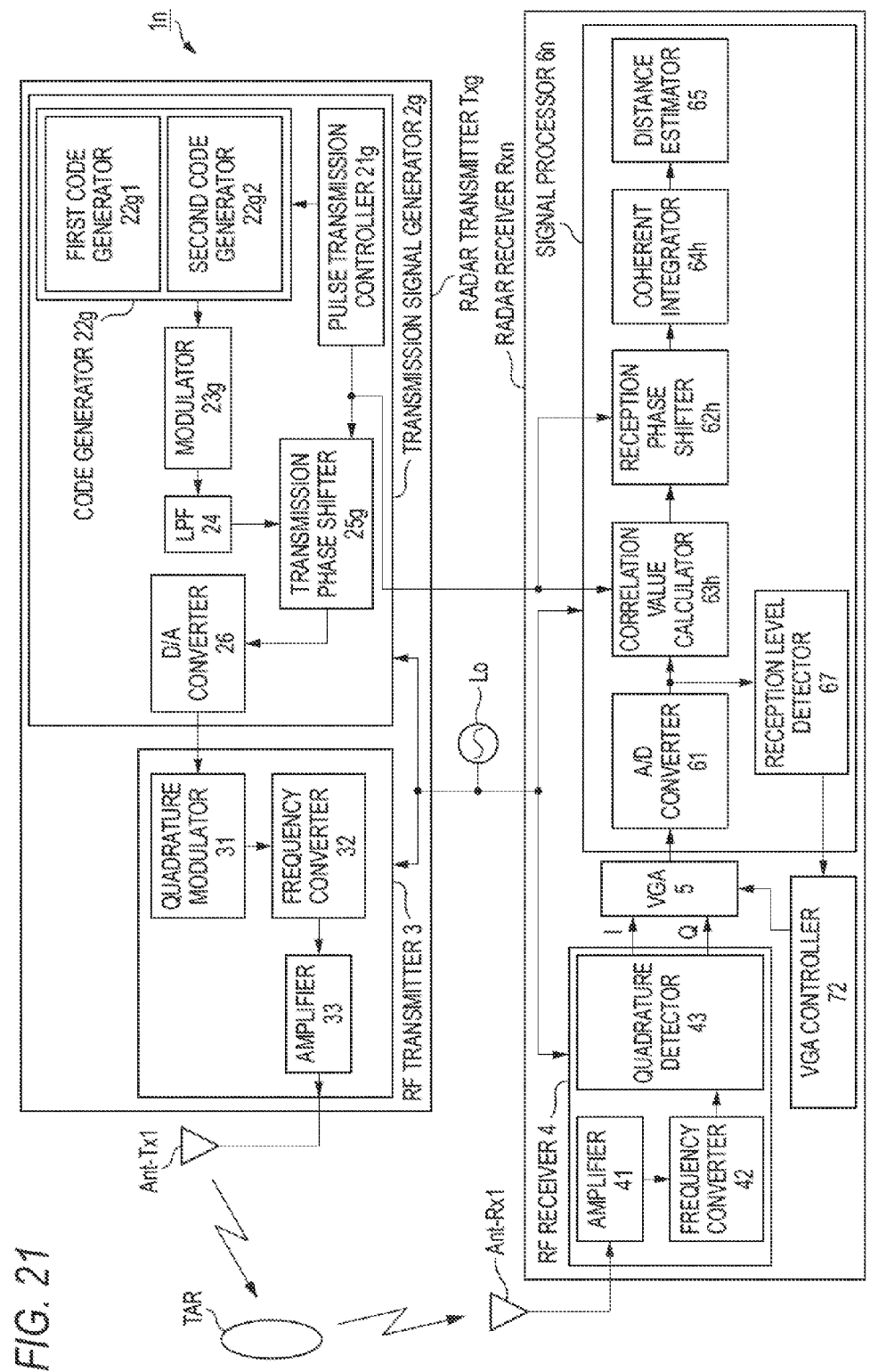

[FIG. 21] FIG. 21 is a block diagram showing, in detail, the internal configuration of a radar apparatus according to a fourth modification of the second embodiment.

Figure 22:
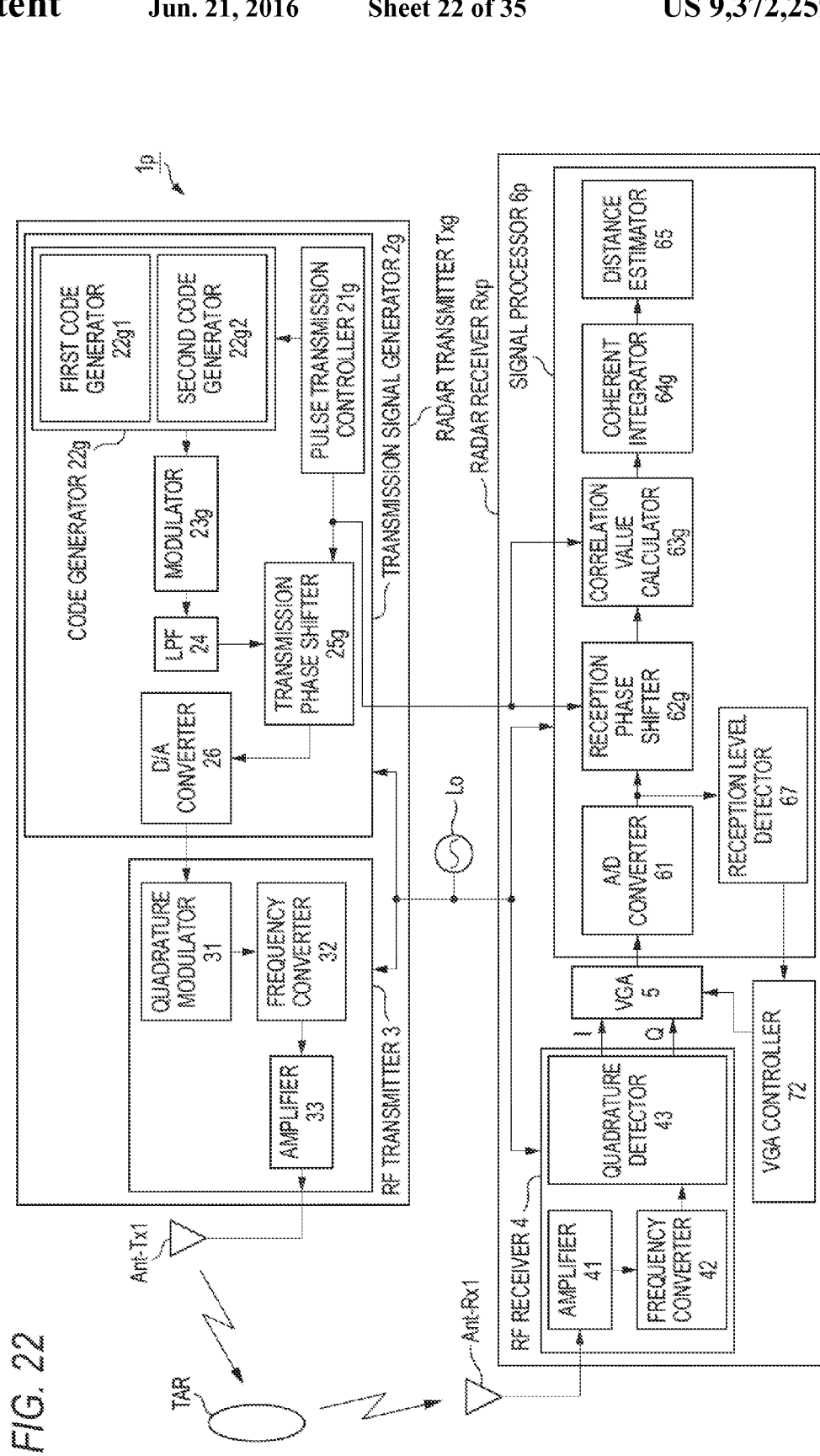

[FIG. 22] FIG. 22 is a block diagram showing, in detail, the internal configuration of a radar apparatus according to a fifth modification of the second embodiment.

Figure 23:
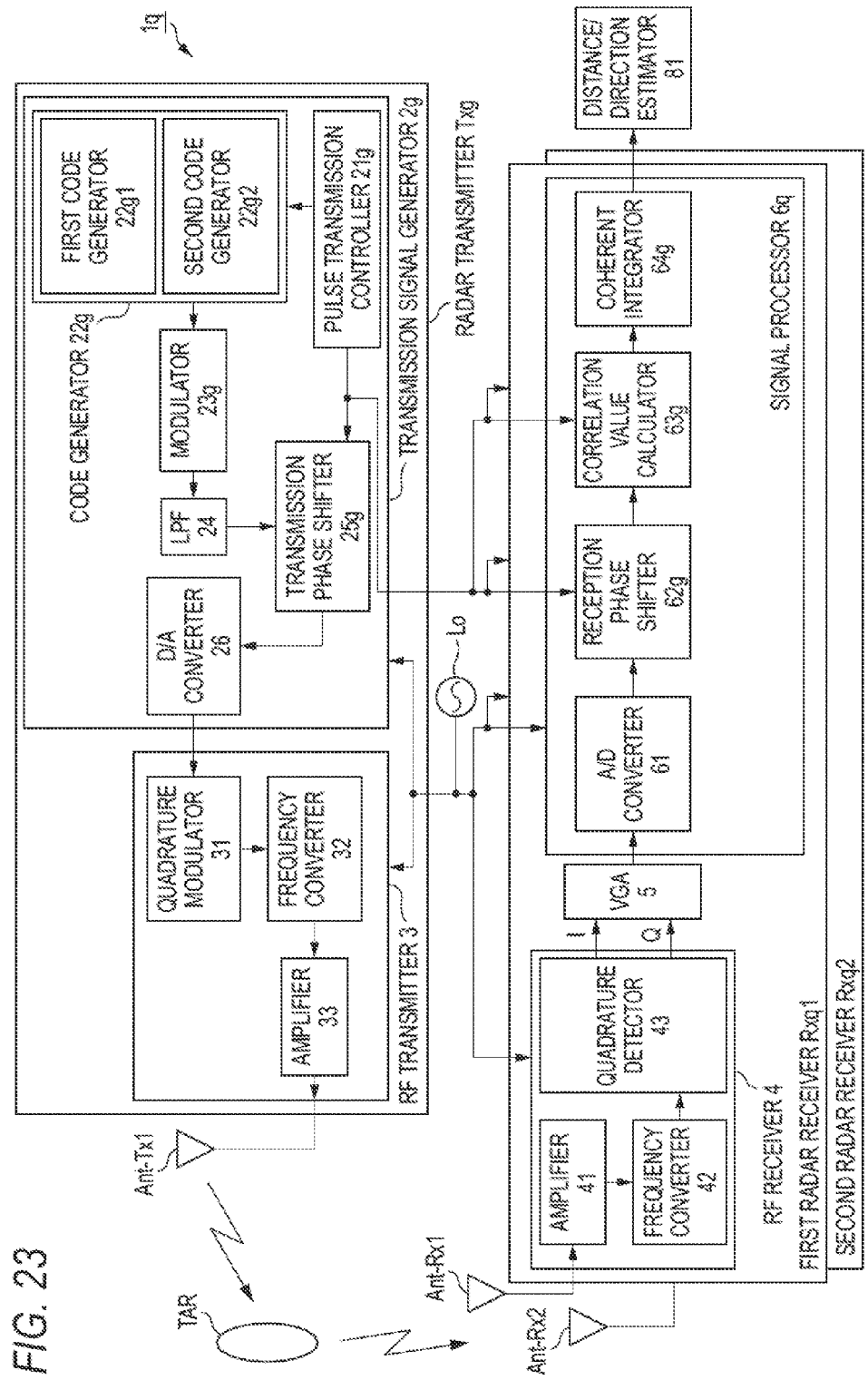

[FIG. 23] FIG. 23 is a block diagram showing, in detail, the internal configuration of a radar apparatus according to a sixth modification of the second embodiment.

Figure 24:
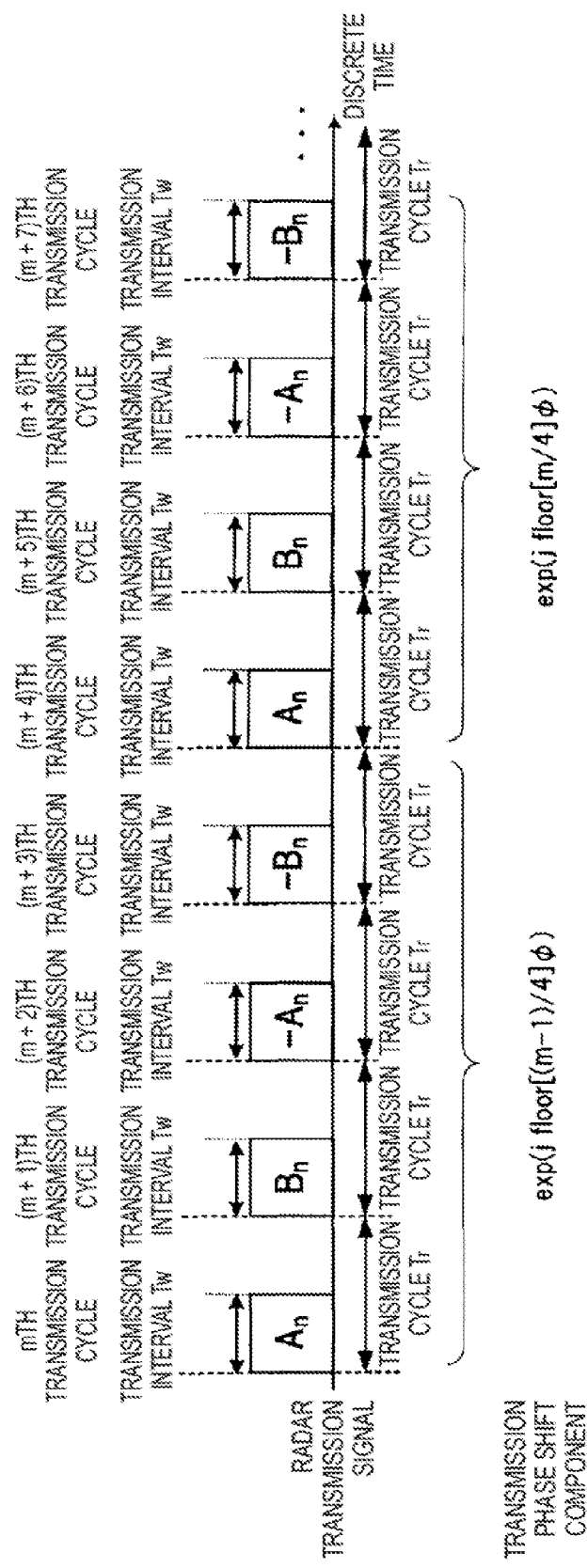

[FIG. 24] FIG. 24 illustrates relationships between transmission intervals, transmission cycles, and transmission phase shift components of a radar transmission signal in a case that a complementary code is used as a transmission code and time-division transmission is done at intervals of four transmission cycles.

Figure 25:
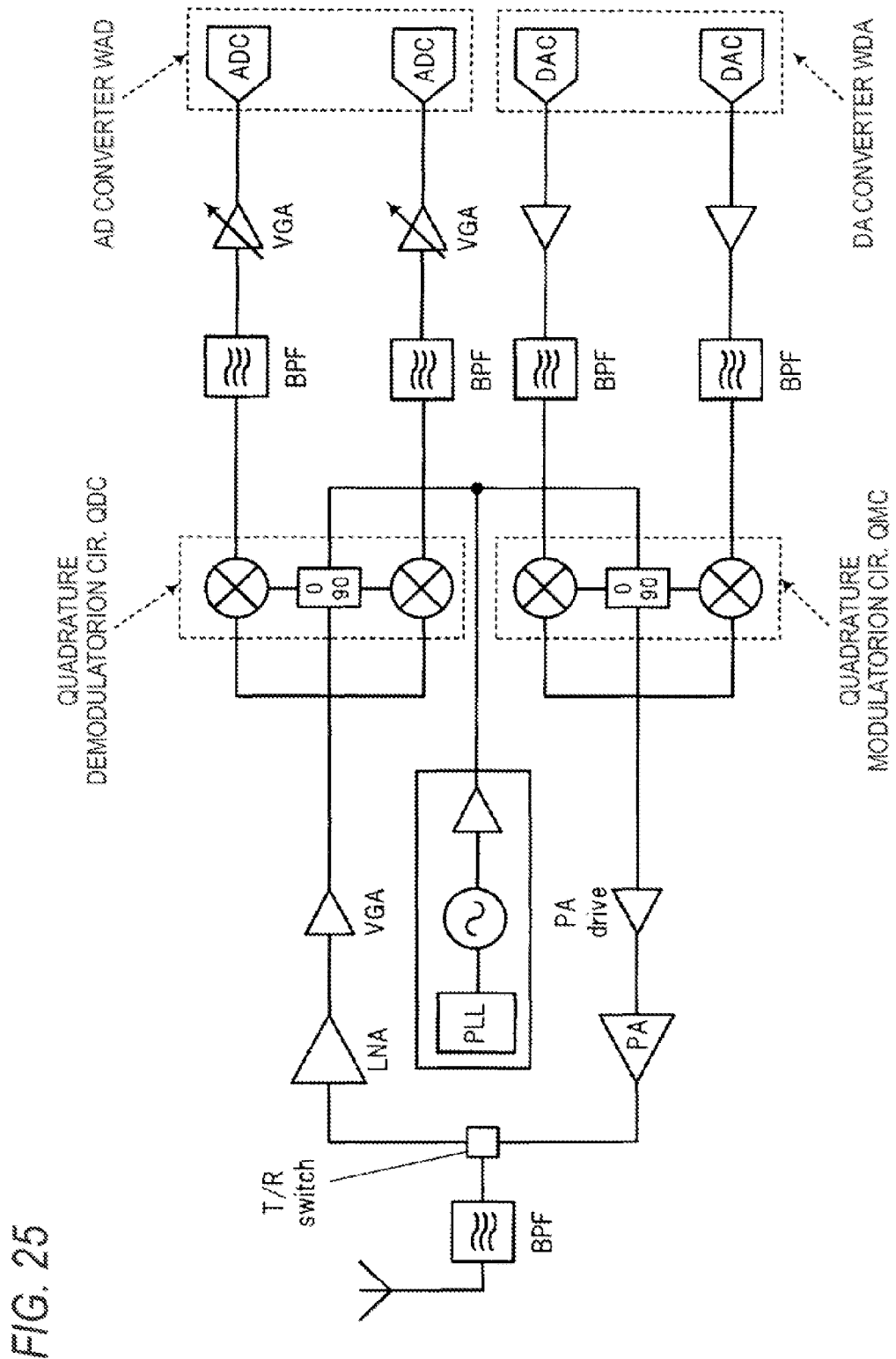

[FIG. 25] FIG. 25 is a circuit diagram showing the configuration of an example RF circuit and analog baseband circuit of a conventional radar apparatus.

Figure 26:
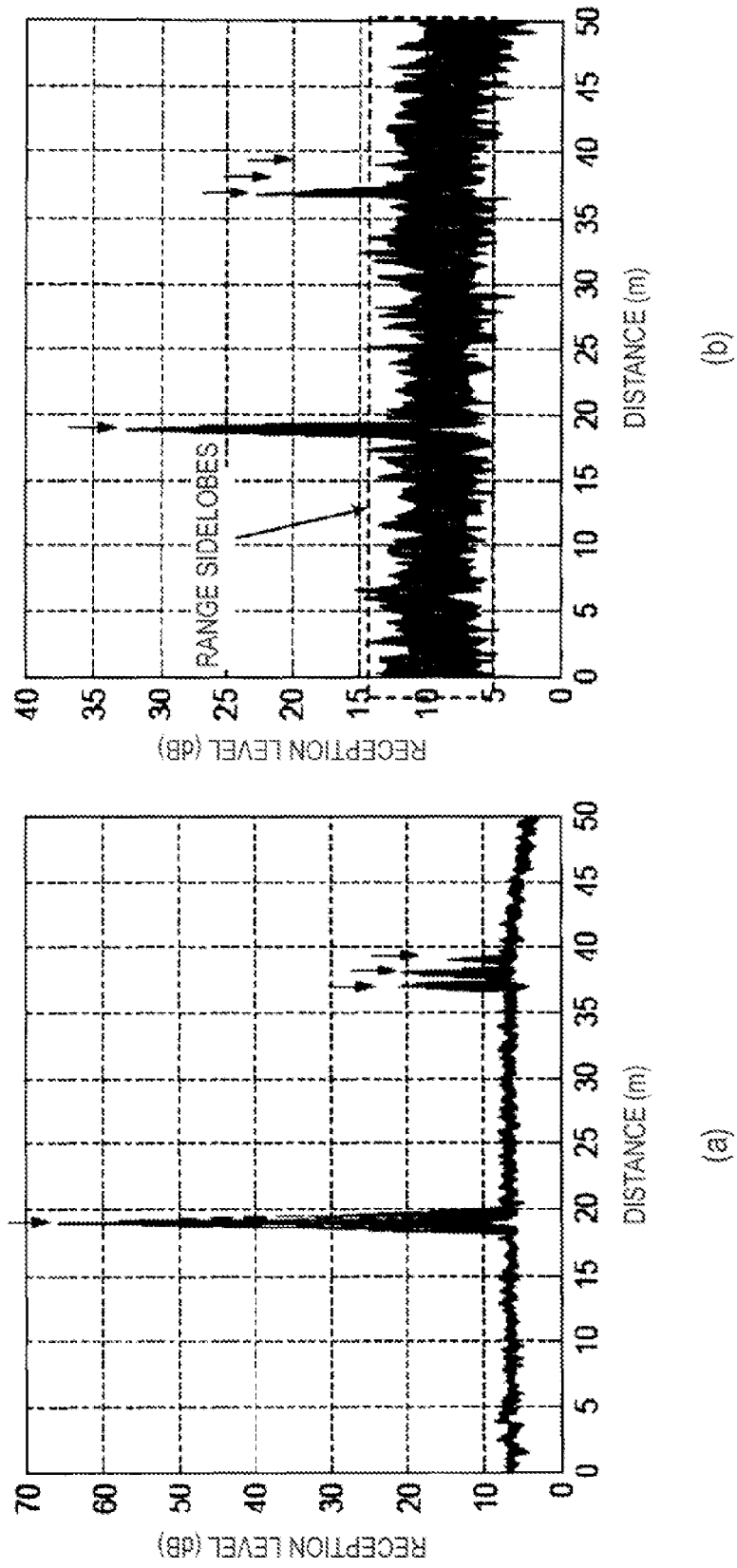

[FIG. 26] FIG. 26(a) is a graph showing a simulation result of a target ranging characteristic in an ideal case that no circuit errors occur in the circuit configuration of a conventional radar apparatus, and FIG. 26(b) is a graph showing a simulation result of a target ranging characteristic in an ideal case that circuit errors added in a simulated manner in the circuit configuration of the conventional radar apparatus.

Figure 27:
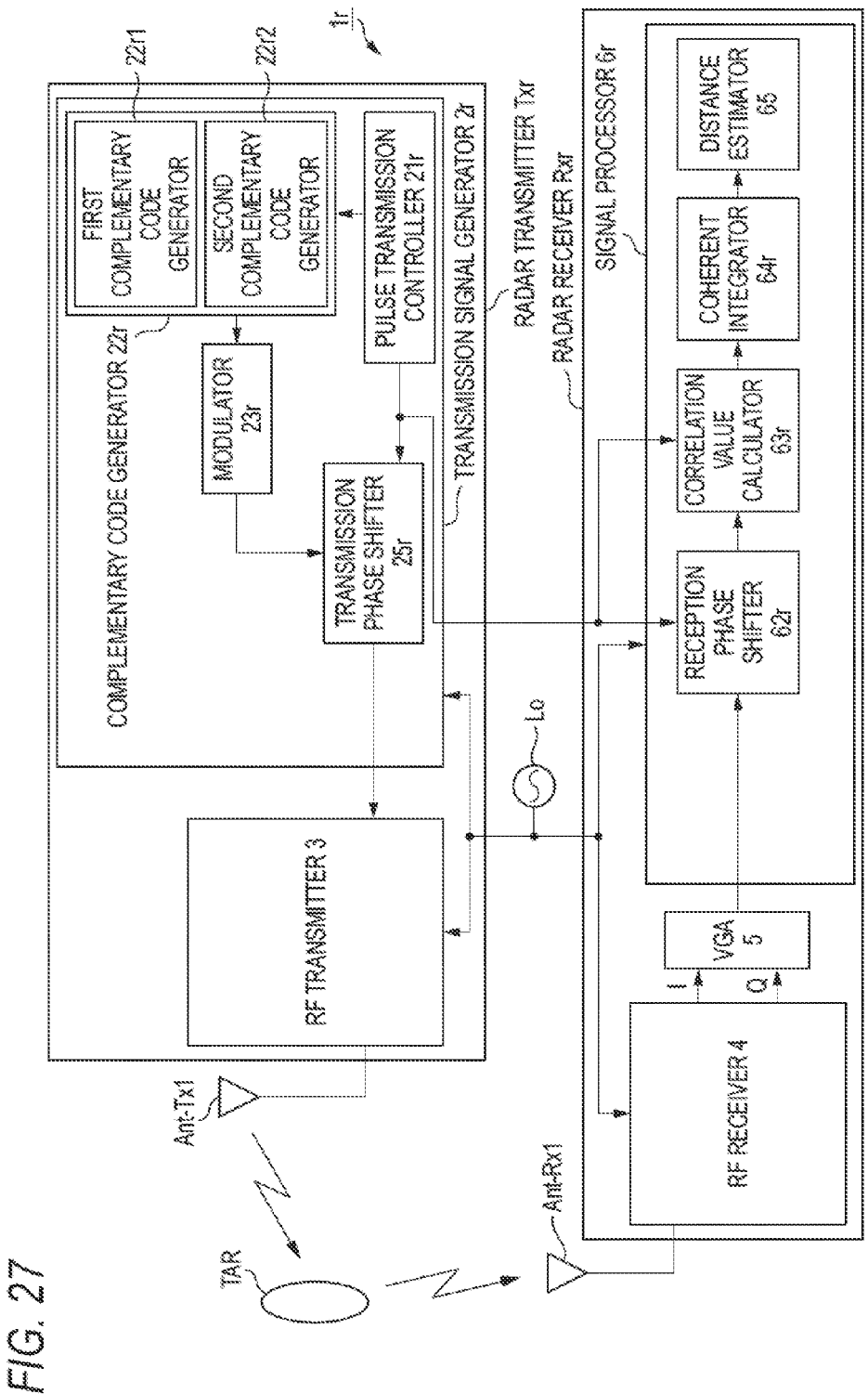

[FIG. 27] FIG. 27 is a block diagram showing, in a simplified manner, the internal configuration of a radar apparatus according to a third embodiment.

Figure 28:
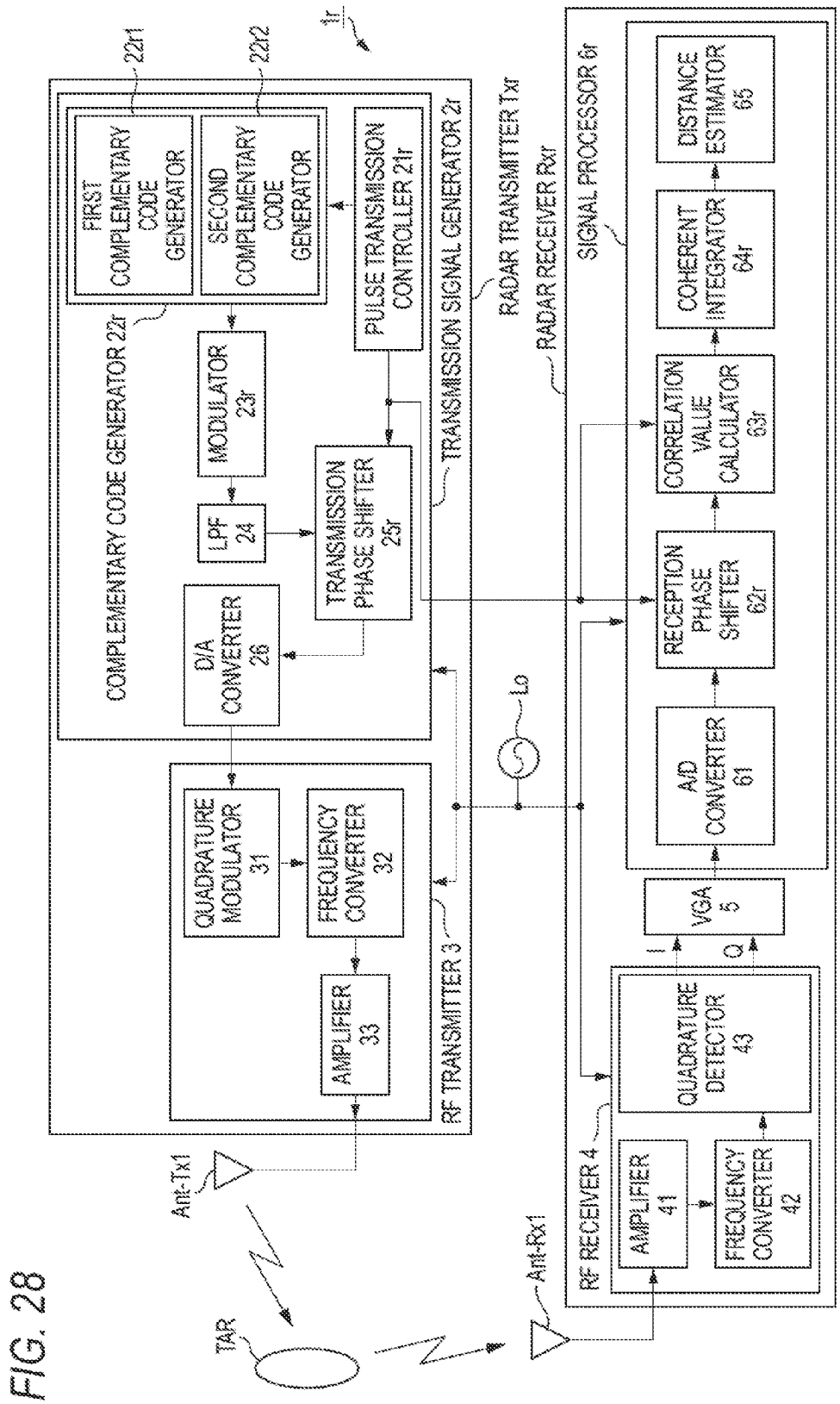

[FIG. 28] FIG. 28 is a block diagram showing, in detail, the internal configuration of the radar apparatus according to the third embodiment.

Figure 29:
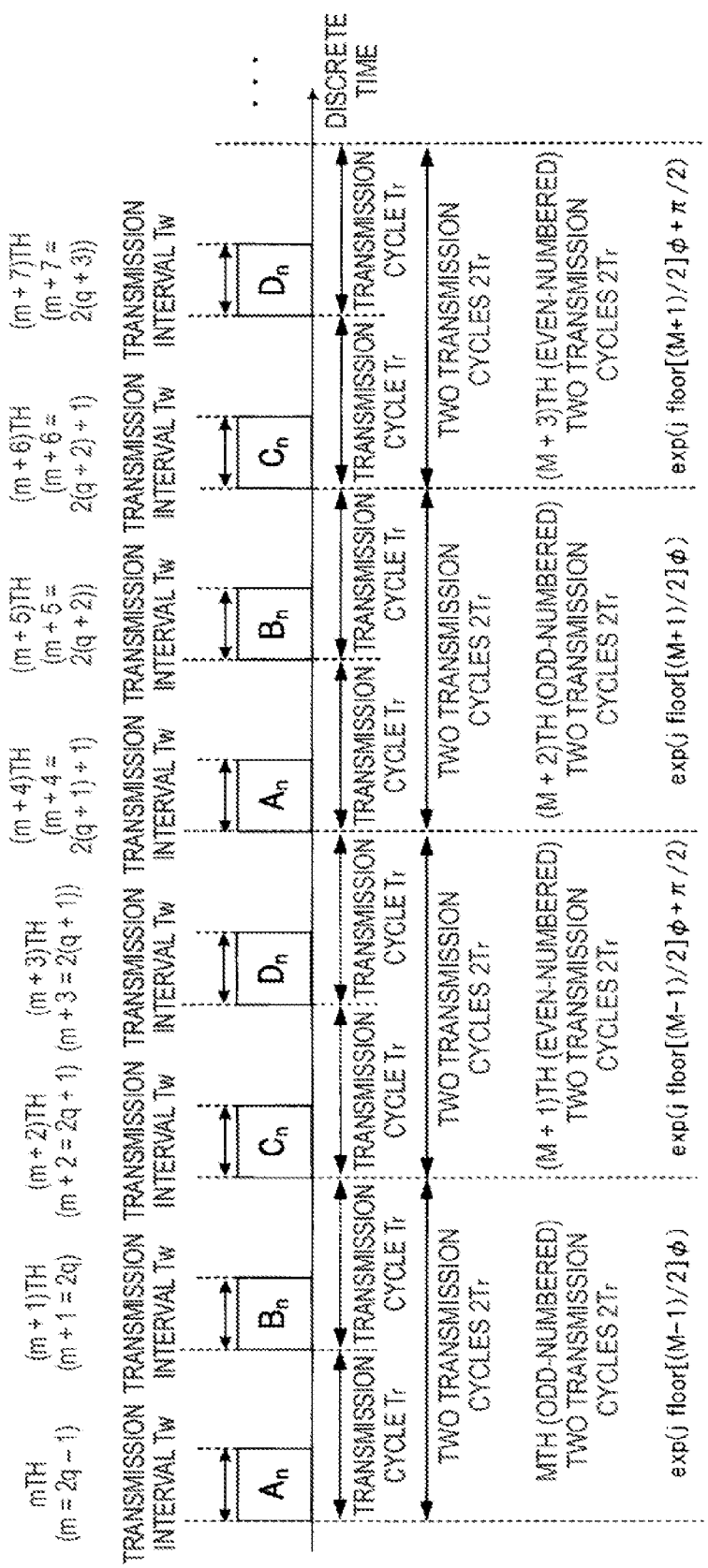

[FIG. 29] FIG. 29 illustrates relationships between transmission intervals, transmission cycles, and transmission phase shift components of a radar transmission signal which is generated on the basis of transmission codes between which switching is made every two transmission cycles (an odd-numbered pair of transmission cycles or an even-numbered pair of transmission cycles).

Figure 30:
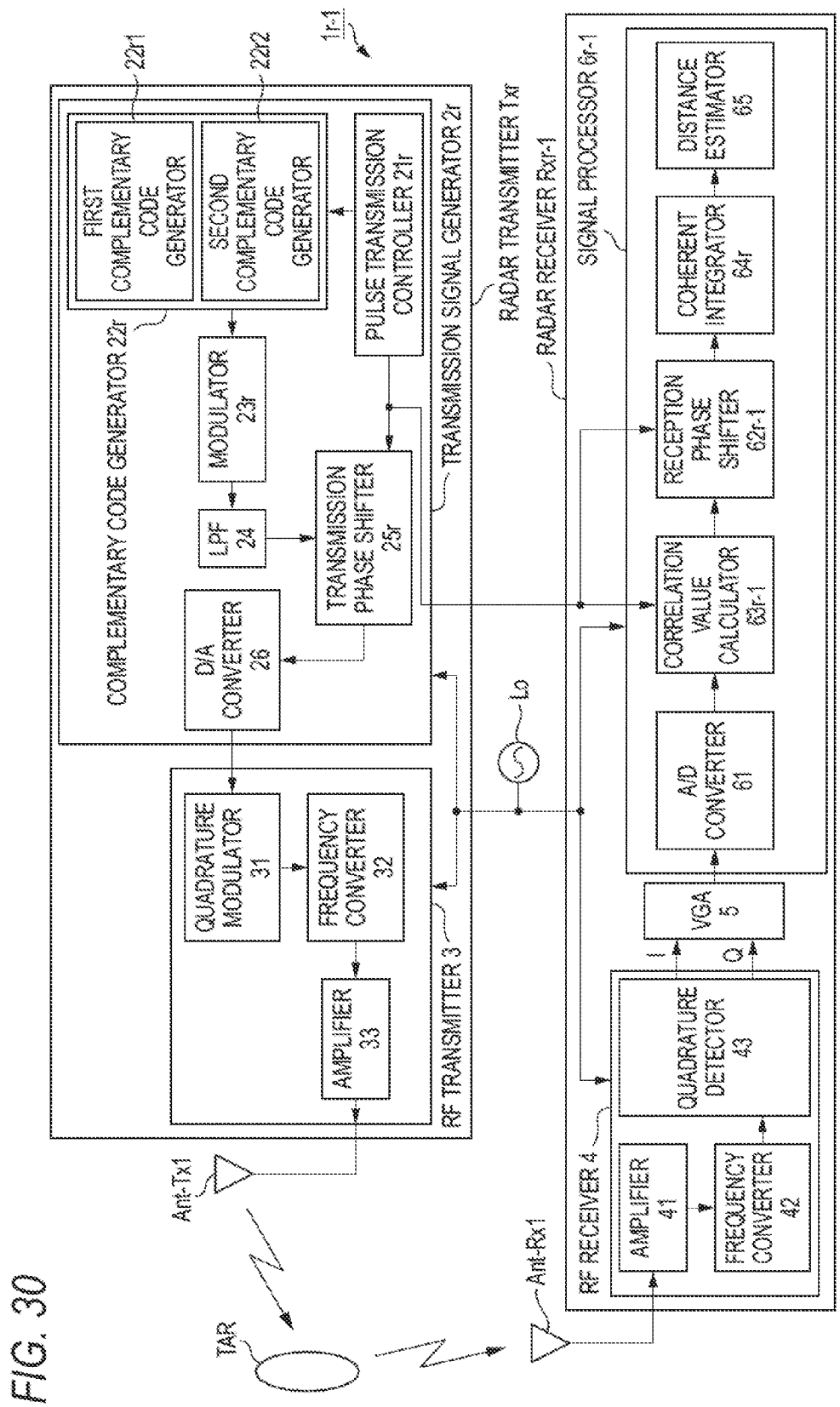

[FIG. 30] FIG. 30 is a block diagram showing, in detail, the internal configuration of a radar apparatus according to a first modification of the third embodiment.

Figure 31:
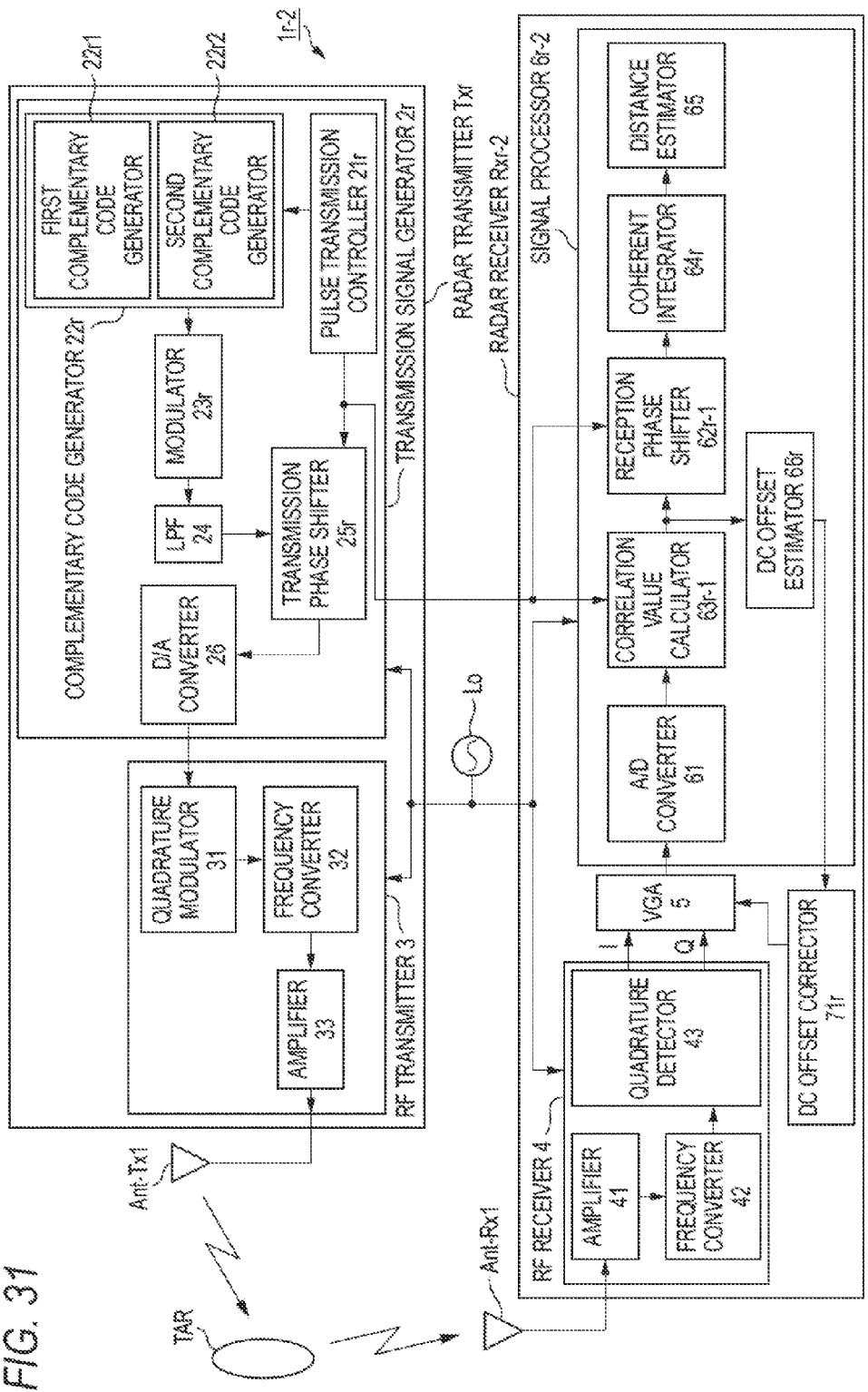

[FIG. 31] FIG. 31 is a block diagram showing, in detail, the internal configuration of a radar apparatus according to a second modification of the third embodiment.

Figure 32:
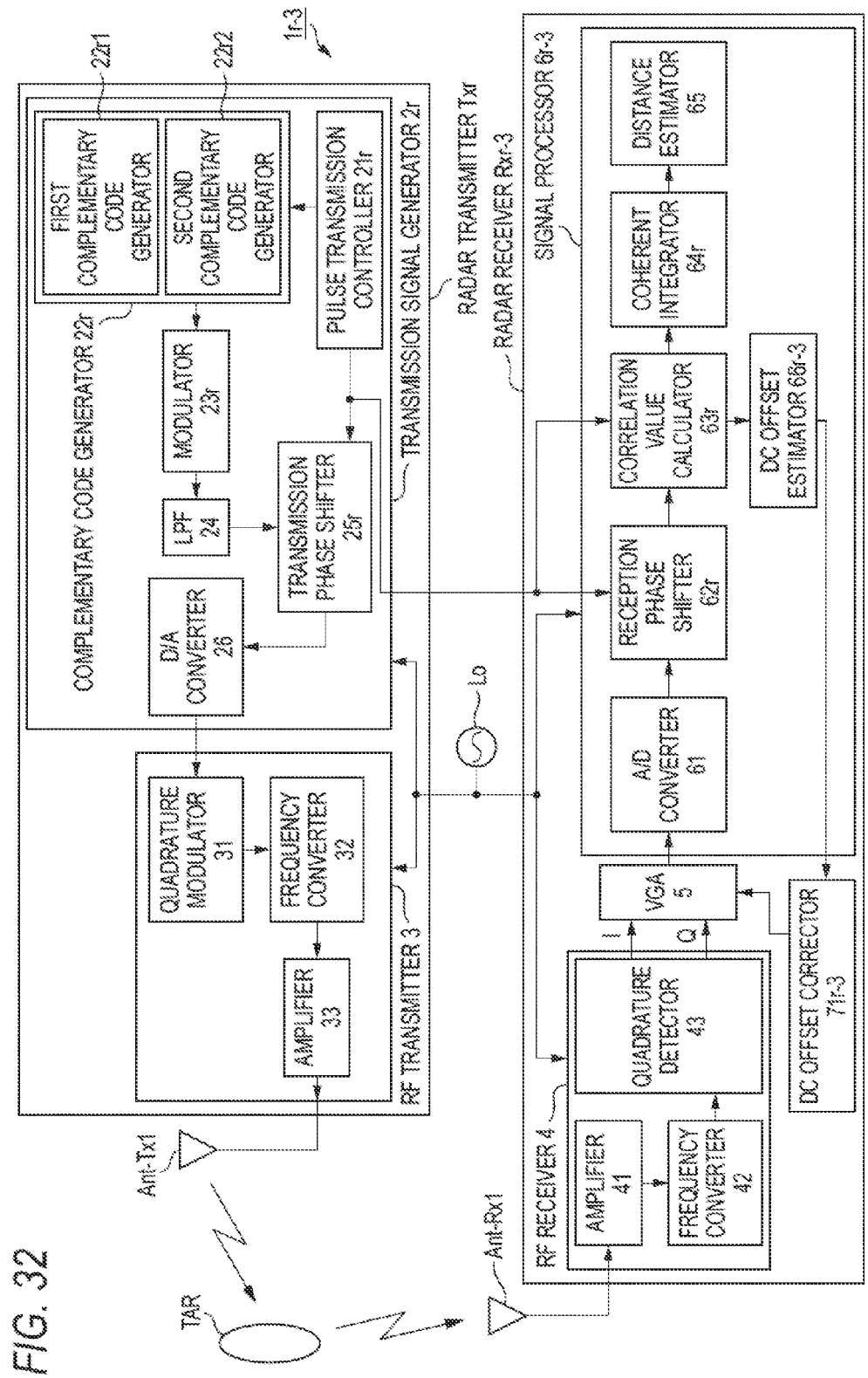

[FIG. 32] FIG. 32 is a block diagram showing, in detail, the internal configuration of a radar apparatus according to a third modification of the third embodiment.

Figure 33:
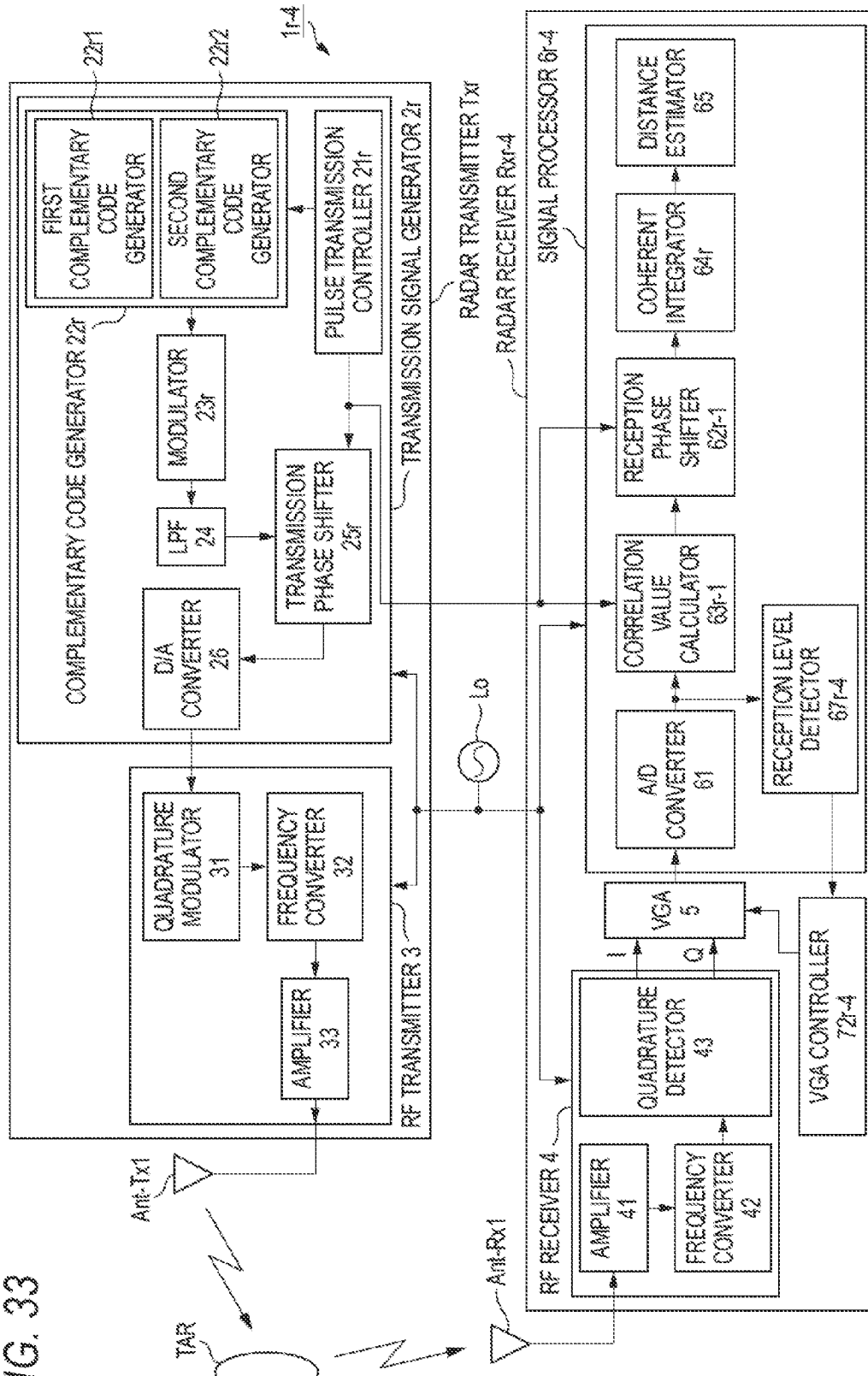

[FIG. 33] FIG. 33 is a block diagram showing, in detail, the internal configuration of a radar apparatus according to a fourth modification of the third embodiment.

Figure 34:
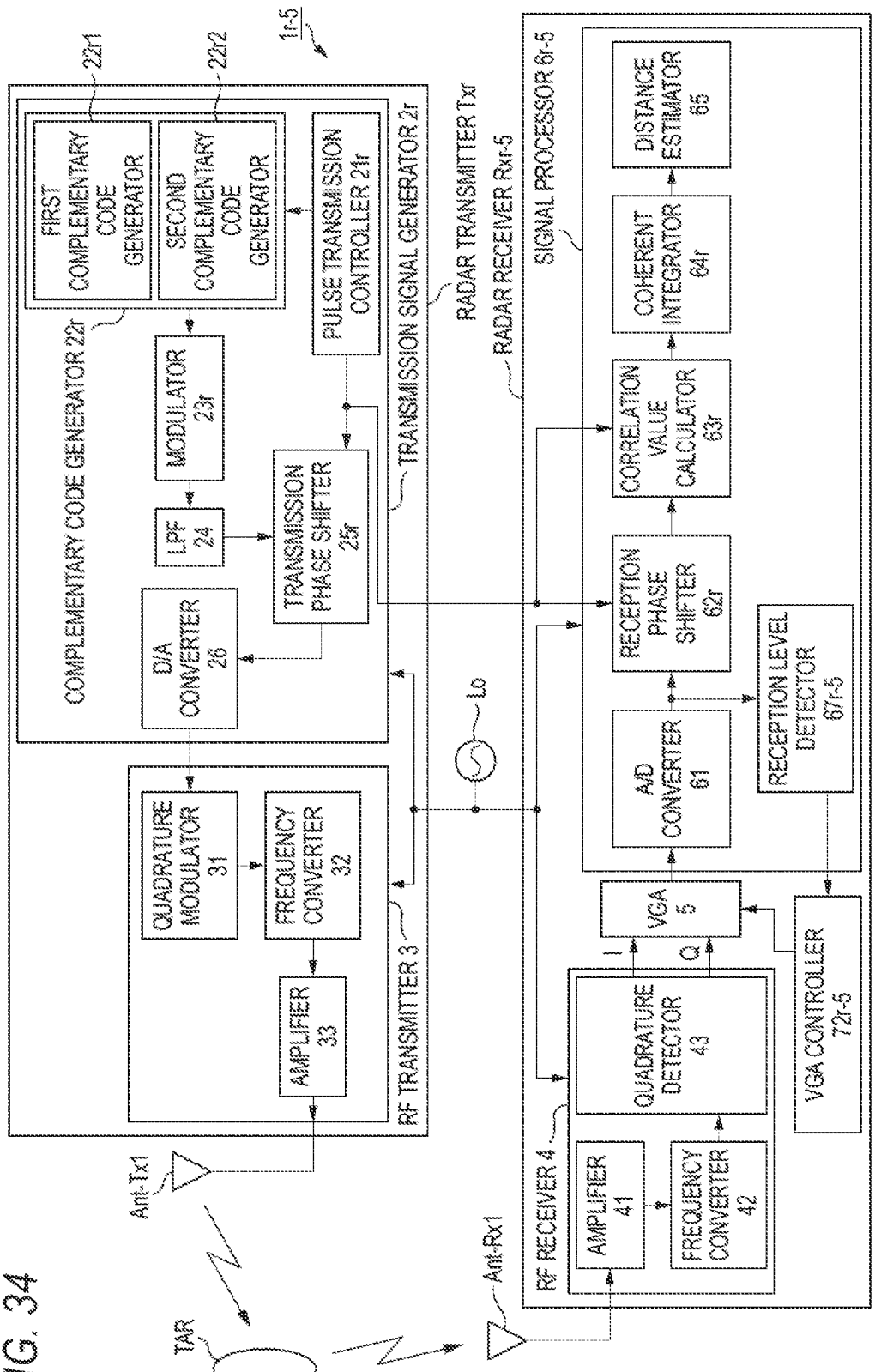

[FIG. 34] FIG. 34 is a block diagram showing, in detail, the internal configuration of a radar apparatus according to a fifth modification of the third embodiment.

Figure 35:
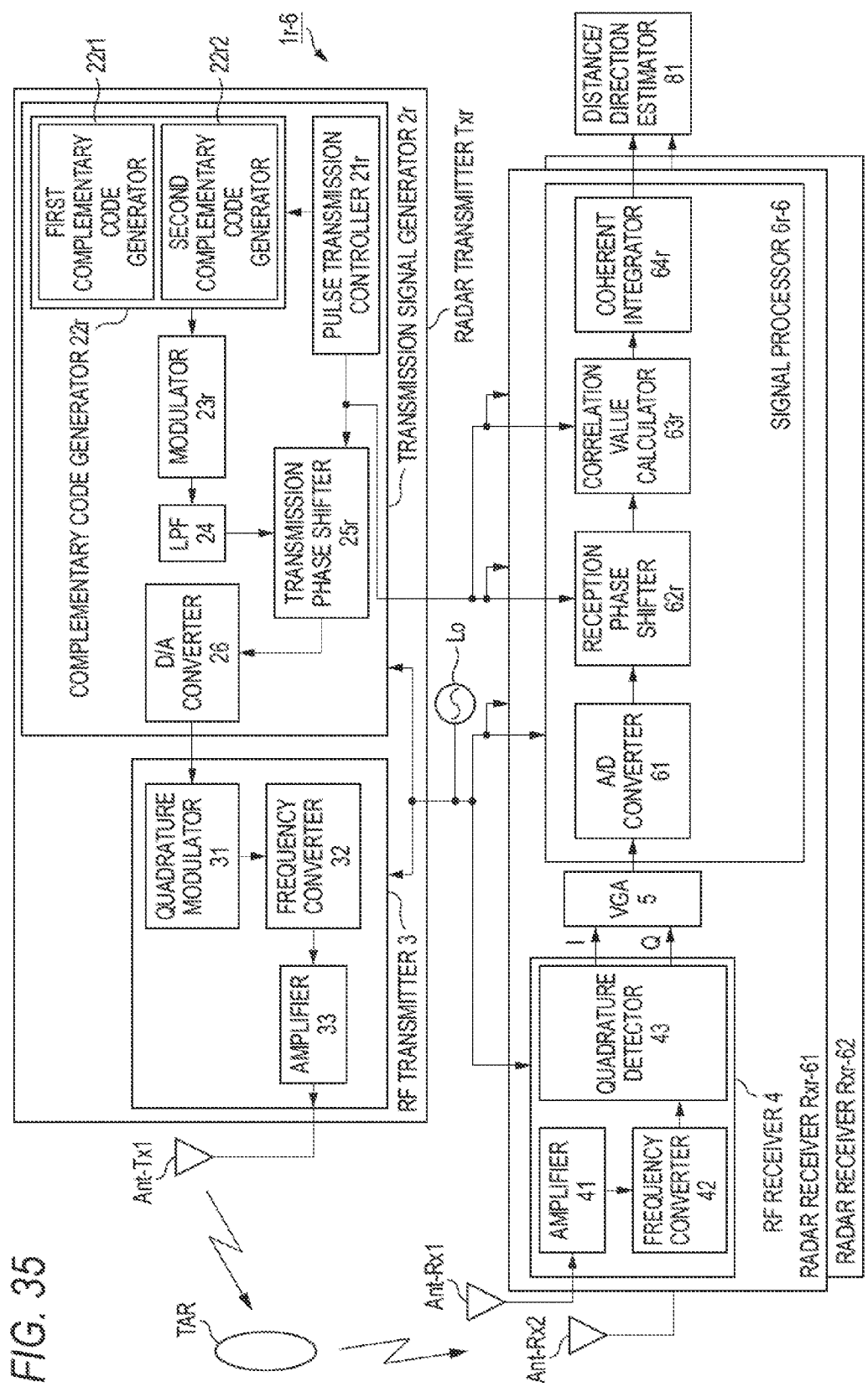

[FIG. 35] FIG. 35 is a block diagram showing, in detail, the internal configuration of a radar apparatus according to a sixth modification of the third embodiment.

MODES FOR CARRYING OUT THE INVENTION (Details Leading to Individual Embodiments)

FIG. 25 is a circuit diagram showing the configuration of an example RF circuit and analog baseband circuit of a conventional radar apparatus. If a high-frequency signal, for example, a millimeter wave signal, is used in the conventional radar apparatus shown in FIG. 25, circuit errors, that is, an IQ mismatch, a DC offset, and phase noise, occur in a quadrature modulation circuit QMC and a quadrature demodulation circuit QDC. Another circuit error, that is, quantization noise, occurs in an AD converter WAD and a DA converter WDA. These circuit errors (IQ mismatch, DC offset, phase noise, and quantization noise) are described in detail in the above-mentioned Non-patent document 1.

FIG. 26(a) is a graph showing a simulation result of a target ranging characteristic in an ideal case that no circuit errors occur in the circuit configuration of a conventional radar apparatus. FIG. 26(b) is a graph showing a simulation result of a target ranging characteristic in an ideal case that circuit errors added in a simulated manner in the circuit configuration of the conventional radar apparatus. An IQ mismatch and a DC offset are added as the circuit errors.

FIGS. 26(a) and 26(b) show simulation results of a case that a pair of complementary code sequences (described later) are transmitted in a time-divisional manner and reflection wave signals coming from targets are pulse-compressed in the conventional radar apparatus. In FIG. 26, there are four ranging targets (indicated by arrows) and true values of the distances to the targets are indicated by the arrows in the figure.

Unlike in the ideal case of FIG. 26(a) which is free of circuit errors, a phenomenon of increase of range sidelobes is found in the case of FIG. 26(b) in which circuit errors occur. It is therefore difficult to discriminate between a reflection wave signal from a target having a low reception level (e.g., the target that is distant by about 40 m) and range sidelobes of a reflection wave signal from a target having a high reception level (e.g., the target that is distant by about 20 m). This leads to reduction of the target detection rate or increase of the erroneous detection rate in the radar apparatus. This means a problem that the target ranging performance of the radar apparatus are lowered due to circuit errors including the above-mentioned IQ imbalance and the DC offset.

Where a highpass filter or a bandpass filter is provided as in Patent document 1 or 2 to eliminate a DC offset, a desired component, other than the DC offset component, of a reflection wave signal coming from a target may be eliminated by a filter response to cause an amplitude distortion or phase distortion in the reflection wave signal. There is a problem that this may cause degradation of the target ranging performance of the radar apparatus.

Where a DC offset elimination circuit or an IQ imbalance correction circuit is employed, a DC offset component or an IQ imbalance component may not be eliminated completely to leave part of the circuit error component. There is a problem that this may cause degradation of the target ranging performance of the radar apparatus.

This disclosure has been made to solve the above problems, and an object of the disclosure is to prevent increase of range sidelobes and suppress degradation of the target ranging performance effectively even in the case where circuit errors occur.

Description of Individual Embodiments

Before describing radar apparatus according to respective embodiments of the disclosure, the complementary code will be described below briefly as a technique that is a base of the embodiments to be described later.

(Complementary Code)

Figure 1:
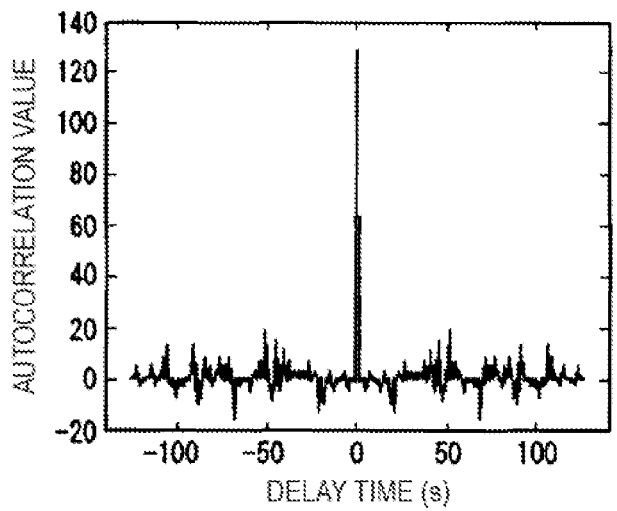
[FIG. 1]
Figure 1:
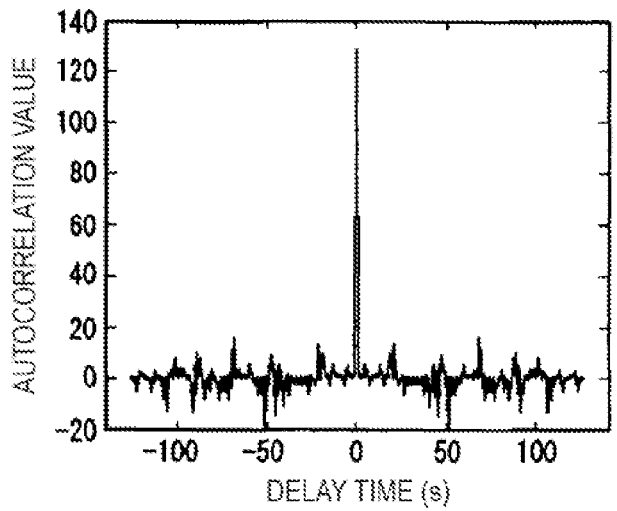
Figure 1:
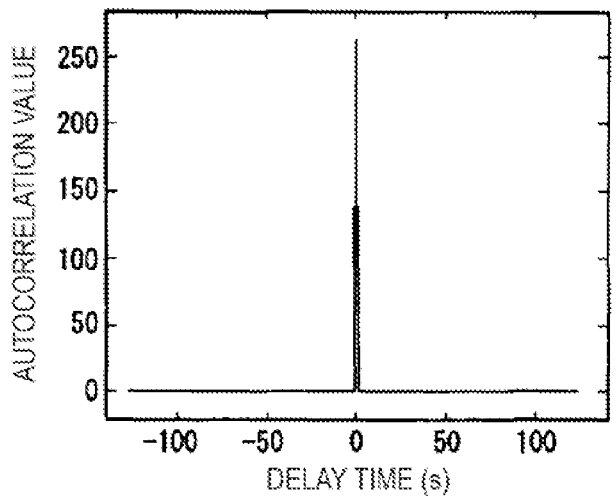

Next, the complementary code will be described. FIG. 1(a) illustrates an autocorrelation calculation result of one of a pair of complementary code sequences. FIG. 1(b) illustrates an autocorrelation calculation result of the other of the pair of complementary code sequences. FIG. 1(c) illustrates addition values of the autocorrelation calculation results of the pair of complementary code sequences.

The complementary code is a code which uses plural complementary code sequences, for example, a pair of complementary code sequences ($A_n$, $B_n$). The complementary code has a property that the range sidelobes are made zero when autocorrelation calculation results of the one complementary code sequence $A_n$ and the other complementary code sequence $B_n$ are added together with the same delay time $\tau$ (s). Parameter n is 1, 2, ..., L, and parameter L represents the code sequence length or merely the code length.

A method for generating a complementary code is disclosed in the following Referential non-patent document 1, for example:

(Referential non-patent document 1) BUDISIN, S. Z., "NEW COMPLEMENTARY PAIRS OF SEQUENCES," Electron. Lett., 26, (13), pp. 881-883 (1990).

Between the complementary code sequences ($A_n$, $B_n$), an autocorrelation calculation result of the one complementary code sequence $A_n$ is calculated according to Equation (1). An autocorrelation calculation result of the other complementary code sequence $B_n$ is calculated according to Equation (2). The parameter R represents an autocorrelation calculation result. It is assumed that each of the complementary code sequences $A_n$ and $B_n$ is zero when n>L or n<1 (i.e., $A_n$=0 and $B_n$=0 when n>L or n<1). The asterisk * is a complex conjugate operator.

$$R_{AA}(\tau) = \sum_{n=1}^{L} A_n A_{n+\tau}^* \quad (1)$$

$$R_{BB}(\tau) = \sum_{n=1}^{L} B_n B_{n+\tau}^* \quad (2)$$

The autocorrelation calculation result $R_{AA}(\tau)$ of the complementary code sequence $A_n$ calculated according to Equation (1) has a peak when the delay time (or shift time) $\tau$ is equal to 0 and has range sidelobes for the delay times $\tau$ being not equal to 0. Likewise, the autocorrelation calculation result $R_{BB}(\tau)$ of the complementary code sequence $B_n$ calculated according to Equation (2) has a peak when the delay time $\tau$ is equal to 0 and has range sidelobes for the delay times $\tau$ being not equal to 0.

The addition values of the autocorrelation calculation results $R_{AA}(\tau)$ and $R_{BB}(\tau)$ have a peak when the delay time $\tau$ is equal to 0 and have no range sidelobes (i.e., have values 0) for the shift times $\tau$ being not equal to 0. In the following description, a peak occurring when the delay time $\tau$ is equal to 0 will be referred to as a main lobe. The above relationships are expressed as Formulae (3):

$$R_{AA}(\tau)+R_{BB}(\tau)\neq 0, \text{ when } \tau=0$$

$$R_{AA}(\tau)+R_{BB}(\tau)=0, \text{ when } \tau\neq 0 \quad (3)$$

Because of the above-described autocorrelation characteristics, the complementary code can reduce the peak sidelobe levels with a shorter code length. Therefore, the use of a complementary code having a short code length can reduce the peak sidelobe levels in a radar apparatus even in the case where it receives a signal obtained through mixing of reflection waves coming from a nearby target and reflection waves coming from a distant target.

(Individual Embodiments of this Disclosure)

Next, embodiments of this disclosure will be described with reference to the drawings.

In the following description, radar apparatus of the disclosure are configured so as to be equipped with a radar transmitter which transmits, from a transmission antenna, a high-frequency radar transmission signal using a pulse compression code as a transmission code and a radar receiver which includes a reception antenna and receives a reflection wave signal of the radar transmission signal reflected by a target. In each embodiment, a radar apparatus is configured so as to be equipped with a single radar transmitter including a single transmission antenna and a radar receiver including a single reception antenna.

A radar apparatus may be equipped with plural radar receivers which are provided for respective reception antennas. For example, a radar apparatus equipped with two radar receivers including two respective reception antennas will be described as an example radar apparatus having plural radar receivers. However, the number of radar receivers is not limited to two. Each transmission antenna or reception antenna may be a transmission antenna element or a reception antenna element.

(Embodiment 1)

The configuration and operation of a radar apparatus 1 according to a first embodiment will be described with reference to FIGS. 2-5. FIG. 2(a) illustrates a relationship between a DC offset component and a Doppler frequency component which are contained in a reception signal of a conventional radar apparatus.

Detection, by a pulse radar, of a Doppler frequency component contained in reflection waves coming from a target is disclosed in the following Referential non-patent document 2, for example:

(Referential non-patent document 2) Sang-Dong Kim, Jong-Hun Lee, "A Memory-Efficient Hardware Architecture for a Pulse Doppler Radar Vehicle Detector," IEICE Trans. Fundamentals, Vol. E94-A, No. 5, pp. 1210-1213, 2011.

FIG. 2(b) illustrates a relationship between a DC offset component and a Doppler frequency component which are contained in a reception signal of the radar apparatus 1 of this disclosure before reception phase shifting. FIG. 2(c) illustrates a relationship between a DC offset component and a Doppler frequency component which are contained in a reception signal of the radar apparatus 1 of this disclosure after the reception phase shifting.

FIG. 3 is a block diagram showing, in a simplified manner, the internal configuration of the radar apparatus 1 according to the first embodiment. FIG. 4 a block diagram showing, in detail, the internal configuration of the radar apparatus 1 according to the first embodiment. FIG. 5 illustrates relationships between transmission intervals, transmission cycles, and transmission phase shift components of a radar transmission signal.

The radar apparatus 1 transmits, from a transmission antenna Ant-Tx1, a high-frequency radar transmission signal generated by a radar transmitter Tx. The radar apparatus 1 receives a reflection wave signal which is the high-frequency transmission signal reflected by a target TAR by, for example, a reception antenna Ant-Rx1 shown in FIG. 3. The radar apparatus 1 detects presence/absence of a target TAR by performing signal processing on the reflection wave signal received by the reception antenna Ant-Rx1.

The target TAR is an object as a detection target of the radar apparatus 1 and includes an automobile or a human, for example. This also applies to each of the following embodiments.

FIGS. 2(a)-2(c) are of a case that the reception signal contains a DC offset component stationarily. Assuming a moving target TAR, $f_d$ represents the Doppler frequency of a reflection wave signal reflected from the target TAR, $F_{dmax}$ represents a maximum value of $f_d$ in the positive direction, and $-F_{dmax}$ represents a maximum value of $f_d$ in the negative direction.

In the reception signal of the conventional radar apparatus shown in FIG. 2(a), a DC offset component appears in a range ($2F_{dmax}$) of values the Doppler frequency $f_d$ can take in the reflection wave signal. It is therefore difficult separate the DC offset component and a Doppler spectrum from each other. Therefore, the conventional radar apparatus is affected by the DC offset component, as a result of which the range sidelobe ratio in the reflection wave signal becomes large and the target ranging characteristic is lowered.

In the radar apparatus 1 of this disclosure, the radar transmitter Tx generates a high-frequency radar transmission signal by giving a transmission phase shift corresponding to a transmission cycle to a baseband transmission signal which uses a prescribed code sequence (described later) as a pulse compression code.

Let $\phi$ and $T_r$ represent the phase rotation amount of the transmission phase shift and the transmission cycle, respectively. Then the Doppler spectrum in the range ($2F_{dmax}$) of values the Doppler frequency $f_d$ can take is shifted by $\phi/2\pi T_r$ as a result of the transmission phase shifting (see FIG. 2(b)). FIG. 2(b) is of a case that Equation (4) holds between the phase rotation amount $\phi$, the transmission cycle $T_r$, and the maximum Doppler frequency $F_{dmax}$.

With this measure, as shown in FIG. 2(b), the radar apparatus 1 can separate the DC offset component and the Doppler spectrum in the range ($2F_{dmax}$) of values the Doppler frequency $f_d$ can take in a reflection wave signal from each other.

$$\phi=2\pi\times(2F_{d\,max})\times T_r \quad (4)$$

Furthermore, in the radar apparatus 1 of the disclosure, the radar transmitter Tx converts a high-frequency reflection wave signal into a baseband reception signal and gives the baseband reception signal a reception phase shift whose phase rotation amount is opposite in direction to that of the transmission phase shift.

That is, as shown in FIG. 2(c), the radar apparatus 1 shifts, by $-\phi/2\pi T_r$, the DC offset and the Doppler spectrum in the range ($2F_{dmax}$) of values the Doppler frequency $f_d$ can take in a reflection wave signal. As a result, the radar apparatus 1 can separate the DC offset component and the Doppler spectrum from each other and suppress influence of the transmission phase shift on the Doppler spectrum.

First, the configurations of the individual units of the radar apparatus 1 will be described in a simplified manner.

As shown in FIG. 3, the radar apparatus 1 is configured so as to include a reference signal oscillator Lo, the radar transmitter Tx, and the radar receiver Rx. The radar transmitter Tx is configured so as to include a transmission signal generator 2 and an RF transmitter 3 which is connected to the transmission antenna Ant-Tx 1. The transmission signal generator 2 is configured so as to include a pulse transmission controller 21, a code generator 22, a modulator 23, and a transmission phase shifter 25.

The radar transmitter Tx and the radar receiver Rx are connected to the reference signal oscillator Lo and are supplied with a reference signal from the reference signal oscillator Lo, whereby processing performed by the radar transmitter Tx and processing performed by the radar receiver Rx are synchronized with each other.

The radar receiver Rx is configured so as to include an RF receiver 4, a VGA (variable gain amplifier) 5, and a signal processor 6. The signal processor 6 is configured so as to include a reception phase shifter 62, a correlation value calculator 63, a coherent integrator 64, and a distance estimator 65.

(Radar Transmitter)

Next, the configurations of the individual units of the radar transmitter Tx will be described in detail with reference to FIG. 4.

As shown in FIG. 4, the transmission signal generator 2 is configured so as to include the pulse transmission controller 21, the code generator 22, the modulator 23, an LPF (lowpass filter) 24, the transmission phase shifter 25, and a D/A (digital to analog) converter 26. Although in FIG. 4 the transmission signal generator 2 includes the LPF 24, the LPF 24 may be provided in the radar transmitter Tx independently of the transmission signal generator 2. The RF transmitter 3 is configured so as to include a quadrature modulator 31, a frequency converter 32, and an amplifier 33.

Next, how the individual units of the radar transmitter Tx operate will be described in detail.

Based on a reference signal generated by the reference signal oscillator Lo, the transmission signal generator 2 generates a transmission reference clock signal by multiplying the reference signal by a prescribed number. The individual units of the transmission signal generator 2 operate on the basis of the generated transmission reference clock signal.

Let $f_{TxBB}$ represent the transmission reference clock frequency; then the transmission cycle $T_r$ is expressed as an integer $N_r$ multiple of a discrete time interval $1/f_{TxBB}$ which is determined by the transmission reference clock frequency $f_{TxBB}$ (see Equation (5)).

$$T_r = N_r \times \frac{1}{f_{TxBB}} \quad (5)$$

The transmission signal generator 2 periodically generates a baseband transmission signal (pulse compression code) $G(n_s)$ (see Equation (6)) by modulating a code sequence $C_n$ having a code length L on the basis of a transmission timing signal (for a radar transmission signal) which is output from the pulse transmission controller 21 every transmission cycle $T_r$. The parameter n is equal to 1, ..., L, and the parameter L represents the code length of the code sequence $C_n$. The parameter j is the imaginary number unit which satisfies $j^2=-1$. The parameter $n_s$ is a natural number and represents discrete time.

$$G(n_s)=I(n_s)+jQ(n_s) \quad (6)$$

As shown in FIG. 5, the transmission signal $G(n_s)$ is such that each code of the code sequence $C_n$ is modulated using $N_o$ samples of the transmission reference clock signal in the transmission interval $T_w$ (s) of each transmission cycle $T_r$. Therefore, in each transmission interval $T_w$, modulation is done using $N_w$ ($=N_o \times L$) samples. In the silent interval ($T_r-T_w$) (s) of each transmission cycle $T_r$, modulation is done using $N_u$ ($=N_r-N_w$) samples. Therefore, the transmission signal $G(n_s)$ of Equation (6) is expressed as Equation (7):

[Formula 7]

$$G(N_r(m-1)+n_s)=I(N_r(m-1)+n_s)+jQ(N_r(m-1)+n_s) \quad (7)$$

The pulse transmission controller 21 generates a transmission timing signal for a high-frequency radar transmission signal every transmission cycle $T_r$ and outputs it to each of the code generator 22, the transmission phase shifter 25, and the reception phase shifter 62.

The code generator 22 generates a transmission code (pulse compression code) of the code sequence $C_n$ having the code length L on the basis of a transmission timing signal that is output from the pulse transmission controller 21 every transmission cycle $T_r$. The code generator 22 outputs the generated transmission code of the code sequence $C_n$ to the modulator 23. That is, the single code generator 22 generates a single code sequence.

For example, the elements of the code sequence $C_n$ are formed using two values [−1, 1] or four values [1, −1, j, −j]. It is preferable that the transmission code is a code including one of a Barker code sequence, an M-sequence code, and a Gold code sequence, for example. In the following description, for the sake of convenience, the transmission code of the code sequence $C_n$ will be written as a transmission code $C_n$.

The modulator 23 receives the transmission code $C_n$ from the code generator 22. The modulator 23 generates a baseband transmission signal $G(n_s)$ of Equation (6) by pulse-modulating the received transmission code $C_n$. The pulse modulation is amplitude modulation (ASK) or phase modulation (PSK). This also applies to each of the following embodiments.

For example, where the code sequence $C_n$ uses two values [−1, 1], the phase modulation (PSK) becomes BPSK (binary phase shift keying. Where the code sequence $C_n$ uses four values [1, −1, j, −j], the phase modulation (PSK) becomes QPSK (quadrature phase shift keying) or 4-phase PSK. That is, in the phase modulation (PSK), prescribed modulation symbols of a constellation on the IQ plane are assigned.

In the baseband transmission signal $G(n_s)$ of Equation (6), $I(n_s)$ and $Q(n_s)$ represent the in-phase component and the quadrate component of a modulation signal, respectively. The modulator 23 outputs a transmission signal $G(n_s)$, in a preset limited band or lower, of the generated transmission signal $G(n_s)$ to the transmission phase shifter 25 via the LPF 24. The LPF 24 may be omitted in the transmission signal generator 2. This also applies to each of the following embodiments.

The transmission phase shifter 25 receives the transmission signal $G(n_s)$ from the modulator 23 or the LPF 24. The transmission phase shifter 25 gives a prescribed transmission phase shift to the received transmission signal $G(n_s)$ on the basis of a transmission timing signal that is output from the pulse transmission controller 21 every transmission cycle $T_r$ (see FIGS. 3 and 4). That is, the transmission phase shifter 25 gives a phase shift corresponding to one transmission cycle.

More specifically, based on a transmission timing signal that is supplied from the pulse transmission controller 21 in an mth transmission cycle $T_r$, the transmission phase shifter 25 gives the transmission signal $G(n_s)$ a transmission phase shift exp(j(m−1)φ) corresponding to the ordinal number of the transmission cycle $T_r$ (see Equation (8)). The parameter m is a natural number and represents the ordinal number of the transmission cycle $T_r$. The parameter φ represents the phase rotation amount given by the transmission phase shifter 25, and it is preferable that the parameter φ satisfy the relationship of Inequality (9). The transmission phase shifter 25 outputs a transmission-phase-shift-added transmission signal $GP(N_r(m−1)+n_s)$ to the D/A converter 26.

$$GP(N_r(m-1)+n_s) = \exp(j(m-1)\phi)G(N_r(m-1)+n_s) \quad (8)$$

$$\phi \geq 2\pi \times (2F_{dmax}) \times T_w \quad (9)$$

The D/A converter 26 converts the digital transmission signal $GP(N_r(m−1)+n_s)$ which is output from the transmission phase shifter 25 into an analog transmission signal $GP(N_r(m−1)+n_s)$. The D/A converter 26 outputs the analog transmission signal $GP(N_r(m−1)+n_s)$ to the quadrature modulator 31.

The RF transmitter 3 generates a transmission reference signal by multiplying the reference signal generated by the reference signal oscillator Lo by a prescribed number. The individual units of the RF transmitter 3 operate on the basis of the generated transmission reference signal.

The quadrature modulator 31 receives the transmission signal $GP(N_r(m−1)+n_s)$ from the EVA converter 26 and quadrature-modulates it. The quadrature modulator 31 outputs the quadrature-modulated transmission signal $GP(N_r(m−1)+n_s)$ to the frequency converter 32.

The frequency converter 32 receives the transmission signal $GP(N_r(m−1)+n_s)$ from the quadrature modulator 31, and up-converts the baseband transmission signal $GP(N_r(m−1)+n_s)$ using the received transmission signal $GP(N_r(m−1)+n_s)$ and the transmission reference signal. In this manner, the frequency converter 32 generates a high-frequency radar transmission signal S-Tx1. The frequency converter 32 outputs the generated radar transmission signal S-Tx1 to the amplifier 33.

The amplifier 33 receives the radar transmission signal S-Tx1 from the frequency converter 32, amplifies the level of the received radar transmission signal S-Tx1 to a prescribed level, and outputs the amplified signal to the transmission antenna Ant-Tx1. The amplified radar transmission signal S-Tx1 is transmitted, that is, radiated to the space from the transmission antenna Ant-Tx1.

The transmission antenna Ant-Tx1 transmits, that is, radiates to the space, the radar transmission signal S-Tx1 that is output from the RF transmitter 3. As shown in FIG. 5, the radar transmission signal S-Tx1 is transmitted during the transmission interval $T_w$ of the transmission cycle and is not transmitted during the silent interval $T_r − T_w$.

The common reference signal generated by the reference signal oscillator Lo is supplied to the RF transmitter 3 and the RF receiver 4. This allows the RF transmitter 3 and the RF receiver 4 to operate in synchronism with each other.

(Radar Receiver)

Next, the configurations of the individual units of the radar receiver Rx will be described in detail with reference to FIG. 4.

As shown in FIG. 4, the radar receiver Rx is configured so as to include the RF receiver 4 to which the reception antenna Ant-Rx1 is connected, the VGA 5, and the signal processor 6. The RF receiver 4 is configured so as to include an amplifier 41, a frequency converter 42, and a quadrature detector 43. The signal processor 6 is configured so as to include an A/D converter 61, the reception phase shifter 62, the correlation value calculator 63, the coherent integrator 64, and the distance estimator 65. Each unit of the signal processor 6 performs a calculation periodically with each transmission cycle $T_r$ as a signal processing interval.

Next, how the individual units of the radar receiver Rx operate will be described in detail.

The reception antenna Ant-Rx1 receives a reflection wave signal that is a radar transmission signal S-Tx1 transmitted from the radar transmitter Tx and reflected by a target TAR. The reflection wave signal (reception signal) received by the reception antenna Ant-Rx1 is input to the RF receiver 4.

Like the RF transmitter 3, the RF receiver 4 generates a reception reference signal by multiplying the reference signal generated by the reference signal oscillator Lo by a prescribed number.

The amplifier 41 receives the high-frequency reflection wave signal (reception signal) received by the reception antenna Ant-Rx1, amplifies the level of the received reception signal, and outputs the resulting signal to the frequency converter 42.

The frequency converter 42 receives the high-frequency reception signal from the amplifier 41, and down-converts the high-frequency reception signal into a baseband signal using the received high-frequency reception signal and the reception reference signal. The frequency converter 42 generates the baseband reception signal in this manner, and outputs the generated baseband reception signal to the quadrature detector 43.

The quadrature detector 43 generates a baseband reception signal consisting of an in-phase signal (I signal) and a quadrate signal (Q signal) by quadrature-detecting the baseband reception signal that is output from the frequency converter 42. The quadrature detector 43 outputs the generated reception signal to the VGA 5.

The VGA 5 receives the baseband reception signal including the I signal and the Q signal from the quadrature detector 43, and adjusts the output level of the received baseband reception signal into an input range (dynamic range) of the A/D converter 61.

The VGA 5 outputs the output-level-adjusted reception signal including the I signal and the Q signal to the A/D converter 61. In the embodiment, it is assumed that the gain of the VGA 5 is adjusted in advance so that the output level of the reception signal falls within input range (dynamic range) of the A/D converter 61. A case of adjusting the VGA 5 will be described later.

Like the RF receiver 4, the signal processor 6 generates a reception reference clock signal by multiplying the reference signal generated by the reference signal oscillator Lo by a prescribed number. The individual units of the signal processor 6 operate on the basis of the generated reception reference clock signal.

Let $f_{RxBB}$ represent the reception reference dock frequency; then the transmission cycle $T_r$ is expressed as an integer $N_v$ multiple of a discrete time interval $1/f_{RxBB}$ which is determined by the reception reference clock frequency $f_{RxBB}$ (see Equation (10). In the following description, it is assumed that the transmission reference dock frequency $f_{TxBB}$ is equal to an integer $N_{TR}$ multiple of the reception reference clock frequency $f_{RxBB}$ (see Equation (11).

$$T_r = N_v \times \frac{1}{f_{RxBB}} \quad (10)$$

$$f_{TxBB} = N_{TR} \times f_{RxBB} \quad (11)$$

The A/D converter 61 receives the reception signal including the I signal and the Q signal from the VGA 5, and converts the analog data reception signal into digital data by sampling the received reception signal including the I signal and the Q signal every discrete time $1/f_{RxBB}$ on the basis of the reception reference clock frequency $f_{RxBB}$.

The A/D converter 61 outputs the digital data reception signal obtained through the conversion done every discrete time k to the reception phase shifter 62 in the form of discrete sample values. A reception signal $x(k_s)$ which is a converted discrete sample value is expressed as a complex number (see Equation (12)) using an I signal $I_r(k_s)$ and a Q signal $Q_r(k_s)$ which are sample values at a discrete time $k_s$:

[Formula 12]

$$x(k_s) = I_r(k_s) + jQ_r(k_s) \quad (12)$$

The discrete time $k_s$ represents a sampling time of the A/D converter 61; discrete times $k_s = 1$ and $k_s = N_v$ represent a start time point and an end time point of an mth transmission cycle $T_r$, respectively. The discrete time $k_s$ is a natural number and is 1, ..., $N_v$. Therefore, in the mth transmission cycle $T_r$ of Equation (12), the reception signal $x(k_s)$ that is output from the A/D converter 61 can be given by Equation (13):

[Formula 13]

$$X(N_v(m-1)+k_s) = I_r(N_v(m-1)+k_s) + jQ_r(N_v(m-1)+k_s) \quad (13)$$

The reception phase shifter 62 receives a reception signal $X(N_v(m-1)+k_s)$ from the A/D converter 61. The reception phase shifter 62 gives the received reception signal $X(N_v(m-1)+k_s)$ a reception phase shift that is opposite in direction to the phase shift component that was given by the transmission phase shifter 25 on the basis of a transmission timing signal that is output from the pulse transmission controller 21 every transmission cycle $T_r$.

More specifically, based on a transmission timing signal that is supplied from the pulse transmission controller 21 in an mth transmission cycle $T_r$, the reception phase shifter 62 gives the reception signal $X(N_v(m-1)+k_s)$ a reception phase shift $\exp(-j(m-1)\phi)$ corresponding to the ordinal number of the transmission cycle $T_r$ (see Equation (14)). The reception phase shifter 62 outputs a reception-phase-shift-added reception signal $XP(N_v(m-1)+k_s)$ to the correlation value calculator 63.

$$XP(N_v(m-1)+k_s) = \exp(-j(m-1)\phi)X(N_v(m-1)+k_s) \quad (14)$$

The correlation value calculator 63 receives the reception signal $XP(N_v(m-1)+k_s)$ from the reception phase shifter 62.

Based on the reception reference clock signal obtained by multiplying the reference signal by the prescribed number, the correlation value calculator 63 periodically generates, according to the discrete time $k_s$, a transmission code (pulse compression code) of the code sequence $C_n$ having the code length L transmitted in the mth transmission cycle $T_r$. The parameter n is 1, ..., L.

The correlation value calculator 63 calculates sliding correlation values $AC(k_s, m)$ between the received reception signal $XP(N_v(m-1)+k_s)$ and the pulse compression code $C_n$. Sliding correlation values $AC(k_s, m)$ are calculated by performing a sliding correlation operation on the transmission code (transmission signal) and the reception signal at discrete times $k_s$ in an mth transmission cycle $T_r$.

More specifically, the correlation value calculator 63 calculates sliding correlation values $AC(k_s, m)$ at discrete times $k_s$ (=1 to $N_v$) in an mth transmission cycle $T_r$ (each transmission cycle $T_r$) according to Equation (15). The correlation value calculator 63 outputs the sliding correlation values $AC(k_s, m)$ calculated according to Equation (15) to the coherent integrator 64. In Equation (15), the asterisk (*) is the complex conjugate operator.

$$AC(k_s, m) = \sum_{n=1}^{L} XP\left(N_v(m-1) + \frac{N_o(n-1)}{N_{TR}} + k_s\right) C_n^* \quad (15)$$

Although in each of the embodiments including this embodiment the correlation value calculator 63 performs calculations at discrete times $k_s = 1$ to $N_v$, the measurement range ($k_s$ range) may be narrowed further to, for example, $k_s = N_w/N_{TR} + 1, \ldots, (N_u - N_w)/N_{TR}$ according to the range of presence of a target TAR. With this measure, the radar apparatus 1 can reduce the amount of calculation of the correlation value calculator 63. That is, the radar apparatus 1 can reduce the power consumption as a result of reduction in the calculation amount of the signal processor 6.

Where the correlation value calculator 63 calculates sliding correlation values $AC(k_s, m)$ at discrete times $k_s = N_w/N_{TR} + 1, \ldots, (N_u - N_w)/N_{TR}$, the radar apparatus 1 can omit measurement of a reflection wave signal in each transmission interval of the radar transmission signal S-Tx1.

In the above radar apparatus 1, even if the radar transmission signal S-Tx1 goes around to enter the radar receiver Rx, a measurement can be performed with its influence eliminated. With the above restriction of the measurement range (the range of discrete times $k_s$), the coherent integrator 64 and the distance estimator 65 (described later) also operate in the restricted measurement range.

The coherent integrator 64 receives the sliding correlation values $AC(k_s, m)$ from the correlation value calculator 63. The coherent integrator 64 adds together, for each discrete time $k_s$, over a prescribed number (NP) of transmission cycles $T_r$ (NP×$T_r$), sliding correlation values $AC(k_s, m)$ calculated in the respective transmission cycles $T_r$.

The coherent integrator 64 calculates a vth coherent integration value $ACC(k_s, v)$ for each discrete time $k_s$, by adding together, for each discrete time $k_s$, sliding correlation values $AC(k_s, m)$ in the period NP×$T_r$ which is the prescribed number (NP) of transmission cycles $T_r$ according to Equation (16). The parameter NP represents the number of times of coherent integration performed in the coherent integrator 64. The coherent integrator 64 outputs the calculated coherent integration values $ACC(k_s, v)$ to the distance estimator 65.

$$ACC(k_s, v) = \sum_{m=1}^{NP} AC(k_s, NP(v-1) + m) \quad (16)$$

By setting the prescribed number NP at an integer multiple of $2\pi/\phi$ in Equation (16), the coherent integrator 64 can reduce influences of circuit errors even if a reflection wave signal contains circuit errors such as a DC offset component and IQ imbalance. That is, by setting the prescribed number NP at an integer multiple of $2\pi/\phi$, the radar apparatus 1 can prevent degradation of the target ranging performance even if a reflection wave signal contains circuit errors such as a DC offset component and IQ imbalance. Furthermore, the radar apparatus 1 can improve the reception quality (SNR: signal to noise ratio) of a reflection wave signal by suppressing noise components contained in the reflection wave signal by performing NP times of coherent integration.

The distance estimator 65 receives coherent integration values $ACC(k_s, v)$ at the respective discrete times $k_s$ from the coherent integrator 64 every NP transmission cycles $T_r$. The distance estimator 65 estimates a distance to the target TAR on the basis of the received coherent integration values ACC $(k_s, v)$ at the respective discrete times $k_s$. For example, the estimation method disclosed in the following Referential non-patent document 3 can be applied to the distance estimation performed in the distance estimator 65:

(Referential non-patent document 3) Bussgang, J. J., Nesbeda, P., and Safran, H., "A United Analysis of Range Performance of CW, Pulse, and Pulse Doppler Radar," Proceedings of the IRE, Vol 47, issue 10, pp. 1753-1762, 1959.

The square of the absolute value of each of coherent integration values that have been obtained in the vth output cycle $(v \times NP \times T_r)$ and supplied from the coherent integrator 64, $|ACC(k_s, v)|^2$, corresponds to a reception level of a reflection wave signal at each discrete time $k_s$. The distance estimator 65 estimates a distance $Range(k_{sp})$ according to Equation (17) on the basis of a detection time $k_{sp}$ pf a peak reception level that is higher than an environmental noise level of the radar apparatus 1 by a prescribed value or more. In Equation (17), the parameter $C_0$ represents the speed of light.

$$\text{Range}(k_{sp}) = C_0 \times (k_{sp} - 1) \times \frac{1}{2 f_{RxBB}} \quad (17)$$

(Simulation Result of Radar Apparatus)

FIG. 6(a) is a graph showing a simulation result of a target ranging characteristic of a conventional radar apparatus. FIG. 6(b) is a graph showing a simulation result of a target ranging characteristic of the radar apparatus 1 according to the first embodiment in a case that a phase rotation amount 45° is given in each transmission cycle. Four targets (measurement targets) are assumed in each of the simulations of FIGS. 6(a) and 6(b).

In FIGS. 6(a) and 6(b), the horizontal axis represents the distance $Range(k_{sp})$ (m) to a target TAR and the vertical axis represents the reception level (dB) of a reflection wave signal received by the radar receiver. As in FIG. 2(a), a DC offset component appears in a Doppler spectrum contained in the reflection wave signal in the range $(2F_{dmax})$ of values the Doppler frequency $f_d$ can take and hence it is difficult to separate the Doppler spectrum and the DC offset component from each other.

Therefore, the conventional radar apparatus is affected by the DC offset component, as a result of which the range sidelobe ratio of a reflection wave signal is increased and the target ranging characteristic is degraded (see FIG. 6(a)). For example, in FIG. 6(a), the main lobe of a reflection wave signal coming from a target having a distance of about 40 (m) is buried in sidelobes of a reflection wave signal coming from a target having a distance of about 37 (m). Therefore, it is difficult for the conventional radar apparatus to detect a target on the basis of a reflection wave signal coming from the target having the distance of about 40 (m).

In the radar apparatus 1, the radar transmitter Tx generates a high-frequency radar transmission signal by giving a transmission phase shift corresponding to a transmission cycle to a baseband transmission signal which uses, as a pulse compression code, a prescribed code sequence (e.g., Barker code sequence) having a low sidelobe characteristic. Furthermore, in the radar apparatus 1, the radar receiver Rx converts a high-frequency reflection wave signal into a baseband reception signal and gives the baseband reception signal a reception phase shift whose phase rotation amount is opposite in rotation direction to that of the transmission phase shift.

With these measures, the radar apparatus 1 can separate a DC offset component from a Doppler spectrum contained in the reflection wave signal in the range $(2F_{dmax})$ of values the Doppler frequency $f_d$ can take, and thereby suppress influence of the transmission phase shift on the Doppler spectrum. For example, in FIG. 6(b), the main lobe of a reflection wave signal coming from each of the targets located around 40 (m) is received properly by the radar receiver Rx. Thus, the target ranging characteristic of the radar apparatus 1 is made better than the target ranging characteristic shown in FIG. 6(a).

As such, the radar apparatus 1 according to the first embodiment provides an advantage even in the case where circuit errors such as a DC offset and IQ imbalance exist, increase of range sidelobes can be prevented and degradation of the target ranging performance can be suppressed effectively without the need for providing a circuit error correction circuit.

In each of the embodiments including this embodiment, where the phase rotation amount φ of the transmission phase shift is set at 90°, the phase shift component that is given in the transmission phase shifter 25 is restricted to four values [0°, 90°, 180°, 270°]. Therefore, the circuits of the transmission phase shifter 25 and the reception phase shifter 62 can be constructed easily because phase shifts 90° and 270° are realized by interchange between an I signal component and a Q signal component on the complex IQ plane and a phase shift 180° is realized by positive/negative sign changes.

(Modification 1 of Embodiment 1)

In a first modification of the first embodiment, the reception phase shifter 62 used in the first embodiment is provided to give a reception phase shift to sliding correlation values $AC(k_s, m)$ that are output from the correlation value calculator 63 (see FIG. 7).

FIG. 7 is a block diagram showing, in detail, the internal configuration of a radar apparatus 1a according to the first modification of the first embodiment. Units (blocks) of the radar apparatus 1a having the same (in configuration and operation) units in the radar apparatus 1 according to the first embodiment will be given the same reference symbols as the latter, and their configurations and operations will not be described (only differences will be described).

As shown in FIG. 7, a radar receiver Rxa is configured so as to include the RF receiver 4, the VGA 5, and a signal processor 6a. The signal processor 6a is configured so as to include the A/D converter 61, a correlation value calculator 63a, a reception phase shifter 62a, a coherent integrator 64a, and the distance estimator 65.

The correlation value calculator 63a receives a reception signal $X(N_v(m-1)+k_s)$ from the A/D converter 61.

Based on a reception reference clock signal obtained by multiplying a reference signal by a prescribed number, the correlation value calculator 63a periodically generates, according to the discrete time $k_s$, a transmission code (pulse compression code) of the code sequence $C_n$ having the code length L transmitted in an mth transmission cycle $T_r$. The parameter n is 1, ..., L.

The correlation value calculator 63a calculates sliding correlation values $AC(k_s, m)$ between the received reception signal $XP(N_v(m-1)+k_s)$ and the pulse compression code $C_n$.

More specifically, the correlation value calculator 63a calculates sliding correlation values $AC(k_s, m)$ at discrete times $k_s$ (=1 to $N_v$) in an mth transmission cycle $T_r$ (each transmission cycle $T_r$) according to Equation (18). The correlation value calculator 63a outputs the sliding correlation values AC($k_s$, m) calculated according to Equation (18) to the reception phase shifter 62a. In Equation (18), the asterisk (*) is the complex conjugate operator.

[Formula 18]

$$AC(k_s, m) = \sum_{n=1}^{L} X\left(N_v(m-1) + \frac{N_o(n-1)}{N_{TR}} + k_s\right) C_n^*  \qquad (18)$$

The reception phase shifter 62a receives the sliding correlation values AC($k_s$, m) from the correlation value calculator 63a. The reception phase shifter 62a gives the received sliding correlation values AC($k_s$, m) a reception phase shift that is opposite in direction to the phase shift component that was given by the transmission phase shifter 25 on the basis of a transmission timing signal that is supplied from the pulse transmission controller 21 in the mth transmission cycle $T_r$.

More specifically, based on a transmission timing signal that is supplied from the pulse transmission controller 21 in an mth transmission cycle $T_r$, the reception phase shifter 62a gives the sliding correlation values AC($k_s$, m) a reception phase shift exp(−j(m−1)φ) corresponding to the ordinal number of the transmission cycle $T_r$ (see Equation (19)). The reception phase shifter 62a outputs reception-phase-shift-added sliding correlation values ACP($k_s$, m) to the coherent integrator 64a.

$$ACP(k_s, m) = \exp(-j(m-1)\phi) AC(k_s, m)  \qquad (19)$$

The coherent integrator 64a receives the sliding correlation values ACP($k_s$, m) from the reception phase shifter 62a. The coherent integrator 64a adds together, for each discrete time $k_s$, over a prescribed number (NP) of transmission cycles $T_r$ (NP×$T_r$), sliding correlation values ACP($k_s$, m) calculated in the respective transmission cycles $T_r$.

The coherent integrator 64a calculates a vth coherent integration value ACC($k_s$, v) for each discrete time $k_s$ by adding together, for each discrete time $k_s$, sliding correlation values ACP($k_s$, m) in the period NP×$T_r$ which is the prescribed number (NP) of transmission cycles $T_r$ according to Equation (20). The parameter NP represents the number of times of coherent integration performed in the coherent integrator 64a. The coherent integrator 64a outputs the calculated coherent integration values ACC($k_s$, v) to the distance estimator 65.

$$ACC(k_s, v) = \sum_{m=1}^{NP} ACP(k_s, NP(v-1)+m)  \qquad (20)$$

By setting the prescribed number NP at an integer multiple of 2π/φ in Equation (20), the coherent integrator 64a can reduce influences of circuit errors even if a reflection wave signal contains circuit errors such as a DC offset component and IQ imbalance. That is, by setting the prescribed number NP at an integer multiple of 2π/φ, the radar apparatus 1a can prevent degradation of the target ranging performance even if a reflection wave signal contains circuit errors such as a DC offset component and IQ imbalance. Furthermore, the radar apparatus 1a can improve the reception quality (SNR) of a reflection wave signal by suppressing noise components contained in the reflection wave signal by performing NP times of coherent integration.

As such, the radar apparatus 1a according to the first modification of the first embodiment provides the same advantages as the radar apparatus 1 according to the first embodiment (Modification 2 of Embodiment 1)

In a second modification of the first embodiment, as shown in FIG. 8, a DC offset estimator 66 and a DC offset corrector 71 are added to the radar apparatus 1a according to the first modification of the first embodiment.

FIG. 8 is a block diagram showing, in detail, the internal configuration of a radar apparatus 1b according to the second modification of the first embodiment. Units (blocks) of the radar apparatus 1b having the same (in configuration and operation) units in the radar apparatus 1a according to the first modification of the first embodiment will be given the same reference symbols as the latter, and their configurations and operations will not be described (only differences will be described).

As shown in FIG. 8, a radar receiver Rxb is configured so as to include the RF receiver 4, the VGA 5, a signal processor 6a, and the DC offset corrector 71. The signal processor 6b is configured so as to include the A/D converter 61, the correlation value calculator 63a, the reception phase shifter 62a, the DC offset estimator 66, the coherent integrator 64a, and the distance estimator 65.

The DC offset estimator 66 receives sliding correlation values ACP($k_s$, m) from the correlation value calculator 63a. The DC offset estimator 66 adds together, for each discrete time $k_s$, over a prescribed number (NF) of transmission cycles $T_r$ (NF×$T_r$), sliding correlation values ACP($k_s$, m) calculated in the respective transmission cycles $T_r$.

The DC offset estimator 66 calculates an estimation value DCO(z) of a DC offset component (DC offset amount) by calculating an average value of addition values, calculated over the prescribed number (NF) of transmission cycles $T_r$ (NF×$T_r$) for the respective discrete times $k_s$, of sliding correlation values ACP($k_s$, m) (see Equation (21)). The DC offset estimator 66 outputs the DC offset component estimation value DCO(z) calculated according to Equation (21) to the DC oddest corrector 71. The parameter z is a natural number and represents the ordinal number of the transmission cycle $T_r$.

$$DCO(z) = \frac{1}{L \cdot N_v \cdot NF} \sum_{k_s=1}^{N_v} \sum_{m=1}^{NF} ACP(k_s, NF(z-1)+m)  \qquad (21)$$

The sliding correlation values ACP($k_s$, m) that are output from the correlation value calculator 63a are correlation values that are not given a reception phase shift by the reception phase shifter 62a. Therefore, a DC offset component is included in the form of a DC component in a reflection wave signal reflected by a target TAR (see FIG. 2(b)). A reflection wave signal contains Doppler frequencies that are higher than or equal to |φ/2π$T_r$|−$F_{dmax}$.

Therefore, by setting a prescribed number NF that satisfies the relationship of Inequality (22), components of the reflection wave signal reflected by a target that are contained in the sliding correlation values ACP($k_s$, m) are eliminated (suppressed). This allows the DC offset estimator 66 to estimate a DC offset component.

$$\left(\frac{\phi}{2\pi T_r} - F_{dmax}\right) \times NF \times T_r > 1  \qquad (22)$$

The DC offset corrector 71 receives the DC offset component estimation value DCO(z) from the DC offset estimator 66. The DC offset corrector 71 reduces the DC offset amount to be input to the A/D converter 61 by adjusting a DC offset amount in the VGA 5 on the basis of the received DC offset component estimation value DCO(z). That is, the VGA 5 adjusts the output level of a received reception signal according to the adjusted DC offset amount and thereby causes the output level of the received reception signal to fall within the input range of the A/D converter 61.

As described above, according to the second modification of the first embodiment, since the DC offset component estimation calculation is performed by the DC offset estimator 66, components, in sliding correlation values, of a reflection wave signal reflected by a target TAR can be suppressed effectively and a DC offset component can be estimated. As a result, in the radar apparatus 1b, the accuracy of estimation of a DC offset component can be increased even if the addition time (NF×$T_r$) of sliding correlation values ACP($k_s$, m) in the DC offset estimator 66 is short.

In the radar apparatus 1b, the DC offset amount to be input to the A/D converter 61 is reduced by adjusting a DC offset amount in the VGA 5 using an estimated DC offset component. As a result, the input range of the A/D converter 61 can be used effectively. That is, the radar apparatus 1b can prevent a phenomenon that one of a positive signal and a negative signal of a reception signal that is input to the A/D converter 61 goes out of the input range of the A/D converter 61 and is thereby saturated.

(Modification 3 of Embodiment 1)

In a third modification of the first embodiment, as shown in FIG. 9, a DC offset estimator 66 and a DC offset corrector 71 are added to the radar apparatus 1 according to the first embodiment.

FIG. 9 is a block diagram showing, in detail, the internal configuration of a radar apparatus 1c according to the third modification of the first embodiment. Units (blocks) of the radar apparatus 1c having the same (in configuration and operation) units in the radar apparatus 1 according to the first embodiment will be given the same reference symbols as the latter, and their configurations and operations will not be described (only differences will be described).

As shown in FIG. 9, a radar receiver Rxc is configured so as to include the RF receiver 4, the VGA 5, a signal processor 6c, and the DC offset corrector 71c. The signal processor 6c is configured so as to include the A/D converter 61, the reception phase shifter 62, the correlation value calculator 63, the DC offset estimator 66c, the coherent integrator 64, and the distance estimator 65.

The DC offset estimator 66c receives sliding correlation values AC($k_s$, m) from the correlation value calculator 63. The DC offset estimator 66c gives sliding correlation values AC($k_s$, m) calculated at discrete times $k_s$ in an mth transmission cycle $T_r$ a transmission phase shift corresponding to the transmission phase shift that was given by the transmission phase shifter 25. Furthermore, the DC offset estimator 66c adds together transmission-phase-shift-added sliding correlation values AC($k_s$, m) over a prescribed number (NF) of transmission cycles $T_r$ (NF×$T_r$) for each discrete time $k_s$.

The DC offset estimator 66c calculates an estimation value DCO(z) of a DC offset component (DC offset amount) by calculating an average value of addition values, calculated over the prescribed number (NF) of transmission cycles $T_r$ (NF×$T_r$) for the respective discrete times $k_s$, of sliding correlation values AC($k_s$, m) (see Equation (23)). The DC offset estimator 66c outputs the DC offset component estimation value DCO(z) calculated according to Equation (23) to the DC oddest corrector 71c. The parameter z is a natural number and represents the ordinal number of the transmission cycle $T_r$.

$$DCO(z) = \frac{1}{L \cdot N_v \cdot NF} \sum_{k_s=1}^{N_v} \sum_{m=1}^{NF} \exp(j(m-1)\phi) AC(k_s, NF(z-1)+m) \quad (23)$$

The sliding correlation values AC($k_s$, m) that are output from the correlation value calculator 63 are correlation values that are given a reception phase shift by the reception phase shifter 62. Therefore, a DC offset component is shifted by a Doppler frequency component ($|\phi/2\pi T_r|$) contained in a reflection wave signal reflected by a target TAR (see FIG. 2(c)). Again adding the same transmission phase shift corresponding to the transmission cycle $T_r$ as was added by the transmission phase shifter 25 allows the DC offset estimator 66c to estimate a DC offset component. A reflection wave signal contains Doppler frequencies that are higher than or equal to $|\phi/2\pi T_r| - F_{dmax}$.

Therefore, by setting a prescribed number NF that satisfies the relationship of Inequality (22), components of the reflection wave signal reflected by a target that are contained in the sliding correlation values AC($k_s$, m) are eliminated (suppressed). This allows the DC offset estimator 66c to estimate a DC offset component.

The DC offset corrector 71c receives the DC offset component estimation value DCO(z) from the DC offset estimator 66c. The DC offset corrector 71c reduces the DC offset amount to be input to the A/D converter 61 by adjusting a DC offset amount in the VGA 5 on the basis of the received DC offset component estimation value DCO(z). That is, the VGA 5 adjusts the output level of a received reception signal according to the adjusted DC offset amount and thereby causes the output level of the received reception signal to fall within the input range of the A/D converter 61.

As described above, in the radar apparatus 1c according to the third modification of the first embodiment, since the DC offset component estimation calculation is performed by the DC offset estimator 66c, components, in sliding correlation values, of a reflection wave signal reflected by a target TAR can be suppressed effectively and a DC offset component can be estimated. As a result, the accuracy of estimation of a DC offset component can be increased even if the addition time (NF×$T_r$) of sliding correlation values AC($k_s$, m) in the DC offset estimator 66c is short.

In the radar apparatus 1c, the DC offset amount to be input to the A/D converter 61 is reduced by adjusting a DC offset amount in the VGA 5 using an estimated DC offset component. As a result, the input range of the A/D converter 61 can be used effectively. That is, the radar apparatus 1c can prevent a phenomenon that one of a positive signal and a negative signal of a reception signal that is input to the A/D converter 61 goes out of the input range of the A/D converter 61 and is thereby saturated.

(Modification 4 of Embodiment 1)

In a fourth modification of the first embodiment, as shown in FIG. 10, a reception level detector 67 and a VGA controller 72 are added to the radar apparatus 1a according to the first modification of the first embodiment.

FIG. 10 is a block diagram showing, in detail, the internal configuration of a radar apparatus 1d according to the fourth modification of the first embodiment. Units (blocks) of the radar apparatus 1d having the same (in configuration and operation) units in the radar apparatus 1a according to the first modification of the first embodiment will be given the same reference symbols as the latter, and their configurations and operations will not be described (only differences will be described).

As shown in FIG. 10, a radar receiver Rxd is configured so as to include the RF receiver 4, the VGA 5, a signal processor 6d, and the VGA controller 72. The signal processor 6d is configured so as to include the A/D converter 61, the reception level detector 67, the correlation value calculator 63a, the reception phase shifter 62a, the coherent integrator 64, and the distance estimator 65.

The reception level detector 67 receives a reception signal $X(N_v(m-1)+k_s)$ from the A/D converter 61. The reception level detector 67 detects an output level of the reception signal $X(N_v(m-1)+k_s)$ on the basis of the received reception signal $X(N_v(m-1)+k_s)$. For example, the output level is an average amplitude value, amplitude values larger than a prescribed amplitude value, or a maximum amplitude value. The reception level detector 67 outputs the detected output level of the reception signal $X(N_v(m-1)+k_s)$ to the VGA controller 72.

The VGA controller 72 receives the output level of the reception signal $X(N_v(m-1)+k_s)$ from the reception level detector 67. If it is judged on the basis of the received output level of the reception signal $X(N_v(m-1)+k_s)$ that the output level of the reception signal $X(N_v(m-1)+k_s)$ is lower than a prescribed level, the VGA controller 72 outputs, to the VGA 5, a control signal to the effect that the gain of the VGA 5 should be increased.

On the other hand, if it is judged on the basis of the received output level of the reception signal $X(N_v(m-1)+k_s)$ that the output level of the reception signal $X(N_v(m-1)+k_s)$ is higher than the prescribed level, the VGA controller 72 outputs, to the VGA 5, a control signal to the effect that the gain of the VGA 5 should be decreased.

Based on transmission timing signals that are output from the pulse transmission controller 21 at intervals that are equal to the transmission cycle $T_r$, the VGA controller 72 outputs, to the VGA 5, trigger signals for changing the gain of the VGA 5 at intervals that are equal to the transmission cycle $T_r$ multiplied by an integer multiple of $2\pi/\phi$, that is, at intervals of $2\pi T_r/\phi$. The VGA 5 increases or decreases its gain on the basis of the control signals and the trigger signals.

(Modification 5 of Embodiment 1)

In a fifth modification of the first embodiment, as shown in FIG. 11, a reception level detector 67 and a VGA controller 72 are added to the radar apparatus 1 according to the first embodiment.

FIG. 11 is a block diagram showing, in detail, the internal configuration of a radar apparatus 1e according to the fifth modification of the first embodiment. Units (blocks) of the radar apparatus 1e having the same (in configuration and operation) units in the radar apparatus 1 according to the first embodiment will be given the same reference symbols as the latter, and their configurations and operations will not be described (only differences will be described).

As shown in FIG. 11, a radar receiver Rxe is configured so as to include the RF receiver 4, the VGA 5, a signal processor 6e, and the VGA controller 72. The signal processor 6e is configured so as to include the A/D converter 61, the reception level detector 67, the reception phase shifter 62, the correlation value calculator 63, the coherent integrator 64, and the distance estimator 65.

Since how the reception level detector 67 and the VGA controller 72 operate has been described in the fourth modification of the first embodiment and hence will not be described in this embodiment.

In the radar apparatus 1d and 1e according to the fourth and fifth modifications of the first embodiment, the VGA controller 72 can control (change) the gain of the VGA 5 with such timing that the transmission phase shift has made one rotation (changed by $2\pi$) on the phase plane.

As a result, the radar apparatus 1d and 1e can eliminate circuit errors such as a DC offset component and IQ imbalance and properly adjust the output level of a reception signal that is input to the A/D converter 61. As such, the radar apparatus 1d and 1e can suppress increase of range sidelobes effectively and thereby prevent degradation of the target ranging performance.

(Modification 6 of Embodiment 1)

In a sixth medication of the first embodiment, as shown in FIG. 12, plural ($N_a$) radar receivers which are provided so as to correspond to respective reception antennas serve to estimate a distance to a target and an incoming direction of a reflection wave signal. To simplify the description, the following description will be directed to an example case that the parameter $N_a$ is equal to 2.

FIG. 12 is a block diagram showing, in detail, the internal configuration of a radar apparatus 1f according to the sixth modification of the first embodiment. Units (blocks) of the radar apparatus 1f having the same (in configuration and operation) units in the radar apparatus 1 according to the first embodiment will be given the same reference symbols as the latter, and their configurations and operations will not be described (only differences will be described).

As shown in FIG. 12, the radar apparatus 1f is configured so as to include the reference signal oscillator Lo, the radar transmitter Tx, two radar receivers Rxf1 and Rxf2, and a distance/direction estimator 81 (parameter $N_a=2$). The two radar receivers Rxf1 and Rxf2 are the same in configuration and operation except that they are connected to different reception antennas Ant-Rx1 and Ant-Rx2, and hence the radar receiver Rxf1 will be described below as an example.

The radar transmitter Tx and the two radar receivers Rxf1 and Rxf2 are connected to the reference signal oscillator Lo and are supplied with a reference signal from the reference signal oscillator Lo, whereby the radar transmitter Tx and the two radar receivers Rxf1 and Rxf2 operate in synchronism with each other.

The radar receiver Rxf1 is configured so as to include the RF receiver 4, the VGA 5, and a signal processor 6f. The signal processor 6f is configured so as to include the A/D converter 61, the reception phase shifter 62, the correlation value calculator 63, and the coherent integrator 64.

The distance/direction estimator 81 receives sets of coherent integration values from the coherent integrators of the two radar receivers Rxf1 and Rxf2, respectively. Based on the received sets of coherent integration values, the distance/direction estimator 81 estimates a distance to a target TAR and an incoming direction of a reflection wave signal reflected by the target TAR. The method by which the distance/direction estimator 81 estimates a distance to a target TAR is the same as that by which the distance estimator 65 of the radar apparatus 1 according to the first embodiment does, and hence will not be described.

The distance/direction estimator 81 estimates an incoming direction of a reflection wave signal on the basis of a difference between reception phases of reflection wave signals received by the reception antennas Ant-Rx1 and Ant-Rx2 of the two radar receivers Rxf1 and Rxf2. That is, the distance/direction estimator 81 estimates an incoming direction on the basis of a difference between reception phases of coherent integration values $ACC^1(k_s, v)$ and coherent integration values $ACC^2(k_s, v)$ which are output from the coherent integrators of the two radar receivers Rxf1 and Rxf2, respectively, and outputs a maximum reception power direction as an incoming direction estimation value. The incoming direction estimation processing of the distance/direction estimator 81 may be the estimation method disclosed in the following Referential non-patent document 4, for example:

(Referential non-patent document 4) Cadzow, J. A., "Direction-of-Arrival Estimation Using Signal Subspace Modeling," Aerospace and Electronic Systems, IEEE Transactions on Volume 28, Issue 1, pp. 64-79, 1992.

As such, the radar apparatus 1f according to the sixth modification of the first embodiment provides, in addition to the advantages of the first embodiment, an advantage that it can estimate a distance to a target and an incoming direction of a reflection wave signal using the plural ($N_a$) radar receivers which are provided so as to correspond to the respective reception antennas.

(Embodiment 2)

In the first embodiment, it is preferable to use, as the transmission code, one of a Barker code sequence, an M-sequence code, and a Gold code sequence which can provide a low range sidelobe characteristic. The second embodiment employs a complementary code in place of the transmission code used in the radar apparatus 1 according to the first embodiment.

FIG. 13($a$) is a graph showing a simulation result of a target ranging characteristic in a case that a complementary code is used as a transmission code and the phase rotation angle of transmission phase shifting is set at 45°. FIG. 13($b$) is a graph showing a simulation result of a target ranging characteristic in a case that a complementary code is used as a transmission code and the phase rotation angle of transmission phase shifting is set at 90°. In the following description, a pair of code sequences of a complementary code is denotes by $A_n$ and $B_n$.

Where transmission phase shifts corresponding to a phase rotation amount of 45° or 90° is given to individual elements of a complementary code of each transmission cycle $T_r$, an DC offset component is eliminated. However, as shown in FIG. 13($a$) or 13($b$), the complementary code comes not to provide a satisfactory low range sidelobe characteristic to leave range sidelobe components.

More specifically, in the example of FIG. 13($a$) in which transmission phase shifts corresponding to a phase rotation amount of 45° are given to individual elements of a complementary code for each transmission cycle $T_r$, the transmission code becomes [$A_n$, $B_n\exp(j\pi/4)$, $A_n\exp(j\pi/2)$, $B_n\exp(j3\pi/4)$, $-A_n$, $-B_n\exp(j\pi/4)$, $-A_n\exp(j\pi/2)$, $-B_n\exp(j3\pi/4)$]. A DC offset component is eliminated because positive and negative elements having the same absolute value (e.g., $A_n$ and $-A_n$) among each set of elements of the complementary code are transmitted.

However, since successive elements (e.g., $A_n$ and $B_n\exp(j\pi/4)$) among the elements of the complementary code have phases that are deviated from each other by 45°, the complementary code no longer provides a satisfactory low range sidelobe characteristic, as a result of which range sidelobe components remain around 8 (m) and 32 (m), for example (see FIG. 13($a$)).

In the example of FIG. 13($b$) in which transmission phase shifts corresponding to a phase rotation amount of 90° are given to individual elements of a complementary code for each transmission cycle $T_r$, the transmission code becomes [$A_n$, $jB_n$, $-A_n$, $-jB_n$]. In the case of the transmission phase shifting corresponding to the phase rotation amount of 90°, as in the case where transmission phase shifts corresponding to a phase rotation amount of 45° are given, a DC offset component is eliminated because positive and negative elements having the same absolute value (e.g., $A_n$ and $-A_n$) among each set of elements of the complementary code are transmitted.

However, since successive elements (e.g., $A_n$ and $jB_n$) among the elements of the complementary code have phases that are deviated from each other by a large angle of 90°, the complementary code no longer provides a satisfactory low range sidelobe characteristic, as a result of which remarkable range sidelobe components remain in a range of 3 to 38 (m), for example (see FIG. 13($b$)). In this case, range sidelobes can be suppressed by decreasing the transmission phase shift components. However, where a target movement is assumed, if the inversion phase cycle, that is, the time to transmission of a sign-inverted element among the elements of the complementary code, is made longer, the DC offset elimination performance is lowered, as a result of which range sidelobes are increased and the target ranging characteristic is degraded.

In the second embodiment, the above problem, that is, the degradation of the target ranging characteristic, is solved by employing code sequences ($A_n$, $B_n$) of a complementary code as a transmission code and assigning a transmission phase shift corresponding to the prescribed, same phase rotation amount every two transmission cycles ($2T_r$).

The configuration and the operation of a radar apparatus 1g according to the second embodiment will be described with reference to FIGS. 14-16. FIG. 14 is a block diagram showing, in a simplified manner, the internal configuration of the radar apparatus 1g according to the second embodiment. FIG. 15 is a block diagram showing, in detail, the internal configuration of the radar apparatus 1g according to the second embodiment. FIG. 16 illustrates relationships between transmission intervals, transmission cycles, and transmission phase shift components of a radar transmission signal S-Tx1 in a case that time-division transmission is done at intervals of two transmission cycles ($2T_r$) using a complementary code as a transmission code.

Units (blocks) of the radar apparatus 1g having the same (in configuration and operation) units in the radar apparatus 1 according to the first embodiment will be given the same reference symbols as the latter, and their configurations and operations will not be described (only differences will be described).

First, the configurations of the individual units of the radar apparatus 1g will be described in a simplified manner.

As shown in FIG. 14, the radar apparatus 1g is configured so as to include the reference signal oscillator Lo, a radar transmitter Txg, and a radar receiver Rxg. The radar transmitter Txg is configured so as to include a transmission signal generator 2g and the RF transmitter 3 which is connected to the transmission antenna Ant-Tx1. The transmission signal generator 2g is configured so as to include a pulse transmission controller 21g, a code generator 22g, a modulator 23g, and a transmission phase shifter 25g. The code generator 22g includes, as at least one code generator, a first code generator 22g1 and a second code generator 22g2 and generates at least one code sequence.

The radar transmitter Txg and the radar receiver Rxg are connected to the reference signal oscillator Lo and are supplied with a reference signal from the reference signal oscillator Lo, whereby processing performed by the radar transmitter Txg and processing performed by the radar receiver Rxg are synchronized with each other.

The radar receiver Rxg is configured so as to include the RF receiver 4, the VGA 5, and a signal processor 6g. The signal processor 6g is configured so as to include a reception phase shifter 62g, a correlation value calculator 63g, a coherent integrator 64g, and the distance estimator 65.

(Radar Transmitter)

Next, the configurations of the individual units of the radar transmitter Txg be described in detail with reference to FIG. 15.

As shown in FIG. 15, the transmission signal generator 2g is configured so as to include the pulse transmission controller 21g, the code generator 22g, the modulator 23g, the LPF 24, the transmission phase shifter 25a, and the D/A converter 26. Although in FIG. 15 the transmission signal generator 2g includes the LPF 24, the LPF 24 may be provided in the radar transmitter Txg independently of the transmission signal generator 2g. The RF transmitter 3 is configured so as to include the quadrature modulator 31, the frequency converter 32, and the amplifier 33.

Next, how the individual units of the radar transmitter Txg operate will be described in detail.

Based on a reference signal generated by the reference signal oscillator Lo, the transmission signal generator 2g generates a transmission reference clock signal by multiplying the reference signal by a prescribed number. The individual units of the transmission signal generator 2g operate on the basis of the generated transmission reference clock signal. Let $f_{TxBB}$ represent the transmission reference clock frequency; then the transmission cycle $T_r$ is expressed as an integer $N_r$ multiple of a discrete time interval $1/f_{TxBB}$ which is determined by the transmission reference clock frequency $f_{TxBB}$ (see Equation (5)).

The transmission signal generator 2g periodically generates a baseband transmission signal (pulse compression code) $G(n_s)$ (see Equation (6)) by modulating a pair of complementary code sequences $A_n$ and $B_n$ having a code length L on the basis of transmission timing signals (for a radar transmission signal) which are output from the pulse transmission controller 21g in respective transmission cycles $T_r$. The parameter n is equal to 1, . . . , L, and the parameter L represents the code length of each of the code sequences $A_n$ and $B_n$. The parameter j is the imaginary number unit which satisfies $j^2=-1$. The parameter $n_s$ is a natural number and represents discrete time.

As shown in FIG. 16, the transmission signal $G(n_s)$ is such that each code of the one complementary code sequence $A_n$ is modulated using $N_o$ samples of the transmission reference dock signal in the transmission intervals $T_w$ (s) of, for example, mth and (m+2)th transmission cycles $T_r$. Furthermore, each code of the other complementary code sequence $B_n$ is modulated using $N_o$ samples of the transmission reference clock signal in the transmission intervals $T_w$ (s) of (m+1)th and (m+3)th transmission cycles $T_r$.

Therefore, in each transmission interval $T_w$, modulation is done using $N_w$ (=$N_o \times L$) samples. In the silent interval ($T_r - T_w$) (s) of each transmission cycle $T_r$, modulation is done using $N_u$ (=$N_r - N_w$) samples. Therefore, the transmission signal $G(n_s)$ of Equation (6) is expressed as Equation (7).

The pulse transmission controller 21g generates a transmission timing signal for a high-frequency radar transmission signal every transmission cycle $T_r$ and outputs it to each of the code generator 22g, the transmission phase shifter 25g, and the reception phase shifter 62g.

The code generator 22g, which includes the first code generator 22g1 and the second code generator 22g2, causes the first code generator 22g1 and the second code generator 22g2 to output transmission codes generated therein to the modulator 23g so as to switch between them alternately every transmission cycle $T_r$ on the basis of a transmission timing signal generated by the pulse transmission controller 21g every transmission cycle $T_r$.

The first code generator 22g1 generates a transmission code (pulse compression code) of the one complementary code sequence $A_n$ of the complementary code sequences $A_n$ and $B_n$ having the code length L on the basis of a transmission timing signal that is output from the pulse transmission controller 21g every odd-numbered transmission cycle $T_r$. The first code generator 22g1 outputs the generated transmission code of the complementary code sequence $A_n$ to the modulator 23g. In the following description, for the sake of convenience, the transmission code of the complementary code sequence $A_n$ will be written as a transmission code $A_n$.

The second code generator 22g2 generates a transmission code (pulse compression code) of the other complementary code sequence $B_n$ of the complementary code sequences $A_n$ and $B_n$ having the code length L on the basis of a transmission timing signal that is output from the pulse transmission controller 21g every even-numbered transmission cycle $T_r$. The second code generator 22g2 outputs the generated transmission code of the complementary code sequence $B_n$ to the modulator 23g. In the following description, for the sake of convenience, the transmission code of the complementary code sequence $B_n$ will be written as a transmission code $B_n$.

It has been described above that in this embodiment the first code generator 22g1 generates a complementary code sequence $A_n$ having a code length L and the second code generator 22g2 generates a complementary code sequence $B_n$ having a code length L. However, the first code generator 22g1 and the second code generator 22g2 may generate a complementary code sequence $B_n$ having a code length L and a complementary code sequence $A_n$ having a code length L, respectively.

The modulator 23g receives the transmission codes $A_n$ and $B_n$ from the first code generator 22g1 and the second code generator 22g2, respectively. The modulator 23g generates a baseband transmission signal $G(n_s)$ of Equation (6) by pulse-modulating the received transmission codes $A_n$ and $B_n$. The modulator 23g outputs a transmission signal $G(n_s)$, in a preset limited band or lower, of the generated transmission signal $G(n_s)$ to the transmission phase shifter 25g via the LPF 24.

The transmission phase shifter 25g receives the transmission signal $G(n_s)$ from the modulator 23g or the LPF 24. The transmission phase shifter 25g gives a prescribed transmission phase shift corresponding to the transmission cycles ($2T_r$) of a pair of complementary code sequences to the received transmission signal $G(n_s)$ on the basis of transmission timing signals that are output from the pulse transmission controller 21g in respective transmission cycles $T_r$ (see FIG. 16). That is, the transmission phase shifter 25g gives a phase shift corresponding to two transmission cycles (at least one transmission cycle) to the baseband transmission signal.

More specifically, based on transmission timing signals that are supplied from the pulse transmission controller 21 in mth and (m+1)th transmission cycles $T_r$, the transmission phase shifter 25g gives the transmission signal $G(n_s)$ the same transmission phase shift $\exp(j \cdot \text{floor}[(m-1)/2]\phi)$ corresponding to the ordinal numbers of the transmission cycles $T_r$ (see Equation (24)). The transmission phase shifter 25g outputs a transmission-phase-shift-added transmission signal $GP(N_r(m-1)+n_s)$ to the D/A converter 26. The operator floor[x] is an operator of outputting an integer obtained by rounding down a real number x.

$$GP(N_r(m-1)+n_s) = \exp\left(j\ \text{floor}\left[\frac{m-1}{2}\right]\phi\right) G(N_r(m-1)+n_s) \quad (24)$$

(Radar Receiver)

Next, the configurations of the individual units of the radar receiver Rxg will be described in detail with reference to FIG. 15.

As shown in FIG. 15, the radar receiver Rx is configured so as to include the RF receiver 4 to which the reception antenna Ant-Rx1 is connected, the VGA 5, and the signal processor 6g. The RF receiver 4 is configured so as to include the amplifier 41, the frequency converter 42, and the quadrature detector 43. The signal processor 6g is configured so as to include the A/D converter 61, the reception phase shifter 62g, the correlation value calculator 63g, the coherent integrator 64g, and the distance estimator 65. Each unit of the signal processor 6g performs a calculation periodically with each transmission cycle $T_r$ as a signal processing interval.

Next, how the individual units of the radar receiver Rxg operate will be described in detail.

Like the RF receiver 4, the signal processor 6g generates a reception reference clock signal by multiplying a reference signal generated by the reference signal oscillator Lo by a prescribed number. The individual units of the signal processor 6g operate on the basis of the generated reception reference clock signal.

The reception phase shifter 62g receives a reception signal $X(N_v(m-1)+k_s)$ from the A/D converter 61. The reception phase shifter 62g gives the received reception signal $X(N_v(m-1)+k_s)$ a reception phase shift that is opposite in direction to the phase shift component that was given by the transmission phase shifter 25g on the basis of a transmission timing signal that is output from the pulse transmission controller 21g every transmission cycle $T_r$.

More specifically, based on a transmission timing signal that is supplied from the pulse transmission controller 21a in an mth transmission cycle $T_r$, the reception phase shifter 62g gives the reception signal $X(N_v(m-1)+k_s)$ the same reception phase shift $\exp(-j \cdot \text{floor}[(m-1)/2])$ corresponding to the ordinal number of the transmission cycle $T_r$ (see Equation (25)). The reception phase shifter 62g outputs a reception-phase-shift-added reception signal $XP(N_v(m-1)+k_s)$ to the correlation value calculator 63g.

$$XP(N_v(m-1)+k_s) = \exp\left(-j\;\text{floor}\left[\frac{m-1}{2}\right]\phi\right)X(N_v(m-1)+k_s) \quad (25)$$

The correlation value calculator 63g receives the reception signal $XP(N_v(m-1)+k_s)$ from the reception phase shifter 62g.

Based on the reception reference clock signal obtained by multiplying the reference signal by the prescribed number, the correlation value calculator 63g periodically generates, according to the discrete time $k_s$, a transmission code (pulse compression code) of the code sequence $A_n$ having the code length L transmitted in the mth transmission cycle $T_r$ (m (odd number)=2q−1 where q is a natural number). Furthermore, based on the reception reference clock signal obtained by multiplying the reference signal by the prescribed number, the correlation value calculator 63g periodically generates, according to the discrete time $k_s$, a transmission code (pulse compression code) of the code sequence $B_n$ having the code length L transmitted in the mth transmission cycle $T_r$ (m (even number)=2q where q is a natural number). The parameter n is 1, ..., L.

The correlation value calculator 63g calculates sliding correlation values $AC(k_s, m)$ between the received reception signal $XP(N_v(m-1)+k_s)$ and the pulse compression code sequence $A_n$ or $B_n$. Sliding correlation values $AC(k_s, m)$ are calculated by performing a sliding correlation operation on the transmission code (transmission signal) and the reception signal at discrete times $k_s$ in an mth transmission cycle $T_r$.

More specifically, the correlation value calculator 63g calculates sliding correlation values $AC(k_s, 2q-1)$ at discrete times $k_s$ (=1 to $N_v$) in an mth (m (odd number)=2q−1) transmission cycle $T_r$ (each transmission cycle $T_r$) according to Equation (26). The correlation value calculator 63g outputs the sliding correlation values $AC(k_s, 2q-1)$ calculated according to Equation (26) to the coherent integrator 64g. In Equation (26), the asterisk (*) is the complex conjugate operator.

[Formula 26]

$$AC(k_s, 2q-1) = \sum_{n=1}^{L} XP\left(2N_v(q-1) + \frac{N_o(n-1)}{N_{TR}} + k_s\right)A_n^* \quad (26)$$

Furthermore, the correlation value calculator 63g calculates sliding correlation values $AC(k_s, 2q)$ at discrete times $k_s$ (=1 to $N_v$) in an mth (m (even number)=2q) transmission cycle $T_r$ (each transmission cycle $T_r$) according to Equation (27). The correlation value calculator 63g outputs the sliding correlation values $AC(k_s, 2q)$ calculated according to Equation (27) to the coherent integrator 64g. In Equation (27), the asterisk (*) is the complex conjugate operator.

$$AC(k_s, 2q) = \sum_{n=1}^{L} XP\left(N_v(2q-1) + \frac{N_o(n-1)}{N_{TR}} + k_s\right)B_n^* \quad (27)$$

The coherent integrator 64g receives the sliding correlation values $AC(k_s, 2q-1)$ and $AC(k_s, 2q)$ from the correlation value calculator 63g. The coherent integrator 64g adds together, for each discrete time $k_s$, over a prescribed number (NP) of transmission cycles $T_r$ (NP×$T_r$), sliding correlation values $AC(k_s, 2q-1)$ and $AC(k_s, 2q)$ calculated in the two respective pairs of transmission cycles $T_r$.

The coherent integrator 64g calculates a vth coherent integration value $ACC(k_s, v)$ for each discrete time $k_s$ by adding together, for each discrete time $k_s$, sliding correlation values $AC(k_s, 2q-1)$ and $AC(k_s, 2q)$ in the period NP×$T_r$ which is the prescribed number (NP) of transmission cycles $T_r$ according to Equation (28). The parameter NP represents the number of times of coherent integration performed in the coherent integrator 64g. The coherent integrator 64g outputs the calculated coherent integration values $ACC(k_s, v)$ to the distance estimator 65.

$$ACC(k_s, v) = \sum_{m=1}^{2NP} AC(k_s, NP(v-1)+m) \quad (28)$$

By setting the prescribed number NP at an integer multiple of $2\pi/\phi$ in Equation (28), the coherent integrator 64g can reduce influences of circuit errors even if a reflection wave signal contains circuit errors such as a DC offset component and IQ imbalance. That is, by setting the prescribed number NP at an integer multiple of $2\pi/\phi$, the radar apparatus 1g can prevent degradation of the target ranging performance even if a reflection wave signal contains circuit errors such as a DC offset component and IQ imbalance. Furthermore, the radar apparatus 1g can improve the reception quality (SNR) of a reflection wave signal by suppressing noise components contained in the reflection wave signal by performing NP times of coherent integration.

(Simulation Result of Radar Apparatus)

FIG. 17(a) is a graph showing a simulation result of a target ranging characteristic of a conventional radar apparatus. FIG. 17(b) is a graph showing a simulation result of a target ranging characteristic of the radar apparatus 1g according to the second embodiment in a case that a phase rotation amount 90° is given in each transmission cycle. Four targets (measurement targets) are assumed in each of the simulations of FIGS. 17(a) and 17(b).

In FIGS. 17(a) and 17(b), the horizontal axis represents the distance Range($k_{sp}$) (m) to a target TAR and the vertical axis represents the reception level (dB) of a reflection wave signal received by the radar receiver. As in FIG. 2(a), a DC offset component appears in a Doppler spectrum contained in the reflection wave signal in the range ($2F_{dmax}$) of values the Doppler frequency $f_d$ can take and hence it is difficult to separate the Doppler spectrum and the DC offset component from each other.

Therefore, the conventional radar apparatus is affected by the DC offset component, as a result of which the range sidelobe ratio of a reflection wave signal is increased and the target ranging characteristic is degraded (see FIG. 17(a)). For example, in FIG. 17(a), remarkable range sidelobe components remain in a range of 3 to 38 (m), for example. Therefore, it is difficult for the conventional radar apparatus to detect a reflection wave signal coming from each of the targets having distances 30 (m), and 35 (m), and 40 (m).

In the radar apparatus 1g according to this disclosure, the radar transmitter Txg generates a high-frequency radar transmission signal by giving, every two transmission cycles ($2T_r$), a transmission phase shift to a baseband transmission signal which uses, as a pulse compression code, a pair of complementary code sequences (paired every two transmission cycles ($2T_r$)). Furthermore, in the radar apparatus 1g, the radar receiver Rxg converts a high-frequency reflection wave signal into a baseband reception signal and gives the baseband reception signal a reception phase shift whose phase rotation amount is opposite in direction to that of the transmission phase shift.

With these measures, the radar apparatus 1g can separate a DC offset component from a Doppler spectrum contained in the reflection wave signal in the range ($2F_{dmax}$) of values the Doppler frequency $f_d$ can take, and thereby suppress influence of the transmission phase shift on the Doppler spectrum. For example, in FIG. 17(b), the main lobe of a reflection wave signal coming from each of the targets having the distances 30 (m), 35 (m), and 40 (m) is received properly by the radar receiver Rx. Thus, the target ranging characteristic of the radar apparatus 1g is made better than the target ranging characteristic shown in FIG. 17(a).

As such, the radar apparatus 1g according to the first embodiment which employs a complementary code provides an advantage that even in the case where circuit errors such as a DC offset and IQ imbalance exist, increase of range sidelobes can be prevented and degradation of the target ranging performance can be suppressed effectively without the need for providing a circuit error correction circuit.

(Modification 1 of Embodiment 2)

In a first modification of the second embodiment, as shown in FIG. 18, as in the first modification of the first embodiment, the reception phase shifter 62g used in the second embodiment is provided to give a reception phase shift to sliding correlation values AC($k_s$, 2q−1) and AC($k_s$, 2q) that are output from the correlation value calculator 63g.

FIG. 18 is a block diagram showing, in detail, the internal configuration of a radar apparatus 1h according to the first modification of the second embodiment. Units (blocks) of the radar apparatus 1h having the same (in configuration and operation) units in the radar apparatus 1g according to the second embodiment will be given the same reference symbols as the latter, and their configurations and operations will not be described (only differences will be described).

As shown in FIG. 18, a radar receiver Rxh is configured so as to include the RF receiver 4, the VGA 5, and a signal processor 6h. The signal processor 6h is configured so as to include the A/D converter 61, a correlation value calculator 63h, a reception phase shifter 62h, a coherent integrator 64h, and the distance estimator 65.

The correlation value calculator 63h receives a reception signal X($N_v$(m−1)+$k_s$) from the A/D converter 61.

Based on a reception reference dock signal obtained by multiplying a reference signal by a prescribed number, the correlation value calculator 63h periodically generates, according to the discrete time $k_s$, a transmission code (pulse compression code) of the code sequence $A_n$ having the code length L transmitted in an mth transmission cycle $T_r$ (m (odd number)=2q−1 where q is a natural number). Based on the reception reference dock signal obtained by multiplying the reference signal by the prescribed number, the correlation value calculator 63h periodically generates, according to the discrete time $k_s$, a transmission code (pulse compression code) of the code sequence $B_n$ having the code length L transmitted in an mth transmission cycle $T_r$ (m (even number)=2q where q is a natural number). The correlation value calculator 63h calculates sliding correlation values AC($k_s$, m) between the received reception signal X($N_v$(m−1)+$k_s$) and the pulse compression code $A_n$ or $B_n$. The parameter n is 1, . . . , L.

More specifically, the correlation value calculator 63h calculates sliding correlation values AC($k_s$, 2q−1) at discrete times $k_s$ (=1 to $N_v$) in an mth (m: odd number) transmission cycle $T_r$ (each transmission cycle $T_r$) according to Equation (29). The correlation value calculator 63a outputs the sliding correlation values AC($k_s$, 2q−1) calculated according to Equation (29) to the reception phase shifter 62a. In Equation (29), the asterisk (*) is the complex conjugate operator.

$$AC(k_s, 2q-1) = \sum_{n=1}^{L} X\left(N_v(q-1) + \frac{N_o(n-1)}{N_{TR}} + k_s\right) A_n^* \quad (29)$$

Furthermore, the correlation value calculator 63h calculates sliding correlation values AC($k_s$, 2q) at discrete times $k_s$ (=1 to $N_v$) in an mth (m: even number) transmission cycle $T_r$ (each transmission cycle $T_r$) according to Equation (30). The correlation value calculator 63h outputs the sliding correlation values AC($k_s$, 2q) calculated according to Equation (30) to the reception phase shifter 62h. In Equation (309), the asterisk (*) is the complex conjugate operator.

$$AC(k_s, 2q) = \sum_{n=1}^{L} X\left(N_v(2q-1) + \frac{N_o(n-1)}{N_{TR}} + k_s\right) B_n^* \quad (30)$$

The reception phase shifter 62h receives the sliding correlation values AC($k_s$, q−1) and AC($k_s$, 2q), that is, the sliding correlation values AC($k_s$, m) (m: natural number), from the correlation value calculator 63h. The reception phase shifter 62h gives the received sliding correlation values AC($k_s$, m) a reception phase shift that is opposite in direction to the phase shift component that was given by the transmission phase shifter 25g on the basis of a transmission timing signal that is supplied from the pulse transmission controller 21 in the mth transmission cycle $T_r$.

More specifically, based on a transmission timing signal that is supplied from the pulse transmission controller 21 in an mth transmission cycle $T_r$, the reception phase shifter 62h gives the sliding correlation values $AC(k_s, m)$ a reception phase shift $\exp(-j(m-1)\phi)$ corresponding to the ordinal number of the transmission cycle $T_r$ (see Equation (31)). The reception phase shifter 62h outputs reception-phase-shift-added sliding correlation values $ACP(k_s, m)$ to the coherent integrator 64h.

$$ACP(k_s, m) = \exp\left(-j \text{ floor}\left[\frac{m-1}{2}\right]\phi\right) AC(k_s, m) \quad (31)$$

The coherent integrator 64h receives the sliding correlation values $ACP(k_s, m)$ from the reception phase shifter 62h. The coherent integrator 64h adds together, for each discrete time $k_s$, over a prescribed number (NP) or more of transmission cycles $T_r$ (NP×$T_r$), sliding correlation values $ACP(k_s, m)$ calculated in the respective transmission cycles $T_r$.

The coherent integrator 64h calculates a vth coherent integration value $ACC(k_s, v)$ for each discrete time $k_s$ by adding together, for each discrete time $k_s$, sliding correlation values $ACP(k_s, m)$ in the period NP×$T_r$ (the prescribed number (NP) of transmission cycles $T_r$) or longer according to Equation (32). The parameter NP represents the number of times of coherent integration performed in the coherent integrator 64h. The coherent integrator 64h outputs the calculated coherent integration values $ACC(k_s, v)$ to the distance estimator 65.

$$ACC(k_s, v) = \sum_{m=1}^{2NP} ACP(k_s, NP(v-1)+m) \quad (32)$$

By setting the prescribed number NP at an integer multiple of $2\pi/\phi$ in Equation (32), the coherent integrator 64h can reduce influences of circuit errors even if a reflection wave signal contains circuit errors such as a DC offset component and IQ imbalance.

That is, by setting the prescribed number NP at an integer multiple of $2\pi/\phi$, the radar apparatus 1h can prevent degradation of the target ranging performance even if a reflection wave signal contains circuit errors such as a DC offset component and IQ imbalance. Furthermore, the radar apparatus 1h can improve the reception quality (SNR) of a reflection wave signal by suppressing noise components contained in the reflection wave signal by performing NP times of coherent integration.

As such, the radar apparatus 1h according to the first modification of the second embodiment provides the same advantages as the radar apparatus 1 according to the first embodiment although a complementary code is employed as a transmission code.

(Modification 2 of Embodiment 2)

In a second modification of the second embodiment, as shown in FIG. 19, a DC offset estimator 66 and a DC offset corrector 71 are added to the radar apparatus 1h according to the first modification of the second embodiment.

FIG. 19 is a block diagram showing, in detail, the internal configuration of a radar apparatus 1k according to the second modification of the second embodiment. Units (blocks) of the radar apparatus 1b having the same (in configuration and operation) units in the radar apparatus 1h according to the first modification of the second embodiment will be given the same reference symbols as the latter, and their configurations and operations will not be described (only differences will be described).

As shown in FIG. 19, a radar receiver Rxk is configured so as to include the RF receiver 4, the VGA 5, a signal processor 6k, and the DC offset corrector 71. The signal processor 6k is configured so as to include the A/D converter 61, the correlation value calculator 63h, the reception phase shifter 62h, the DC offset estimator 66, the coherent integrator 64h, and the distance estimator 65.

The DC offset estimator 66 receives sliding correlation values $ACP(k_s, m)$ from the correlation value calculator 63h. The DC offset estimator 66 adds together, for each discrete time $k_s$, over a prescribed number (NF) of transmission cycles $T_r$ (NF×$T_r$), sliding correlation values $ACP(k_s, m)$ calculated in the respective transmission cycles $T_r$.

The DC offset estimator 66 calculates an estimation value DCO(z) of a DC offset component (DC offset amount) by calculating an average value of addition values, calculated over the prescribed number (NF) of transmission cycles $T_r$ (NF×$T_r$) for the respective discrete times $k_s$, of sliding correlation values $ACP(k_s, m)$ (see Equation (21)). The DC offset estimator 66 outputs the DC offset component estimation value DCO(z) calculated according to Equation (21) to the DC oddest corrector 71. The parameter z is a natural number and represents the ordinal number of the transmission cycle $T_r$.

The sliding correlation values $ACP(k_s, m)$ that are output from the correlation value calculator 63h are correlation values that are not given a reception phase shift by the reception phase shifter 62h. Therefore, a DC offset component is included in the form of a DC component in a reflection wave signal reflected by a target TAR (see FIG. 2(b)). A reflection wave signal contains Doppler frequencies that are higher than or equal to $|\phi/2\pi T_r| - F_{dmax}$.

Therefore, by setting a prescribed number NF that satisfies the relationship of Inequality (22), components of the reflection wave signal reflected by a target that are contained in the sliding correlation values $ACP(k_s, m)$ are eliminated (suppressed). This allows the DC offset estimator 66 to estimate a DC offset component.

The DC offset corrector 71 receives the DC offset component estimation value DCO(z) from the DC offset estimator 66. The DC offset corrector 71 reduces the DC offset amount to be input to the A/D converter 61 by adjusting a DC offset amount in the VGA 5 on the basis of the received DC offset component estimation value DCO(z).

As described above, in the radar apparatus 1k according to the second modification of the second embodiment, since the DC offset component estimation calculation is performed by the DC offset estimator 66, components, in sliding correlation values, of a reflection wave signal reflected by a target TAR can be suppressed effectively and a DC offset component can be estimated. As a result, in the radar apparatus 1k, the accuracy of estimation of a DC offset component can be increased even if the addition time (NF×$T_r$) of sliding correlation values $ACP(k_s, m)$ in the DC offset estimator 66 is short.

In the radar apparatus 1k, the DC offset amount to be input to the A/D converter 61 is reduced by adjusting a DC offset amount in the VGA 5 using an estimated DC offset component. As a result, the input range of the A/D converter 61 can be used effectively. That is, the radar apparatus 1k can prevent a phenomenon that one of a positive signal and a negative signal of a reception signal that is input to the A/D converter 61 goes out of the input range of the A/D converter 61 and is thereby saturated.

(Modification 3 of Embodiment 2)

In a third modification of the second embodiment, as shown in FIG. 20, a DC offset estimator 66m and a DC offset corrector 71m are added to the radar apparatus 1g according to the second embodiment.

FIG. 20 is a block diagram showing, in detail, the internal configuration of a radar apparatus 1m according to the third modification of the second embodiment. Units (blocks) of the radar apparatus 1m having the same (in configuration and operation) units in the radar apparatus 1g according to the second embodiment will be given the same reference symbols as the latter, and their configurations and operations will not be described (only differences will be described).

As shown in FIG. 20, a radar receiver Rxm is configured so as to include the RF receiver 4, the VGA 5, a signal processor 6m, and the DC offset corrector 71m. The signal processor 6m is configured so as to include the A/D converter 61, the reception phase shifter 62g, the correlation value calculator 63g, the DC offset estimator 66m, the coherent integrator 64, and the distance estimator 65.

The DC offset estimator 66m receives sliding correlation values $AC(k_s, m)$ from the correlation value calculator 63g. The DC offset estimator 66m gives sliding correlation values $AC(k_s, m)$ calculated at discrete times $k_s$ in an mth transmission cycle $T_r$ transmission phase shift corresponding to the transmission phase shift that was given by the transmission phase shifter 25g. Furthermore, the DC offset estimator 66m adds together transmission-phase-shift-added sliding correlation values $AC(k_s, m)$ over a prescribed number (NF) of transmission cycles $T_r$ ($NF \times T_r$) for each discrete time $k_s$.

The DC offset estimator 66m calculates an estimation value DCO(z) of a DC offset component (DC offset amount) by calculating an average value of addition values, calculated over the prescribed number (NF) of transmission cycles $T_r$ ($NF \times T_r$) for the respective discrete times $k_s$, of sliding correlation values $AC(k_s, m)$ (see Equation (33)). The DC offset estimator 66m outputs the DC offset component estimation value DCO(z) calculated according to Equation (33) to the DC oddest corrector 71m. The parameter z is a natural number and represents the ordinal number of the transmission cycle $T_r$.

$$DCO(z) = \frac{1}{L \cdot N_v \cdot NF} \sum_{k_s=1}^{N_v} \sum_{m=1}^{2NF} \exp\left(j \text{ floor}\left[\frac{m-1}{2}\right]\phi\right) AC(k_s, NF(z-1)+m) \quad (33)$$

The sliding correlation values $AC(k_s, m)$ that are output from the correlation value calculator 63g are correlation values that are given a reception phase shift by the reception phase shifter 62g. Therefore, a DC offset component is shifted by a Doppler frequency component ($|\phi/2\pi T_r|$) contained in a reflection wave signal reflected by a target TAR (see FIG. 2(c)). Again adding the same transmission phase shift corresponding to the transmission cycle $T_r$ as was added by the transmission phase shifter 25g allows the DC offset estimator 66g to estimate a DC offset component. A reflection wave signal contains Doppler frequencies that are higher than or equal to $|\phi/2\pi T_r| - F_{dmax}$.

Therefore, by setting a prescribed number NF that satisfies the relationship of Inequality (22), components of the reflection wave signal reflected by a target that are contained in the sliding correlation values $AC(k_s, m)$ are eliminated (suppressed). This allows the DC offset estimator 66m to estimate a DC offset component.

The DC offset corrector 71m receives the DC offset component estimation value DCO(z) from the DC offset estimator 66m. The DC offset corrector 71m reduces the DC offset amount to be input to the A/D converter 61 by adjusting a DC offset amount in the VGA 5 on the basis of the received DC offset component estimation value DCO(z). That is, the VGA 5 adjusts the output level of a received reception signal according to the adjusted DC offset amount and thereby causes the output level of the received reception signal to fall within the input range of the A/D converter 61.

As described above, in the radar apparatus 1m according to the third modification of the second embodiment, since the DC offset component estimation calculation is performed by the DC offset estimator 66m, components, in sliding correlation values, of a reflection wave signal reflected by a target TAR can be suppressed effectively and a DC offset component can be estimated. As a result, the accuracy of estimation of a DC offset component can be increased even if the addition time ($NF \times T_r$) of sliding correlation values $AC(k_s, m)$ in the DC offset estimator 66m is short.

In the radar apparatus 1m, the DC offset amount to be input to the A/D converter 61 is reduced by adjusting a DC offset amount in the VGA 5 using an estimated DC offset component. As a result, the input range of the A/D converter 61 can be used effectively. That is, the radar apparatus 1m can prevent a phenomenon that one of a positive signal and a negative signal of a reception signal that is input to the A/D converter 61 goes out of the input range of the A/D converter 61 and is thereby saturated.

(Modification 4 of Embodiment 2)

In a fourth modification of the second embodiment, as shown in FIG. 21, a reception level detector 67 and a VGA controller 72 are added to the radar apparatus 1h according to the first modification of the second embodiment.

FIG. 21 is a block diagram showing, in detail, the internal configuration of a radar apparatus 1n according to the fourth modification of the second embodiment. Units (blocks) of the radar apparatus 1n having the same (in configuration and operation) units in the radar apparatus 1h according to the first modification of the second embodiment will be given the same reference symbols as the latter, and their configurations and operations will not be described (only differences will be described).

As shown in FIG. 21, a radar receiver Rxn is configured so as to include the RF receiver 4, the VGA 5, a signal processor 6n, and the VGA controller 72. The signal processor 6n is configured so as to include the A/D converter 61, the reception level detector 67, the correlation value calculator 63h, the reception phase shifter 62h, the coherent integrator 64h, and the distance estimator 65.

The reception level detector 67 receives a reception signal $X(N_v(m-1)+k_s)$ from the A/D converter 61. The reception level detector 67 detects an output level of the reception signal $X(N_v(m-1)+k_s)$ on the basis of the received reception signal $X(N_v(m-1)+k_s)$. For example, the output level is an average amplitude value, amplitude values larger than a prescribed amplitude value, or a maximum amplitude value. The reception level detector 67 outputs the detected output level of the reception signal $X(N_v(m-1)+k_s)$ to the VGA controller 72.

The VGA controller 72 receives the output level of the reception signal $X(N_v(m-1)+k_s)$ from the reception level detector 67. If it is judged on the basis of the received output level of the reception signal $X(N_v(m-1)+k_s)$ that the output level of the reception signal $X(N_v(m-1)+k_s)$ is lower than a prescribed level, the VGA controller 72 outputs, to the VGA 5, a control signal to the effect that the gain of the VGA 5 should be increased.

On the other hand, if it is judged on the basis of the received output level of the reception signal $X(N_v(m-1)+k_s)$ that the output level of the reception signal $X(N_v(m-1)+k_s)$ is higher than the prescribed level, the VGA controller 72 outputs, to the VGA 5, a control signal to the effect that the gain of the VGA 5 should be decreased.

Based on transmission timing signals that are output from the pulse transmission controller 21g at intervals that are equal to the transmission cycle $T_r$, the VGA controller 72 outputs, to the VGA 5, trigger signals for changing the gain of the VGA 5 at intervals that are equal to the transmission cycle $T_r$ multiplied by an integer multiple of $2\times 2\pi/\phi$, that is, at intervals of $4\pi T_r/\phi$. The VGA 5 increases or decreases its gain on the basis of the control signals and the trigger signals.

(Modification 5 of Embodiment 2)

In a fifth modification of the second embodiment, as shown in FIG. 22, a reception level detector 67 and a VGA controller 72 are added to the radar apparatus 1g according to the second embodiment.

FIG. 22 is a block diagram showing, in detail, the internal configuration of a radar apparatus 1p according to the fifth modification of the second embodiment. Units (blocks) of the radar apparatus 1p having the same (in configuration and operation) units in the radar apparatus 1g according to the second embodiment will be given the same reference symbols as the latter, and their configurations and operations will not be described (only differences will be described).

As shown in FIG. 22, a radar receiver Rxp is configured so as to include the RF receiver 4, the VGA 5, a signal processor 6p, and the VGA controller 72. The signal processor 6p is configured so as to include the A/D converter 61, the reception level detector 67, the reception phase shifter 62g, the correlation value calculator 63g, the coherent integrator 64g, and the distance estimator 65.

Since how the reception level detector 67 and the VGA controller 72 operate has been described in the fourth modification of the second embodiment and hence will not be described in this embodiment.

In the radar apparatus 1n and 1p according to the fourth and fifth modifications of the second embodiment, the VGA controller 72 can control (change) the gain of the VGA 5 with such timing that the transmission phase shift has made one rotation (changed by $2\pi$) on the phase plane.

As a result, the radar apparatus 1n and 1p can eliminate circuit errors such as a DC offset component and IQ imbalance and properly adjust the output level of a reception signal that is input to the A/D converter 61.

As such, the radar apparatus 1n and 1p can suppress increase of range sidelobes effectively and thereby prevent degradation of the target ranging performance.

(Modification 6 of Embodiment 2)

In a sixth medication of the second embodiment, as shown in FIG. 23, plural ($N_a$) radar receivers which are provided so as to correspond to respective reception antennas serve to estimate a distance to a target and an incoming direction of a reflection wave signal. To simplify the description, the following description will be directed to an example case that the parameter $N_a$ is equal to 2.

FIG. 23 is a block diagram showing, in detail, the internal configuration of a radar apparatus 1q according to the sixth modification of the second embodiment. Units (blocks) of the radar apparatus 1q having the same (in configuration and operation) units in the radar apparatus 1g according to the second embodiment will be given the same reference symbols as the latter, and their configurations and operations will not be described (only differences will be described).

As shown in FIG. 23, the radar apparatus 1g is configured so as to include the reference signal oscillator Lo, the radar transmitter Txg, two radar receivers Rxq1 and Rxq2, and a distance/direction estimator 81 (parameter $N_a=2$). The two radar receivers Rxq1 and Rxq2 are the same in configuration and operation except that they are connected to different reception antennas Ant-Rx1 and Ant-Rx2, and hence the radar receiver Rxq1 will be described below as an example.

The radar transmitter Txg and the two radar receivers Rxq1 and Rxq2 are connected to the reference signal oscillator Lo and are supplied with a reference signal from the reference signal oscillator Lo, whereby the radar transmitter Txg and the two radar receivers Rxq1 and Rxq2 operate in synchronism with each other.

The radar receiver Rxq1 is configured so as to include the RF receiver 4, the VGA (variable gain amplifier) 5, and a signal processor 6q. The signal processor 6q is configured so as to include the A/D converter 61, the reception phase shifter 62g, the correlation value calculator 63g, and the coherent integrator 64g.

The distance/direction estimator 81 receives sets of coherent integration values from the coherent integrators of the two radar receivers Rxq1 and Rxq2, respectively. Based on the received sets of coherent integration values, the distance/direction estimator 81 estimates a distance to a target TAR and an incoming direction of a reflection wave signal reflected by the target TAR. The method by which the distance/direction estimator 81 estimates a distance to a target TAR is the same as that by which the distance estimator 65 of the radar apparatus 1g according to the second embodiment does, and hence will not be described.

The distance/direction estimator 81 estimates an incoming direction of a reflection wave signal on the basis of a difference between reception phases of reflection wave signals received by the reception antennas Ant-Rx1 and Ant-Rx2 of the two radar receivers Rxq1 and Rxq2. That is, the distance/direction estimator 81 estimates an incoming direction on the basis of a difference between reception phases of coherent integration values $ACC^1(k_s, v)$ and coherent integration values $ACC^2(k_s, v)$ which are output from the coherent integrators of the two radar receivers Rxq1 and Rxq2, respectively, and outputs a maximum reception power direction as an incoming direction estimation value. The incoming direction estimation processing of the distance/direction estimator 81 may be the estimation method disclosed in the above-mentioned Referential non-patent document 3, for example.

As such, the radar apparatus 1q according to the sixth modification of the second embodiment provides, in addition to the advantages of the second embodiment, an advantage that it can estimate a distance to a target and an incoming direction of a reflection wave signal using the plural ($N_a$) radar receivers which are provided so as to correspond to the respective reception antennas.

(Embodiment 3)

In the second embodiment, the code generator 22g of the transmission signal generator 2g is provided with the first code generator 22g1 which generates one of a pair of complementary code sequences and the second first code generator 22g2 which generates the other of the pair of complementary code sequences.

In a radar apparatus 1r according to a third embodiment, a transmission signal generator 2r is provided with a first complementary code generator 22r1 which generates complementary code sequences and a second code generator 22r2 which also generates complementary code sequences.

The configuration and the operation of the radar apparatus 1r according to the third embodiment will be described with reference to FIGS. 27-29. FIG. 27 is a block diagram showing, in a simplified manner, the internal configuration of the radar apparatus 1r according to the third embodiment. FIG. 28 is a block diagram showing, in detail, the internal configuration of the radar apparatus 1r according to the third embodiment. FIG. 29 illustrates relationships between transmission intervals, transmission cycles, and transmission phase shift components of a radar transmission signal S-Tx1 which is generated on the basis of transmission codes between which switching is made every two transmission cycles (an odd-numbered pair of transmission cycles or an even-numbered pair of transmission cycles).

Units (blocks) of the radar apparatus 1r having the same (in configuration and operation) units in the radar apparatus 1g according to the second embodiment will be given the same reference symbols as the latter, and their configurations and operations will not be described (only differences will be described).

First, the configurations of the individual units of the radar apparatus 1r will be described in a simplified manner.

As shown in FIG. 27, the radar apparatus 1r is configured so as to include the reference signal oscillator Lo, a radar transmitter Txr, and a radar receiver Rxr. The radar transmitter Txr is configured so as to include the transmission signal generator 2r and the RF transmitter 3 which is connected to the transmission antenna Ant-Tx1. The transmission signal generator 2r is configured so as to include a pulse transmission controller 21r, a complementary code generator 22r, a modulator 23r, and a transmission phase shifter 25r. The complementary code generator 22r includes, as at least one code generator, the first complementary code generator 22r1 and the second complementary code generator 22r2 and generates at least one code sequence.

The radar transmitter Txr and the radar receiver Rxr are connected to the reference signal oscillator Lo and are supplied with a reference signal from the reference signal oscillator Lo, whereby processing performed by the radar transmitter Txr and processing performed by the radar receiver Rxr are synchronized with each other.

The radar receiver Rxr is configured so as to include the RF receiver 4, the VGA 5, and a signal processor 6r. The signal processor 6r is configured so as to include a reception phase shifter 62r, a correlation value calculator 63r, a coherent integrator 64r, and the distance estimator 65.

(Radar Transmitter)

Next, the configurations of the individual units the radar transmitter Txr will be described in detail with reference to FIG. 28.

As shown in FIG. 28, the transmission signal generator 2r is configured so as to include the pulse transmission controller 21r, the complementary code generator 22r, the modulator 23r, the LPF 24, the transmission phase shifter 25r, and the D/A converter 26. Although in FIG. 28 the transmission signal generator 2r includes the LPF 24, the LPF 24 may be provided in the radar transmitter Txr independently of the transmission signal generator 2r.

Next, how the individual units of the radar transmitter Txr operate will be described in detail.

Based on a reference signal generated by the reference signal oscillator Lo, the transmission signal generator 2r generates a transmission reference clock signal by multiplying the reference signal by a prescribed number. The individual units of the transmission signal generator 2r operate on the basis of the generated transmission reference clock signal. Let $f_{TxBB}$ represent the transmission reference clock frequency; then the transmission cycle $T_r$ is expressed as an integer $N_r$ multiple of a discrete time interval $1/f_{TxBB}$ which is determined by the transmission reference dock frequency $f_{TxBB}$ (see Equation (5)).

The transmission signal generator 2r periodically generates a baseband transmission signal (pulse compression code) $G(n_s)$ (see Equation (6)) by modulating pairs of complementary code sequences $A_n$, $B_n$, $C_n$, and $D_n$ having a code length L on the basis of transmission timing signals (for a radar transmission signal) which are output from the pulse transmission controller 21r at intervals that are equal to the transmission cycle $T_r$. The parameter n is equal to $1, \ldots, L$, and the parameter L represents the code length of each of the complementary code sequences $A_n$, $B_n$, $C_n$, and $D_n$. The parameter j is the imaginary number unit which satisfies $j^2=-1$. The parameter $n_s$ is a natural number and represents discrete time.

As shown in FIG. 29, the transmission signal $G(n_s)$ is such that each code of the complementary code sequence $A_n$ of complementary code sequences $A_n$ and $B_n$ generated by the first complementary code generator 22r1 is modulated using $N_o$ samples of the transmission reference clock signal in the transmission intervals $T_w$ (s) of, for example, mth and (m+4)th transmission cycles $T_r$.

Each code of the complementary code sequence $B_n$ of the complementary code sequences $A_n$ and $B_n$ generated by the first complementary code generator 22r1 is modulated using $N_o$ samples of the transmission reference clock signal in the transmission intervals $T_w$ (s) of (m+1)th and (m+5)th transmission cycles $T_r$.

Likewise, each code of the complementary code sequence $C_n$ of complementary code sequences $C_n$ and $D_n$ generated by the second complementary code generator 22r2 is modulated using $N_o$ samples of the transmission reference clock signal in the transmission intervals $T_w$ (s) of, for example, (m+2)th and (m+6)th transmission cycles $T_r$. Each code of the complementary code sequence $D_n$ of the complementary code sequences $C_n$ and $D_n$ generated by the second complementary code generator 22r2 is modulated using $N_o$ samples of the transmission reference clock signal in the transmission intervals $T_w$ (s) of (m+3)th and (m+7)th transmission cycles $T_r$.

Therefore, in each transmission interval $T_w$, modulation is done using $N_w$ ($=N_o \times L$) samples. In the silent interval ($T_r - T_w$) (s) of each transmission cycle $T_r$, modulation is done using $N_u$ ($=N_r - N_w$) samples. Therefore, the transmission signal $G(n_s)$ of Equation (6) is expressed as Equation (7).

The pulse transmission controller 21r generates a transmission timing signal for a high-frequency radar transmission signal every transmission cycle $T_r$ and outputs it to each of the complementary code generator 22r, the transmission phase shifter 25r, and the reception phase shifter 62r.

As shown in FIG. 29, the code generator 22r, which includes the first complementary code generator 22r1 and the second complementary code generator 22r2, alternately selects transmission codes ($A_n$, $B_n$) generated by the first complementary code generator 22r1 or transmission codes ($C_n$, $D_n$) generated by the second complementary code generator 22r2 every two transmission cycles $T_r$ on the basis of transmission timing signals generated by the pulse transmission controller 21r at intervals that are equal to the transmission cycle $T_r$, and outputs the selected transmission code to the modulator 23r.

The first complementary code generator 22r1 generates transmission codes (pulse compression codes) of complementary code sequences $A_n$ and $B_n$ having the code length L on the basis of a transmission timing signal that is output from the pulse transmission controller 21r every odd-numbered pair of transmission cycles $T_r$ (two transmission cycles ($2T_r$) are a unit cycle). For example, the elements of the complementary code sequences $A_n$ and $B_n$ are formed using two values [−1, 1] or four values [1, −1, −j, and j].

The second complementary code generator 22r2 generates transmission codes (pulse compression codes) of complementary code sequences $C_n$ and $D_n$ having the code length L on the basis of a transmission timing signal that is output from the pulse transmission controller 21r every even-numbered pair of transmission cycles $T_r$ (two transmission cycles ($2T_r$) are a unit cycle). For example, the elements of the complementary code sequences $C_n$ and $D_n$ are formed using two values [−1, 1] or four values [1, −1, −j, and j].

The code sequence $C_n$ may be an order-reversed code sequence (hereinafter denoted by $A'_n$) of the code sequence $A_n$. Likewise, the code sequence $D_n$ may be an order-reversed code sequence (hereinafter denoted by $B'_n$) of the code sequence $B_n$. Where $A_n$, $B_n$, $B'_n$, $A'_n$, $B_n$, $A_n$, $A'_n$, $B'_n$ are used in this order as transmission codes in the respective mth to (m+7)th transmission cycles, the radar apparatus 1r employs transmission codes of code sequences (Spano codes) $A_n$, $B_n$, $B'_n$, $A'_n$, $B_n$, $A_n$, $A'_n$, $B'_n$, in the respective mth to (m+7)th transmission cycles.

In this embodiment, the first complementary code generator 22r1 generates complementary code sequences $A_n$ and $B_n$ having a code length L and the second complementary code generator 22r2 generates complementary code sequences $C_n$ and $D_n$ having a code length L. However, the first complementary code generator 22r1 and the second complementary code generator 22r2 may generate complementary code sequences $C_n$ and $D_n$ having a code length L and complementary code sequences $A_n$ and $B_n$ having a code length L, respectively.

The complementary code generator 22r switches the output of, for example, the first complementary code generator 22r1 so that it outputs one of complementary code sequences $A_n$ and $B_n$ to the modulator 23r in each of two transmission cycles $T_r$ ($2T_r$) which is a unit cycle and outputs each of the complementary code sequences $A_n$ and $B_n$ once in the two transmission cycles $T_r$ ($2T_r$).

Furthermore, the complementary code generator 22r may switch the output of, for example, the first complementary code generator 22r1 so that it outputs transmission codes $A_n$ and $B_n$ in opposite order in two transmission cycles $T_r$ ($2T_r$). For example, the transmission codes $A_n$ and $B_n$ may be output in this order or in the opposite order. The complementary code generator 22r may switch the output of, for example, the first complementary code generator 22r1 so that transmission codes $A_n$ and $B_n$ are output in two transmission cycles $T_r$ ($2T_r$) so as to be inverted in sign. For example, the transmission codes may be either −$A_n$ and −$B_n$ or −$B_n$ and −$A_n$.

The complementary code generator 22r switches the output of, for example, the second complementary code generator 22r2 so that it outputs one of complementary code sequences $C_n$ and $D_n$ to the modulator 23r in each of two transmission cycles $T_r$ ($2T_r$) which is a unit cycle and outputs each of the complementary code sequences $C_n$ and $D_n$ once in the two transmission cycles $T_r$ ($2T_r$).

Furthermore, the complementary code generator 22r may switch the output of, for example, the second complementary code generator 22r2 so that it outputs transmission codes $C_n$ and $D_n$ in opposite order in two transmission cycles $T_r$ ($2T_r$). For example, the transmission codes $C_n$ and $D_n$ may be output in this order or in the opposite order. The complementary code generator 22r may switch the output of, for example, the second complementary code generator 22r2 so that transmission codes $C_n$ and $D_n$ are output in two transmission cycles $T_r$ ($2T_r$) so as to be inverted in sign. For example, the transmission codes may be either −$C_n$ and −$D_n$ or −$D_n$ and −$C_n$.

In this embodiment, as shown in FIG. 29, the complementary code generator 22r outputs transmission codes $A_n$ and $B_n$ generated by the first complementary code generator 22r1 to the modulator 23r on the basis of transmission timing signals that are output from the pulse transmission controller 21r in an odd-numbered (Mth or (M+2)th) pair of transmission cycles (two transmission cycles ($2T_r$) are a unit cycle).

The complementary code generator 22r outputs transmission codes $C_n$ and $D_n$ generated by the second complementary code generator 22r2 to the modulator 23r on the basis of transmission timing signals that are output from the pulse transmission controller 21r in an even-numbered ((M+1)th or (M+3)th) pair of transmission cycles (two transmission cycles ($2T_r$) are a unit cycle).

In FIG. 29, mth and (m+1)th transmission cycles (two transmission cycles in total) are denoted by Mth transmission cycles, (m+2)th and (m+3)th transmission cycles (two transmission cycles in total) are denoted by (M+1)th transmission cycles, (m+4)th and (m+5)th transmission cycles (two transmission cycles in total) are denoted by (M+2)th transmission cycles, and (m+6)th and (m+7)th transmission cycles (two transmission cycles in total) are denoted by (M+3)th transmission cycles.

The modulator 23r receives the transmission codes $A_n$ and $B_n$ and transmission codes $C_n$ and $D_n$ from the first code generator 22r1 and the second code generator 22r2, respectively. The modulator 23r generates a baseband transmission signal $G(n_s)$ of Equation (6) by pulse-modulating the received transmission codes. The modulator 23r outputs a transmission signal $G(n_s)$, in a preset limited band or lower, of the generated transmission signal $G(n_s)$ to the transmission phase shifter 25r via the LPF 24.

The transmission phase shifter 25r receives the transmission signal $G(n_s)$ from the modulator 23r or the LPF 24. The transmission phase shifter 25r gives, every two transmission cycles $T_r$ ($2T_r$), a prescribed transmission phase shift φ that is perpendicular on the IQ plane to a portion, received from a selected one of the first complementary code generator 22r1 and the second complementary code generator 22r2, of the received transmission signal $G(n_s)$ on the basis of transmission timing signals that are output from the pulse transmission controller 21r in respective transmission cycles $T_r$ (see FIG. 29).

More specifically, when receiving a transmission signal generated by modulating a transmission code generated by the first complementary code generator 22r1, the transmission phase shifter 25r gives, in a unit cycle of two transmission cycles ($2T_r$), a transmission phase shift floor[(m−1)/2]φ) (rad) on the real axis of the IQ plane (φ=π (rad)) to the transmission signal. That is, the transmission phase shifter 25r gives a phase shift of Equation (34) to a transmission signal $G(N_r(m−1)+n_s)$ obtained by modulating an output of the first complementary code generator 22r1 on the basis of a transmission timing signal supplied in an mth transmission cycle $T_r$. The operator floor[x] is an operator of outputting an integer obtained by rounding down a real number x.

$$GP(N_r(m-1)+n_s) = \exp\left(j \; \text{floor}\left[\frac{m-1}{2}\right]\phi\right) G(N_r(m-1)+n_s) \quad (34)$$

When receiving a transmission signal generated by modulating a transmission code generated by the second complementary code generator 22r2, the transmission phase shifter 25r gives, in a unit cycle of two transmission cycles ($2T_r$), a transmission phase shift floor[(m−1)/2]φ)+π/2 (rad) on the imaginary axis of the IQ plane to the transmission signal. That is, the transmission phase shifter 25r gives a phase shift of Equation (35) to a transmission signal $G(N_r(m-1)+n_s)$ obtained by modulating an output of the first complementary code generator 22r2 on the basis of a transmission timing signal supplied in the mth transmission cycle $T_r$. The operator floor[x] is an operator of outputting an integer obtained by rounding down a real number x.

$$GP(N_r(m-1)+n_s) = \exp\left(j\ \text{floor}\left[\frac{m-1}{2}\right]\phi + \frac{\pi}{2}\right)G(N_r(m-1)+n_s) \quad (35)$$

(Radar Receiver)

Next, the configurations of the individual units of the radar receiver Rxr will be described in detail with reference to FIG. 28.

As shown in FIG. 28, the radar receiver Rxr includes the RF receiver 4 to which the reception antenna Ant-Rx1 is connected, the VGA 5, and the signal processor 6r. The RF receiver 4 includes the amplifier 41, the frequency converter 42, and the quadrature detector 43. The signal processor 6g includes the A/D converter 61, the reception phase shifter 62r, the correlation value calculator 63r, the coherent integrator 64r, and the distance estimator 65. Each unit of the signal processor 6r performs a calculation periodically with each transmission cycle $T_r$ as a signal processing interval.

Next, how the individual units of the radar receiver Rxr operate will be described in detail.

Like the RF receiver 4, the signal processor 6r generates a reception reference clock signal by multiplying a reference signal generated by the reference signal oscillator Lo by a prescribed number. The individual units of the signal processor 6r operate on the basis of the generated reception reference dock signal.

The reception phase shifter 62r receives a reception signal $X(N_v(m-1)+k_s)$ from the A/D converter 61. Based on a transmission timing signal that is output from the pulse transmission controller 21r every transmission cycle $T_r$, the reception phase shifter 62r gives the received reception signal $X(N_v(m-1)+k_s)$ a reception phase shift that is in the direction (canceling direction) opposite to the direction of the phase shift component that was given by the transmission phase shifter 25r according to the output switching between the first complementary code generator 22r1 and the second complementary code generator 22r2.

For example, when receiving a reception signal corresponding to a radar transmission signal generated on the basis of a transmission code generated by the first complementary code generator 22r1, the reception phase shifter 62r gives it a phase shift $-\text{floor}[(m-1)/2]\phi$ (rad) in a unit cycle of two transmission cycles ($2T_r$). That is, the reception phase shifter 62r gives a phase shift of Equation (36) to a reception signal $X(N_v(m-1)+k_s)$ that is output from the A/D converter 61 as a signal corresponding to an output of the first complementary code generator 22r1 on the basis of a transmission timing signal supplied in an mth transmission cycle $T_r$. The operator floor[x] is an operator of outputting an integer obtained by rounding down a real number x.

$$XP(N_v(m-1)+k_s) = \exp\left(-j\ \text{floor}\left[\frac{m-1}{2}\right]\phi\right)X(N_v(m-1)+k_s) \quad (36)$$

When receiving a reception signal corresponding to a radar transmission signal generated on the basis of a transmission code generated by the second complementary code generator 22r2, the reception phase shifter 62r gives it a phase shift $-\text{floor}[(m-1)/2]\phi+\pi/2)$ (rad) in a unit cycle of two transmission cycles ($2T_r$). That is, the reception phase shifter 62r gives a phase shift of Equation (37) to a reception signal $X(N_v(m-1)+k_s)$ that is output from the A/D converter 61 as a signal corresponding to an output of the second complementary code generator 22r2 on the basis of a transmission timing signal supplied in an nth transmission cycle $T_r$. The operator floor[x] is an operator of outputting an integer obtained by rounding down a real number x.

$$XP(N_v(m-1)+k_s) = \qquad (37)$$
$$\exp\left[-j\ \left(\text{floor}\left[\frac{m-1}{2}\right]\phi + \frac{\pi}{2}\right)\right]X(N_v(m-1)+k_s)$$

The correlation value calculator 63r receives a reception signal $XP(N_v(m-1)+k_s)$ from the reception phase shifter 62r. Based on the reception reference clock signal obtained by multiplying the reference signal by the prescribed number, the correlation value calculator 63r generates the same transmission code (pulse compression code) as was generated by the transmission signal generator 2r, according to the discrete time $k_s$ in a unit cycle of two transmission cycles ($2T_r$).

The correlation value calculator 63r calculates sliding correlation values $AC(k_s, m)$ between the received reception signal $XP(N_v(m-1)+k_s)$ and the pulse compression code sequence $A_n$, $B_n$, $C_n$ or $D_n$.

For example, if the complementary code generator 22r caused the first complementary code generator 22r1 to output complementary code sequences $A_n$ and $B_n$ to the modulator 23r on the basis of transmission timing signals in odd-numbered two respective transmission cycles ($2T_r$) which are a unit cycle, the correlation value calculator 63r calculates sets of sliding correlation values $AC(k_s, 2m+1)$ at discrete times $k_s$ in the odd-numbered two respective transmission cycles ($2T_r$) according to Equations (38) and (39). The correlation value calculator 63r outputs the sets of sliding correlation values $AC(k_s, 2m+1)$ calculated according to Equations (38) and (39) to the coherent integrator 64r. In Equations (38) and (39), the asterisk (*) is the complex conjugate operator.

$$AC(k_s, 2m+1) = \sum_{n=1}^{L} XP\left(2N_v m + \frac{N_o(n-1)}{N_{TR}} + k_s\right)A_n^* \quad (38)$$

$$AC(k_s, 2m+1) = \sum_{n=1}^{L} XP\left(2N_v m + \frac{N_o(n-1)}{N_{TR}} + k_s\right)B_n^* \quad (39)$$

Furthermore, if the complementary code generator 22r caused the second complementary code generator 22r2 to output complementary code sequences $C_n$ and $D_n$ to the modulator 23r on the basis of transmission timing signals in even-numbered two respective transmission cycles ($2T_r$) which are a unit cycle, the correlation value calculator 63r calculates sets of sliding correlation values $AC(k_s, 2m)$ at discrete times $k_s$ in the even-numbered two respective transmission cycles ($2T_r$) according to Equations (40) and (41). The correlation value calculator 63r outputs the sets of sliding correlation values $AC(k_s, 2m)$ calculated according to respective Equations (40) and (41) to the coherent integrator 64r. In Equations (40) and (41), the asterisk (*) is the complex conjugate operator.

$$AC(k_s, 2m) = \sum_{n=1}^{L} XP\left(N_v(2m-1) + \frac{N_o(n-1)}{N_{TR}} + k_s\right)C_n^* \quad (40)$$

$$AC(k_s, 2m) = \sum_{n=1}^{L} XP\left(N_v(2m-1) + \frac{N_o(n-1)}{N_{TR}} + k_s\right)D_n^* \quad (41)$$

The coherent integrator 64r receives the sets of sliding correlation values $AC(k_s, 2m+1)$ and the sets of sliding correlation values $AC(k_s, 2m)$ from the correlation value calculator 63r. The coherent integrator 64r adds together, for each discrete time $k_s$, over a prescribed number (2NP) of transmission cycles $T_r$ (2NP×$T_r$), sets of sliding correlation values $AC(k_s, 2m+1)$ calculated in odd-numbered pairs of transmission cycles $T_r$ for each discrete time $k_s$ and sets of sliding correlation values $AC(k_s, 2m)$ calculated in even-numbered pairs of transmission cycles $T_r$ for each discrete time $k_s$.

The coherent integrator 64r calculates a vth coherent integration value $ACC(k_s, v)$ for each discrete time $k_s$ according to Equation (42) by adding together, for each discrete time $k_s$, sets of sliding correlation values $AC(k_s, 2m+1)$ and sets of sliding correlation values $AC(k_s, 2m)$ in the period 2NP×$T_r$, which is the prescribed number (2NP) of transmission cycles $T_r$. The parameter 2NP represents the number of times of coherent integration performed in the coherent integrator 64r. The coherent integrator 64r outputs the calculated coherent integration values $ACC(k_s, v)$ to the distance estimator 65.

$$ACC(k_s, v) = \sum_{m=1}^{2NP} AC(k_s, NP(v-1) + m) \quad (42)$$

As described above, in the radar apparatus 1r according to this embodiment, the complementary code generator 22r of the radar transmitter Txr gives phase shifts having an orthogonal phase relationship on the IQ plane (e.g., they are on the real axis and the imaginary axis) to modulation signals of complementary code sequences $A_n$ and $B_n$ generated in an odd-numbered pair of transmission cycles $T_r$ and modulation signals of complementary code sequences $C_n$ and $D_n$ generated in an even-numbered pair of transmission cycles $T_r$ (the same phase shift is assigned every two transmission cycles (2$T_r$)). The radar receiver Rxr gives reception signals reception phase shifts that opposite in direction to the transmission phase shifts.

As a result, in the radar apparatus 1r, because of the assignment of a transmission phase shift and a reception phase shift that is opposite in direction to the former, DC offset components that are superimposed on radar transmission signals generated on the basis of outputs of the first complementary code generator 22r1 and the second complementary code generator 22r2 can be separated from each other and thus eliminated (like signals on the real axis and the imaginary axis of the IQ plane). As such, the radar apparatus 1r can separate from each other and eliminate DC offset components even in the case where DC offset components that are superimposed on radar transmission signals generated on the basis of outputs of the first complementary code generator 22r1 and the second complementary code generator 22r2 are detected as having different values because different code sequences are used for generation of the radar transmission signals.
(Modification 1 of Embodiment 3)

In a first modification of the third embodiment, as in the first modification of the second embodiment, the reception phase shifter 62r used in the third embodiment is provided to give a reception phase shift to sets of sliding correlation values $AC(k_s, 2m+1)$ and sets of sliding correlation values $AC(k_s, 2m)$ that are output from the correlation value calculator 63r (see FIG. 30).

FIG. 30 is a block diagram showing, in detail, the internal configuration of a radar apparatus 1r-1 according to the first modification of the third embodiment. Units (blocks) of the radar apparatus 1r-1 having the same (in configuration and operation) units in the radar apparatus 1r according to the third embodiment will be given the same reference symbols as the latter, and their configurations and operations will not be described (only differences will be described).

As shown in FIG. 30, a radar receiver Rxr-1 is configured so as to include the RF receiver 4, the VGA 5, and a signal processor 6r-1. The signal processor 6r-1 is configured so as to include the A/D converter 61, a correlation value calculator 63r-1, a reception phase shifter 62r-1, a coherent integrator 64r, and the distance estimator 65.

The correlation value calculator 63r-1 receives a reception signal $X(N_v(m-1)+k_s)$ from the A/D converter 61.

Based on a reception reference dock signal obtained by multiplying a reference signal by a prescribed number, the correlation value calculator 63r-1 generates the same transmission code (pulse compression code) as was generated by the transmission signal generator 2r, according to the discrete time $k_s$ in a unit cycle of two transmission cycles (2$T_r$).

The correlation value calculator 63r calculates sliding correlation values $AC(k_s, m)$ between the received reception signal $X(N_v(m-1)+k_s)$ and the pulse compression code $A_n$, $B_n$, $C_n$, or $D_n$.

For example, if the complementary code generator 22r caused the first complementary code generator 22r1 to output complementary code sequences $A_n$ and $B_n$ to the modulator 23r on the basis of transmission timing signals in odd-numbered two respective transmission cycles (2$T_r$) which are a unit cycle, the correlation value calculator 63r-1 calculates sets of sliding correlation values $AC(k_s, 2m+1)$ at discrete times $k_s$ in the odd-numbered two respective transmission cycles (2$T_r$) according to Equations (43) and (44). The correlation value calculator 63r-1 outputs the sets of sliding correlation values $AC(k_s, 2m+1)$ calculated according to Equations (43) and (44) to the reception phase shifter 62r-1. In Equations (43) and (44), the asterisk (*) is the complex conjugate operator.

$$AC(k_s, 2m+1) = \sum_{n=1}^{L} X\left(2N_v m + \frac{N_o(n-1)}{N_{TR}} + k_s\right)A_n^* \quad (43)$$

$$AC(k_s, 2m+1) = \sum_{n=1}^{L} X\left(2N_v m + \frac{N_o(n-1)}{N_{TR}} + k_s\right)B_n^* \quad (44)$$

Furthermore, if the complementary code generator 22r caused the second complementary code generator 22r2 to output complementary code sequences $C_n$ and $D_n$ to the modulator 23r on the basis of transmission timing signals in even-numbered two respective transmission cycles (2$T_r$) which are a unit cycle, the correlation value calculator 63r-1 calculates sets of sliding correlation values $AC(k_s, 2m)$ at discrete times $k_s$ in the even-numbered two respective transmission cycles (2$T_r$) according to Equations (45) and (46). The correlation value calculator 63r-1 outputs the sets of sliding correlation values $AC(k_s, 2m)$ calculated according to respective Equations (45) and (46) to the reception phase shifter 62r-1. In Equations (45) and (46), the asterisk (*) is the complex conjugate operator.

$$AC(k_s, 2m) = \sum_{n=1}^{L} X\left(N_v(2m-1) + \frac{N_o(n-1)}{N_{TR}} + k_s\right) C_n^* \quad (45)$$

$$AC(k_s, 2m) = \sum_{n=1}^{L} X\left(N_v(2m-1) + \frac{N_o(n-1)}{N_{TR}} + k_s\right) D_n^* \quad (46)$$

The reception phase shifter 62r-1 receives the sets of sliding correlation values $AC(k_s, 2m+1)$ and the sets of sliding correlation values $AC(k_s, 2m)$ from the correlation value calculator 63r-1. Based on a transmission timing signal that is output from the pulse transmission controller 21r every transmission cycle $T_r$, the reception phase shifter 62r gives the received sets of sliding correlation values $AC(k_s, 2m+1)$ and sets of sliding correlation values $AC(k_s, 2m)$ a reception phase shift that is in the direction (canceling direction) opposite to the direction of the phase shift component that was given by the transmission phase shifter 25r according to the output switching between the first complementary code generator 22r1 and the second complementary code generator 22r2.

For example, when receiving a reception signal corresponding to a radar transmission signal generated on the basis of a transmission code generated by the first complementary code generator 22r1, the reception phase shifter 62r-1 gives it a phase shift $-\text{floor}[(m-1)/2]\phi$ (rad) in a unit cycle of two transmission cycles ($2T_r$).

That is, based on a transmission timing signal that is supplied in an nth transmission cycle $T_r$, the reception phase shifter 62r-1 gives a reception phase shift $\exp(-\text{floor}[(m-1)/2]\phi)$ corresponding to the ordinal number of the transmission cycles $2T_r$ to the sets of sliding correlation values AC ($k_s$, 2m+1) that are received as values corresponding to an output of the first complementary code generator 22r1 (see Equation (47)). The operator floor[x] is an operator of outputting an integer obtained by rounding down a real number x.

$$ACP(k_s, 2m+1) = \exp\left(-j \; \text{floor}\left[\frac{m-1}{2}\right]\phi\right) AC(k_s, 2m+1) \quad (47)$$

When receiving a reception signal corresponding to a radar transmission signal generated on the basis of a transmission code generated by the second complementary code generator 22r2, the reception phase shifter 62r-1 gives it a phase shift $-(\text{floor}[(m-1)/2]\phi+\pi/2)$ (rad) in a unit cycle of two transmission cycles ($2T_r$). That is, based on a transmission timing signal that is supplied in an mth transmission cycle $T_r$, the reception phase shifter 62r-1 gives a reception phase shift $\exp(-(\text{floor}[(m-1)/2]\phi+\pi/2))$ corresponding to the ordinal number of the transmission cycles $2T_r$ to the sets of sliding correlation values AC ($k_s$, 2m) that are received as values corresponding to an output of the second complementary code generator 22r2 (see Equation (48)). The operator floor [x] is an operator of outputting an integer obtained by rounding down a real number x.

$$ACP(k_s, 2m) = \exp\left(-j \; \text{floor}\left[\frac{m-1}{2}\right]\phi + \frac{\pi}{2}\right) AC(k_s, 2m) \quad (48)$$

The reception phase shifter 62r-1 outputs reception-phase-shift-added sets of sliding correlation values $ACP(k_s, 2m+1)$ and sets of sliding correlation values $ACP(k_s, 2m)$ to the coherent integrator 64r.

The coherent integrator 64r receives the sets of sliding correlation values $ACP(k_s, 2m+1)$ and the sets of sliding correlation values $ACP(k_s, 2m)$ from the correlation value calculator 63r-1. The coherent integrator 64r adds together, for each discrete time $k_s$, over a prescribed number (2NP) of transmission cycles $T_r$ (2NP×$T_r$), sets of sliding correlation values $ACP(k_s, 2m+1)$ calculated in odd-numbered pairs of transmission cycles $T_r$ for each discrete time $k_s$ and sets of sliding correlation values $ACP(k_s, 2m)$ calculated in even-numbered pairs of transmission cycles $T_r$ for each discrete time $k_s$.

The coherent integrator 64r calculates a vth coherent integration value $ACC(k_s, v)$ for each discrete time $k_s$ according to Equation (49) by adding together, for each discrete time $k_s$, sets of sliding correlation values $ACP(k_s, 2m+1)$ and sets of sliding correlation values $ACP(k_s, 2m)$ in the period 2NP×$T_r$ which is the prescribed number (2NP) of transmission cycles $T_r$. The parameter 2NP represents the number of times of coherent integration performed in the coherent integrator 64r. The coherent integrator 64r outputs the calculated coherent integration values $ACC(k_s, v)$ to the distance estimator 65.

$$ACC(k_s, v) = \sum_{m=1}^{2NP} ACP(k_s, NP(v-1)+m) \quad (49)$$

By setting the prescribed number NP at an integer multiple of $2\pi/\phi$ in Equation (32), the coherent integrator 64r can reduce influences of circuit errors even if a reflection wave signal contains circuit errors such as a DC offset component and IQ imbalance.

That is, by setting the prescribed number NP at an integer multiple of $2\pi/\phi$, the radar apparatus 1r-1 can prevent degradation of the target ranging performance even if a reflection wave signal contains circuit errors such as a DC offset component and IQ imbalance. Furthermore, the radar apparatus 1r-1 can improve the reception quality (SNR) of a reflection wave signal by suppressing noise components contained in the reflection wave signal by performing NP times of coherent integration.

As such, the radar apparatus 1r-1 according to the first modification of the third embodiment provides the same advantages as the radar apparatus 1 according to the first embodiment although complementary codes are employed as transmission codes.

(Modification 2 of Embodiment 3)

In a second modification of the third embodiment, as shown in FIG. 31, a DC offset estimator 66r and a DC offset corrector 71r are added to the radar apparatus 1r-1 according to the first modification of the third embodiment.

FIG. 31 is a block diagram showing, in detail, the internal configuration of a radar apparatus 1r-2 according to the second modification of the third embodiment. Units (blocks) of the radar apparatus 1r-2 having the same (in configuration and operation) units in the radar apparatus 1r-1 according to the first modification of the third embodiment will be given the same reference symbols as the latter, and their configurations and operations will not be described (only differences will be described).

As shown in FIG. 31, a radar receiver Rxr-2 is configured so as to include the RF receiver 4, the VGA 5, a signal processor 6r-2, and the DC offset corrector 71. The signal processor 6r-2 is configured so as to include the A/D converter 61, the correlation value calculator 63r-1, the reception phase shifter 62r-2, the DC offset estimator 66, the coherent integrator 64r, and the distance estimator 65.

The DC offset estimator 66r receives sets of sliding correlation values ACP($k_s$, 2m+1) and sets of sliding correlation values ACP($k_s$, 2m) from the correlation value calculator 63r-1. The DC offset estimator 66 adds together, for each discrete time $k_s$, over a prescribed number (NF) of transmission cycles $T_r$ (NF×$T_r$), sets of sliding correlation values ACP($k_s$, 2m+1) and sets of sliding correlation values ACP($k_s$, 2m) calculated in the respective transmission cycles $T_r$.

The DC offset estimator 66r calculates an estimation value DCO(z) of a DC offset component (DC offset amount) by calculating an average value of addition values, calculated over the prescribed number (NF) of transmission cycles $T_r$ (NF×$T_r$) for the respective discrete times $k_s$, of sliding correlation values ACP($k_s$, 2m+1) and sets of sliding correlation values ACP($k_s$, 2m) (see Equation (21)). The DC offset estimator 66r outputs the DC offset component estimation value DCO(z) calculated according to Equation (21) to the DC oddest corrector 71r. The parameter z is a natural number and represents the ordinal number of the transmission cycle 2$T_r$.

The sets of sliding correlation values ACP($k_s$, 2m+1) and the sets of sliding correlation values ACP($k_s$, 2m) that are output from the correlation value calculator 63r-1 are correlation values that are not given a reception phase shift by the reception phase shifter 62r-1. Therefore, a DC offset component is included in the form of a DC component in a reflection wave signal reflected by a target TAR (see FIG. 2(b)). A reflection wave signal contains Doppler frequencies that are higher than or equal to $|\phi/2\pi T_r| - F_{dmax}$.

Therefore, by setting a prescribed number NF that satisfies the relationship of Inequality (22), components of the reflection wave signal reflected by a target that are contained in the sets of sliding correlation values ACP($k_s$, 2m+1) and the sets of sliding correlation values ACP($k_s$, 2m) are eliminated (suppressed). This allows the DC offset estimator 66 to estimate a DC offset component.

The DC offset corrector 71r receives the DC offset component estimation value DCO(z) from the DC offset estimator 66r. The DC offset corrector 71r reduces the DC offset amount to be input to the A/D converter 61 by adjusting a DC offset amount in the VGA 5 on the basis of the received DC offset component estimation value DCO(z).

As described above, in the radar apparatus 1r-2 according to the second modification of the third embodiment, since the DC offset component estimation calculation is performed by the DC offset estimator 66r, components, in sliding correlation values, of a reflection wave signal reflected by a target TAR can be suppressed effectively and a DC offset component can be estimated. As a result, in the radar apparatus 1k, the accuracy of estimation of a DC offset component can be increased even if the addition time (NF×$T_r$) of sets of sliding correlation values ACP($k_s$, 2m+1) and sets of sliding correlation values ACP($k_s$, 2m) in the DC offset estimator 66 is short.

In the radar apparatus 1r-2, the DC offset amount to be input to the A/D converter 61 is reduced by adjusting a DC offset amount in the VGA 5 using an estimated DC offset component. As a result, the input range of the A/D converter 61 can be used effectively. That is, the radar apparatus 1k can prevent a phenomenon that one of a positive signal and a negative signal of a reception signal that is input to the A/D converter 61 goes out of the input range of the A/D converter 61 and is thereby saturated.

(Modification 3 of Embodiment 3)

In a third modification of the third embodiment, as shown in FIG. 32, a DC offset estimator 66r-3 and a DC offset corrector 71r-3 are added to the radar apparatus 1r according to the third embodiment.

FIG. 32 is a block diagram showing, in detail, the internal configuration of a radar apparatus 1r-3 according to the third modification of the third embodiment. Units (blocks) of the radar apparatus 1r-3 having the same (in configuration and operation) units in the radar apparatus 1r according to the third embodiment will be given the same reference symbols as the latter, and their configurations and operations will not be described (only differences will be described).

As shown in FIG. 32, a radar receiver Rxr-3 is configured so as to include the RF receiver 4, the VGA 5, a signal processor 6r-3, and the DC offset corrector 71r-3. The signal processor 6r-3 is configured so as to include the A/D converter 61, the reception phase shifter 62r, the correlation value calculator 63r, the DC offset estimator 66r-3, the coherent integrator 64, and the distance estimator 65.

The DC offset estimator 66r-3 receives sets of sliding correlation values AC($k_s$, 2m+1) and sets of sliding correlation values AC($k_s$, 2m) from the correlation value calculator 63r. The DC offset estimator 66r-3 gives a transmission phase shift that was given by the transmission phase shifter 25r according to the transmission cycle Tr to sets of sliding correlation values AC($k_s$, 2m+1) calculated at respective discrete times $k_s$ in an odd-numbered pair of transmission cycles (2$T_r$) and sets of sliding correlation values AC($k_s$, 2m) calculated at respective discrete times $k_s$ in an even-numbered pair of transmission cycles (2$T_r$). Furthermore, the DC offset estimator 66r-3 adds together transmission-phase-shift-added sets of sliding correlation values AC($k_s$, 2m+1) and sets of sliding correlation values AC($k_s$, 2m) over a prescribed number (NF) of transmission cycles $T_r$ (NF×$T_r$) for each discrete time $k_s$.

The DC offset estimator 66r-3 calculates an estimation value DCO(z) of a DC offset component (DC offset amount) by calculating an average value of addition values, calculated over the prescribed number (NF) of transmission cycles $T_r$ (NF×$T_r$) for the respective discrete times $k_s$, of sets of sliding correlation values AC($k_s$, 2m+1) and sets of sliding correlation values AC($k_s$, 2m) (see Equation (33)). The DC offset estimator 66r-3 outputs the DC offset component estimation value DCO(z) calculated according to Equation (33) to the DC oddest corrector 71r-3. The parameter z is a natural number and represents the ordinal number of the transmission cycle 2$T_r$.

The sets of sliding correlation values AC($k_s$, 2m+1) and the sets of sliding correlation values AC($k_s$, 2m) that are output from the correlation value calculator 63r are correlation values that are given a reception phase shift by the reception phase shifter 62r. Therefore, a DC offset component is shifted by a Doppler frequency component ($|\phi/2\pi T_r|$) contained in a reflection wave signal reflected by a target TAR (see FIG. 2(c)). Again adding the same transmission phase shift corresponding to the transmission cycle $T_r$ as was added by the transmission phase shifter 25r allows the DC offset estimator 66r-3 to estimate a DC offset component. A reflection wave signal contains Doppler frequencies that are higher than or equal to $|\phi/2\pi T_r| - F_{dmax}$.

Therefore, by setting a prescribed number NF that satisfies the relationship of Inequality (22), components of the reflection wave signal reflected by a target that are contained in the sets of sliding correlation values AC($k_s$, 2m+1) and the sets of sliding correlation values AC($k_s$, 2m) are eliminated (suppressed). This allows the DC offset estimator 66r-3 to estimate a DC offset component.

The DC offset corrector 71r-3 receives the DC offset component estimation value DCO(z) from the DC offset estimator 66r-3. The DC offset corrector 71r-3 reduces the DC offset amount to be input to the A/D converter 61 by adjusting a DC offset amount in the VGA 5 on the basis of the received DC offset component estimation value DCO(z). That is, the VGA 5 adjusts the output level of a received reception signal according to the adjusted DC offset amount and thereby causes the output level of the received reception signal to fall within the input range of the A/D converter 61.

As described above, in the radar apparatus 1-3 according to the third modification of the third embodiment, since the DC offset component estimation calculation is performed by the DC offset estimator 66r-3, components, in sliding correlation values, of a reflection wave signal reflected by a target TAR can be suppressed effectively and a DC offset component can be estimated. As a result, the accuracy of estimation of a DC offset component can be increased even if the addition time (NF×$T_r$) of sets of sliding correlation values AC($k_s$, 2m+1) and sets of sliding correlation values AC($k_s$, 2m) in the DC offset estimator 66r-3 is short.

In the radar apparatus 1r-3, the DC offset amount to be input to the A/D converter 61 is reduced by adjusting a DC offset amount in the VGA 5 using an estimated DC offset component. As a result, the input range of the A/D converter 61 can be used effectively. That is, the radar apparatus 1r-3 can prevent a phenomenon that one of a positive signal and a negative signal of a reception signal that is input to the A/D converter 61 goes out of the input range of the A/D converter 61 and is thereby saturated.

(Modification 4 of Embodiment 3)

In a fourth modification of the third embodiment, as shown in FIG. 33, a reception level detector 67r-4 and a VGA controller 72r-4 are added to the radar apparatus 1r according to the first modification of the second embodiment.

FIG. 33 is a block diagram showing, in detail, the internal configuration of a radar apparatus 1r-4 according to the fourth modification of the third embodiment. Units (blocks) of the radar apparatus 1r-4 having the same (in configuration and operation) units in the radar apparatus 1r according to the first modification of the third embodiment will be given the same reference symbols as the latter, and their configurations and operations will not be described (only differences will be described).

As shown in FIG. 33, a radar receiver Rxr-4 is configured so as to include the RF receiver 4, the VGA 5, a signal processor 6r-4, and the VGA controller 72. The signal processor 6r-4 is configured so as to include the A/D converter 61, the reception level detector 67, the correlation value calculator 63r-1, the reception phase shifter 62r-1, the coherent integrator 64r, and the distance estimator 65.

The reception level detector 67r-4 receives a reception signal X($N_v$(m−1)+$k_s$) from the A/D converter 61. The reception level detector 67r-4 detects an output level of the reception signal X($N_v$(m−1)+$k_s$) on the basis of the received reception signal X($N_v$(m−1)+$k_s$). For example, the output level is an average amplitude value, amplitude values larger than a prescribed amplitude value, or a maximum amplitude value. The reception level detector 67r-4 outputs the detected output level of the reception signal X($N_v$(m−1)+$k_s$) to the VGA controller 72r-4.

The VGA controller 72r-4 receives the output level of the reception signal X($N_v$(m−1)+$k_s$) from the reception level detector 67r-4. If it is judged on the basis of the received output level of the reception signal X($N_v$(m−1)+$k_s$) that the output level of the reception signal X($N_v$(m−1)+$k_s$) is lower than a prescribed level, the VGA controller 72r-4 outputs, to the VGA 5, a control signal to the effect that the gain of the VGA 5 should be increased.

On the other hand, if it is judged on the basis of the received output level of the reception signal X($N_v$(m−1)+$k_s$) that the output level of the reception signal X($N_v$(m−1)+$k_s$) is higher than the prescribed level, the VGA controller 72r-4 outputs, to the VGA 5, a control signal to the effect that the gain of the VGA 5 should be decreased.

Based on transmission timing signals that are output from the pulse transmission controller 21r at intervals that are equal to the transmission cycle $2T_r$, the VGA controller 72 outputs, to the VGA 5, trigger signals for changing the gain of the VGA 5 at intervals that are equal to the transmission cycle $2T_r$ multiplied by an integer multiple of $2 \times 2\pi/\phi$, that is, at intervals of $4\pi T_r/\phi$. The VGA 5 increases or decreases its gain on the basis of the control signals and the trigger signals.

(Modification 5 of Embodiment 3)

In a fifth modification of the third embodiment, as shown in FIG. 34, a reception level detector 67r-5 and a VGA controller 72r-5 are added to the radar apparatus 1r according to the third embodiment.

FIG. 34 is a block diagram showing, in detail, the internal configuration of a radar apparatus 1r-5 according to the fifth modification of the third embodiment. Units (blocks) of the radar apparatus 1r-5 having the same (in configuration and operation) units in the radar apparatus 1r according to the third embodiment will be given the same reference symbols as the latter, and their configurations and operations will not be described (only differences will be described).

As shown in FIG. 34, a radar receiver Rxr-5 is configured so as to include the RF receiver 4, the VGA 5, a signal processor 6r-5, and the VGA controller 72. The signal processor 6r-5 is configured so as to include the A/D converter 61, the reception level detector 67, the reception phase shifter 62r, the correlation value calculator 63r-1, the coherent integrator 64r, and the distance estimator 65.

Since how the reception level detector 67r-5 and the VGA controller 72r-5 operate has been described in the fourth modification of the third embodiment and hence will not be described in this embodiment.

In the radar apparatus 1r-4 and 1r-5 according to the fourth and fifth modifications of the third embodiment, the VGA controller 72 can control (change) the gain of the VGA 5 with such timing that the transmission phase shift has made one rotation (changed by $2\pi$) on the phase plane.

As a result, the radar apparatus 1r and 1r-5 can eliminate circuit errors such as a DC offset component and IQ imbalance and properly adjust the output level of a reception signal that is input to the A/D converter 61.

As such, the radar apparatus 1r and 1r-5 can suppress increase of range sidelobes effectively and thereby prevent degradation of the target ranging performance.

(Modification 6 of Embodiment 3)

In a sixth medication of the third embodiment, as shown in FIG. 35, plural ($N_a$) radar receivers which are provided so as to correspond to respective reception antennas serve to estimate a distance to a target and an incoming direction of a reflection wave signal. To simplify the description, the following description will be directed to an example case that the parameter $N_a$ is equal to 2.

FIG. 35 is a block diagram showing, in detail, the internal configuration of a radar apparatus 1r-6 according to the sixth modification of the third embodiment. Units (blocks) of the radar apparatus 1r-6 having the same (in configuration and operation) units in the radar apparatus 1r according to the third embodiment will be given the same reference symbols as the latter, and their configurations and operations will not be described (only differences will be described).

As shown in FIG. 35, the radar apparatus 1r-6 is configured so as to include the reference signal oscillator Lo, the radar transmitter Txr, two radar receivers Rxr-61 and Rxr-62, and a distance/direction estimator 81 (parameter $N_a=2$). The two radar receivers Rxr-61 and Rxr-62 are the same in configuration and operation except that they are connected to different reception antennas Ant-Rx1 and Ant-Rx2, and hence the radar receiver Rxr-61 will be described below as an example.

The radar transmitter Txr and the two radar receivers Rxr-61 and Rxr-62 are connected to the reference signal oscillator Lo and are supplied with a reference signal from the reference signal oscillator Lo, whereby the radar transmitter Txr and the two radar receivers Rxr-61 and Rxr6-2 operate in synchronism with each other.

The radar receiver Rxr-61 is configured so as to include the RF receiver 4, the VGA (variable gain amplifier) 5, and a signal processor 6r-6. The signal processor 6r-6 is configured so as to include the A/D converter 61, the reception phase shifter 62r, the correlation value calculator 63r, and the coherent integrator 64r.

The distance/direction estimator 81 receives sets of coherent integration values from the coherent integrators of the two radar receivers Rxr-61 and Rxr-62, respectively. Based on the received sets of coherent integration values, the distance/direction estimator 81 estimates a distance to a target TAR and an incoming direction of a reflection wave signal reflected by the target TAR. The method by which the distance/direction estimator 81 estimates a distance to a target TAR is the same as that by which the distance estimator 65 of the radar apparatus 1r according to the third embodiment does, and hence will not be described.

The distance/direction estimator 81 estimates an incoming direction of a reflection wave signal on the basis of a difference between reception phases of reflection wave signals received by the reception antennas Ant-Rx1 and Ant-Rx2 of the two radar receivers Rxr-61 and Rxr-62. That is, the distance/direction estimator 81 estimates an incoming direction on the basis of a difference between reception phases of coherent integration values $ACC^1(k_s, v)$ and coherent integration values $ACC^2(k_s, v)$ which are output from the coherent integrators of the two radar receivers Rxr-61 and Rxr-2, respectively, and outputs a maximum reception power direction as an incoming direction estimation value. The incoming direction estimation processing of the distance/direction estimator 81 may be the estimation method disclosed in the above-mentioned Referential non-patent document 3, for example.

As such, the radar apparatus 1r-6 according to the sixth modification of the third embodiment provides, in addition to the advantages of the third embodiment, an advantage that it can estimate a distance to a target and an incoming direction of a reflection wave signal using the plural (N) radar receivers which are provided so as to correspond to the respective reception antennas.

Although the various embodiments have been described above with reference to the drawings, it goes without saying that this disclosure is not limited to those examples. It is apparent that those skilled in the art would conceive various changes or modifications within the confines of the claims. And such changes and modifications are naturally included in the technical scope of this disclosure.

FIG. 24 illustrates relationships between transmission intervals, transmission cycles, and transmission phase shift components of a radar transmission signal in a case that a complementary code is used as a transmission code and time-division transmission is done at intervals of four transmission cycles. The above-described second embodiment is directed to the example in which a complementary code is used as a transmission code and time-division transmission is done at intervals of two transmission cycles.

Time-division transmission may be done at intervals of four transmission cycles using a complementary code shown in FIG. 24 as a transmission code. More specifically, a transmission code using a code sequence $A_n$ of a complementary code is used in an mth transmission cycle, a transmission code using a code sequence $B_n$ of the complementary code is used in an (m−1)th transmission cycle, a transmission code using a code sequence $-A_n$ of a complementary code is used in an (m+2)th transmission cycle, a transmission code using a code sequence $B_n$ of the complementary code is used in an (m+3)th transmission cycle, In time-division transmission that is done at intervals of four transmission cycles ($4T_r$), the transmission phase component is varied every four transmission cycles ($4T_r$) and the reception phase component is likewise varied every four transmission cycles ($4T_r$). As a result, the same advantages as obtained by the radar apparatus each of the embodiments can be obtained. In particular, where the phase rotation amount ($\phi$) of the transmission phase component is small (e.g., 60° or smaller), range sidelobes and a DC offset can be eliminated effectively irrespective of whether a target moves or not, whereby the target ranging characteristic is improved.

Although in the third embodiment two sets of complementary code sequences $(A_n, B_n)$ and $(C_n, D_n)$ are used, the sets of complementary code sequences are not limited to two sets of complementary code sequences $(A_n, B_n)$ and $(C_n, D_n)$. For example, 2's multiple sets of complementary code sequences may be used. For example, where four sets of complementary code sequences $(A_n, B_n)$, $(C_n, D_n)$, $(E_n, F_n)$, and $(G_n, H_n)$ are used, they are grouped into units each consisting of two sets of complementary code sequences and the third embodiment is applied to each unit. For example, the same advantages are obtained by grouping them into a unit of $(A_n, B_n)$ and $(C_n, D_n)$ and a unit of $(E_n, F_n)$, and $(G_n, H_n)$ and applying the third embodiment to each unit in the same manner.

The present application is based on Japanese Patent Application No. 2011-176974 filed on Aug. 12, 2011, the contents of which are incorporated herein by reference.

INDUSTRIAL APPLICABILITY

This disclosure is useful when applied to radar apparatus which prevent increase of range sidelobes and suppress degradation of the target ranging performance effectively without the need for employing a circuit error correction circuit even in the case where circuit errors such as a DC offset or IQ imbalance occur.

DESCRIPTION OF SYMBOLS 1, 1a, 1b, 1c, 1d, 1e, 1f, 1g, 1h, 1k, 1m, 1n, 1p, 1q, 1r, 1r-1, 1r-2, 1r-3, 1r-4, 1r-5, 1r-6: Radar apparatus
2, 2g, 2r: Transmission signal generator
3: RF transmitter
4: RF receiver
5: VGA
6, 6a, 6b, 6c, 6d, 6e, 6f, 6g, 6h, 6k, 6m, 6n, 6p, 6q, 6r, 6r-1, 6r-2, 6r-3, 6r-4, 6r-5, 6r-6: Signal processor
21, 21g, 21r: Pulse transmission controller
22, 22g, 22q1, 22g2: Code generator
22r: Complementary code generator
22r1: First complementary code generator 22r2: Second complementary code generator
23, 23g, 23r: Modulator
24: LPF
25, 25g, 23r: Transmission phase shifter
26: D/A converter
31: Quadrature modulator
32, 42: Frequency converter
33, 41: Amplifier
43: Quadrature detector
61: ND converter
62, 62a, 62g, 62h, 62r: Reception phase shifter
63, 63a, 62g, 62h, 63r: Correlation value calculator
64, 64r: Coherent integrator
65: Distance estimator
66: DC offset estimator
67: Reception level detector
71: DC offset corrector
72: VGA controller
81: Distance/direction estimator
Ant-Tx1: Transmission antenna
Ant-Rx1, Ant-Rx2: Reception antenna
Rx, Rxa, Rxb, Rxc, Rxd, Rxe, Rxf1, Rxf2, Rxg, Rxh, Rxk, Rxm, Rxn, Rxp, Rxq1, Rxq2, Rxr, Rxr-1, Rxr-2, Rxr-3, Rxr-4, Rxr-5, Rxr-61, Rx-62: Radar receiver
Tx, Txg, Txr: Radar transmitter

The invention claimed is:

1. A radar apparatus comprising:
   a pulse transmission controller that generates transmission timing signals for a high-frequency radar transmission signal in every transmission cycle;
   at least one code generator that generates at least one code sequence having a prescribed code length;
   a modulator that generates a baseband transmission signal by modulating the at least one code sequence on the basis of the transmission timing signals;
   a transmission phase shifter that gives the baseband transmission signal phase shifts each corresponding to at least one transmission cycle on the basis of the transmission timing signals; and
   an RF transmitter that converts a phase-shift-added transmission signal into the high-frequency radar transmission signal and transmitting the latter from a transmission antenna.

2. The radar apparatus according to claim 1, wherein the code generator includes:
   a first code generator that generates a transmission code of one of complementary code sequences having a prescribed code length on the basis of transmission timing signals generated in odd-numbered transmission cycles or even-numbered transmission cycles; and
   a second code generator that generates a transmission code of the other of the complementary code sequences having the prescribed code length on the basis of transmission timing signals generated in even-numbered transmission cycles or odd-numbered transmission cycles;
   wherein the modulator modulates the one transmission code generated by the first code generator and the other transmission code generated by the second code generator; and
   wherein the transmission phase shifter gives phase shifts each corresponding to two transmission cycles.

3. The radar apparatus according to claim 1, wherein the transmission phase shifter gives phase shifts of 90°.

4. The radar apparatus according to claim 1, further comprising:
   a radar receiver that detects presence/absence of a target on the basis of a reflection wave signal of the high-frequency radar transmission signal,
   wherein the radar receiver includes:
      an RF receiver that receives, with a reception antenna, a reflection wave signal of the high-frequency radar transmission signal reflected by the target, and converts the received reflection wave signal into a baseband reception signal;
      a reception phase shifter that gives the baseband reception signal supplied from the RF receiver opposite phase shifts which are opposite to the respective phase shifts given by the transmission phase shifter on the basis of the transmission timing signals;
      a correlation value calculator that calculates correlation values between opposite-phase-shift-added baseband reception signal and the transmission code or codes; and
      a coherent integrator that adds together the correlation values calculated by the correlation value calculator over a prescribed number of transmission cycles.

5. The radar apparatus according to claim 1, further comprising:
   a radar receiver that detects presence/absence of a target on the basis of a reflection wave signal of the high-frequency radar transmission signal,
   wherein the radar receiver includes:
      an RF receiver that receives, with a reception antenna, a reflection wave signal of the high-frequency radar transmission signal reflected by the target, and converts the received reflection wave signal into a baseband reception signal;
      a correlation value calculator that calculates correlation values between the baseband reception signal supplied from the RF receiver and the transmission code or codes;
      a reception phase shifter that gives the correlation signals calculated by the correlation value calculator opposite phase shifts which are opposite to the respective phase shifts given by the transmission phase shifter on the basis of the transmission timing signals generated at intervals that are equal to the transmission cycle; and
      a coherent integrator that adds together opposite-phase-shift-added correlation values produced by the reception phase shifter over a prescribed number of transmission cycles.

6. The radar apparatus according to claim 5, wherein the radar receiver further includes:
   a VGA that adjusts an output level of the baseband reception signal that is output from the RF receiver;
   an A/D converter that converts an output-level-adjusted analog baseband reception signal produced by the VGA into a digital baseband reception signal;
   a DC offset estimator that adds together correlation values calculated by the correlation value calculator over the prescribed number of transmission cycles, and estimating a DC offset component contained in the baseband reception signal on the basis of an addition result of the correlation values; and
   an offset corrector that causes the VGA to adjust the output level of the baseband reception signal by correcting a DC offset amount in the VGA on the basis of the DC offset component estimated by the DC offset estimator.

7. The radar apparatus according to claim 4, wherein the radar receiver further includes:
- a VGA that adjusts an output level of the baseband reception signal that is output from the RF receiver;
- an A/D converter that converts an output-level-adjusted analog baseband reception signal produced by the VGA into a digital baseband reception signal;
- a DC offset estimator that adds together opposite-phase-shift-added correlation values produced by the correlation value calculator over the prescribed number of transmission cycles, and estimating a DC offset component contained in the baseband reception signal on the basis of an addition result of the correlation values; and
- an offset corrector that causes the VGA to adjust the output level of the baseband reception signal by correcting a DC offset amount in the VGA on the basis of the DC offset component estimated by the DC offset estimator.

8. The radar apparatus according to claim 4, wherein the radar receiver further includes:
- a VGA that adjusts an output level of the baseband reception signal that is output from the RF receiver;
- an A/D converter that converts an output-level-adjusted analog baseband reception signal produced by the VGA into a digital baseband reception signal;
- a reception level detector that detects an output level of the baseband reception signal that is output from the A/D converter; and
- a VGA controller that decreases a gain of the VGA for the output level of the baseband reception signal if the output level of the baseband reception signal detected by the reception level detector is higher than a prescribed level.

9. The radar apparatus according to claim 4, wherein the radar receiver further includes a distance estimator that estimates a distance to the target on the basis of an addition result of the correlation values supplied from the coherent integrator.

10. The radar apparatus according to claim 4, comprising:
- plural radar receivers each of which is provided so as to correspond to a single reception antenna: and
- a distance/direction estimator that estimates an incoming direction of reflection wave signals received by the respective reception antennas of the plural radar receivers on the basis of a reception phase difference or differences between the reflection wave signals, and estimates a distance to the target on the basis of addition results of the correlation values supplied from the coherent integrators of the radar receivers.

11. The radar apparatus according to claim 1, wherein the code generator includes:
- a first complementary code generator that generates transmission codes of complementary code sequences having a prescribed code length on the basis of transmission timing signals generated in respective transmission cycles of odd-numbered or even-numbered pairs of transmission cycles; and
- a second complementary code generator that generates transmission codes of complementary code sequences having a prescribed code length on the basis of transmission timing signals generated in respective transmission cycles of even-numbered or odd-numbered pairs of transmission cycles;
- wherein the modulator modulates the transmission codes generated by the first complementary code generator in the odd-numbered or even-numbered pairs of transmission cycles, and modulates the transmission codes generated by the second complementary code generator in the even-numbered or odd-numbered pairs of transmission cycles; and
- wherein the transmission phase shifter gives modulated transmission codes prescribed phase shifts corresponding to respective odd-numbered or even-numbered pairs of transmission cycles in the odd-numbered or even-numbered pairs of transmission cycles, and gives modulated transmission codes phase shifts being orthogonal to the corresponding prescribed phase shifts and corresponding to respective even-numbered or odd-numbered pairs of transmission cycles in the even-numbered or odd-numbered pairs of transmission cycles.

12. The radar apparatus according to claim 11, wherein the transmission phase shifter gives the modulated transmission codes prescribed phase shifts corresponding to respective odd-numbered or even-numbered pairs of transmission cycles in the odd-numbered or even-numbered pairs of transmission cycles, and gives the modulated transmission codes phase shifts that are deviated by $\pi/2$ from the corresponding prescribed phase shifts and corresponding to respective even-numbered or odd-numbered pairs of transmission cycles in the even-numbered or odd-numbered pairs of transmission cycles.

13. The radar apparatus according to claim 5, wherein the radar receiver further includes:
- a VGA that adjusts an output level of the baseband reception signal that is output from the RF receiver;
- an A/D converter that converts an output-level-adjusted analog baseband reception signal produced by the VGA into a digital baseband reception signal;
- a reception level detector that detects an output level of the baseband reception signal that is output from the A/D converter; and
- a VGA controller that decreases a gain of the VGA for the output level of the baseband reception signal if the output level of the baseband reception signal detected by the reception level detector is higher than a prescribed level.

14. The radar apparatus according to claim 5, wherein the radar receiver further includes a distance estimator that estimates a distance to the target on the basis of an addition result of the correlation values supplied from the coherent integrator.

* * * * *